(12) United States Patent
Miyasaka et al.

(10) Patent No.: US 11,768,107 B2
(45) Date of Patent: Sep. 26, 2023

(54) COLOR MEASUREMENT APPARATUS

(71) Applicant: SEIKO EPSON CORPORATION, Tokyo (JP)

(72) Inventors: Haruki Miyasaka, Matsumoto (JP); Hisayuki Akahane, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 93 days.

(21) Appl. No.: 17/454,078

(22) Filed: Nov. 9, 2021

(65) Prior Publication Data

US 2022/0146307 A1   May 12, 2022

(30) Foreign Application Priority Data

Nov. 12, 2020  (JP) .................................. 2020-188439

(51) Int. Cl.
  *G01J 3/02*  (2006.01)
  *G01J 3/50*  (2006.01)
(52) U.S. Cl.
  CPC ........... *G01J 3/0218* (2013.01); *G01J 3/0264* (2013.01); *G01J 3/50* (2013.01)
(58) Field of Classification Search
  CPC .......... G01J 3/0218; G01J 3/0264; G01J 3/50; G01J 3/0272; G01J 3/0291; G01J 3/0232; G01J 3/0283; G01J 3/26; G01J 3/46; G01J 3/10; G01J 3/501; G01J 3/524; G01J 3/0202
  See application file for complete search history.

(56) References Cited

U.S. PATENT DOCUMENTS

| 2014/0268342 | A1 | 9/2014 | Matsushita |
| 2015/0185081 | A1* | 7/2015 | Sano ..................... G01J 3/0235 356/456 |

FOREIGN PATENT DOCUMENTS

| CN | 104049293 | 9/2014 |
| CN | 204188264 | 3/2015 |
| CN | 209927292 | 1/2020 |
| JP | 2003-344164 A | 12/2003 |
| JP | 2015-215239 A | 12/2015 |
| WO | 2017/195573 A1 | 11/2017 |

* cited by examiner

*Primary Examiner* — Abdullahi Nur
(74) *Attorney, Agent, or Firm* — WORKMAN NYDEGGER

(57) ABSTRACT

A color measurement apparatus includes an opening portion forming member that is a member in which an opening portion for causing light arriving from a measurement target to enter inside the apparatus is formed, and that is arranged on a bottom surface at a time of measurement performed by the apparatus, the opening portion for causing the light arriving from the measurement target to enter inside the apparatus, an incident light processing portion that processes light incident through the opening portion, and an operation portion that is positioned on an upper surface, and that receives various operations, in which in a view from a first direction that is a vertical direction intersecting with the bottom surface and the upper surface which is the surface on the opposite side from the bottom surface and includes a display portion, the opening portion and the operation portion have an overlapping part.

10 Claims, 51 Drawing Sheets

COLOR MEASUREMENT APPARATUS

The present application is based on, and claims priority from JP Application Serial Number 2020-188439, filed Nov. 12, 2020, the disclosure of which is hereby incorporated by reference herein in its entirety.

BACKGROUND

1. Technical Field

The present disclosure relates to a color measurement apparatus that performs color measurement based on light arriving from a measurement target.

2. Related Art

In the related art, color measurement apparatuses that measure color based on light arriving from a measurement target are known. Among the color measurement apparatuses, for example, there is a color measurement apparatus that performs color measurement by causing light arriving from a measurement target to be incident on a spectroscopic filter, extracting a predetermined wavelength component using the spectroscopic filter and receiving the predetermined wavelength component using a photo diode, and detecting a voltage output from the photo diode. In such a color measurement apparatus, an opening portion is disposed on a bottom surface of an apparatus main body. Accordingly, at a time of measurement, a measured part of the measurement target is in a state of being covered with the apparatus main body. Thus, a problem of positioning between the opening portion and the measured part arises.

An optical measurement device disclosed in JP-A-2003-344164 includes a light source, a mirror that further reflects measurement light which is emitted from the light source and reflected by a measurement target, a light condensing lens that is arranged along an optical path of the measurement light reflected by the mirror and condenses the measurement light reflected by the mirror, a light reception element that includes a light reception surface on a rear side focal plane of the light condensing lens and outputs a light reception signal corresponding to the measurement light received on the light reception surface, and a finder arranged at a position with the mirror interposed between a measurement position and the position. The mirror is arranged to be movable such that an inclination thereof can be adjusted. The measured part of the measurement target can be checked from the finder through the mirror.

In addition, an optical characteristic measurement apparatus disclosed in International Publication No. 2017/195573 includes a measurement target observation portion in which a measurement target facing a measurement opening is directly observed, and an observation light source that illuminates the measurement target facing the measurement opening. Accordingly, it is configured that the measured part of the measurement target can be directly checked without using the mirror disclosed in JP-A-2003-344164. However, a shutter mechanism that opens and closes a through opening which is the measurement target observation portion is disposed such that extraneous light does not enter from the measurement target observation portion at a time of measurement.

In a configuration in which the mirror as disclosed in JP-A-2003-344164 or the shutter mechanism as disclosed in International Publication No. 2017/195573 is disposed in order to position the opening portion on the bottom surface of the apparatus to the measured part, a noticeable increase in cost of the apparatus is caused, and it is desirable to easily position the opening portion to the measured part with a simpler configuration.

SUMMARY

According to an aspect of the present disclosure, there is provided a color measurement apparatus including an opening portion forming member that is a member in which an opening portion for causing light arriving from a measurement target to enter inside the apparatus is formed, and that is arranged on a bottom surface at a time of measurement performed by the apparatus, an incident light processing portion that processes light incident through the opening portion, and an operation portion that is positioned on an upper surface which is a surface on an opposite side from the bottom surface, and that receives various operations, in which in a view from a first direction that is a vertical direction intersecting with the bottom surface and the upper surface which is the surface on the opposite side from the bottom surface and includes a display portion, the opening portion and the operation portion have an overlapping part.

Figure 10:
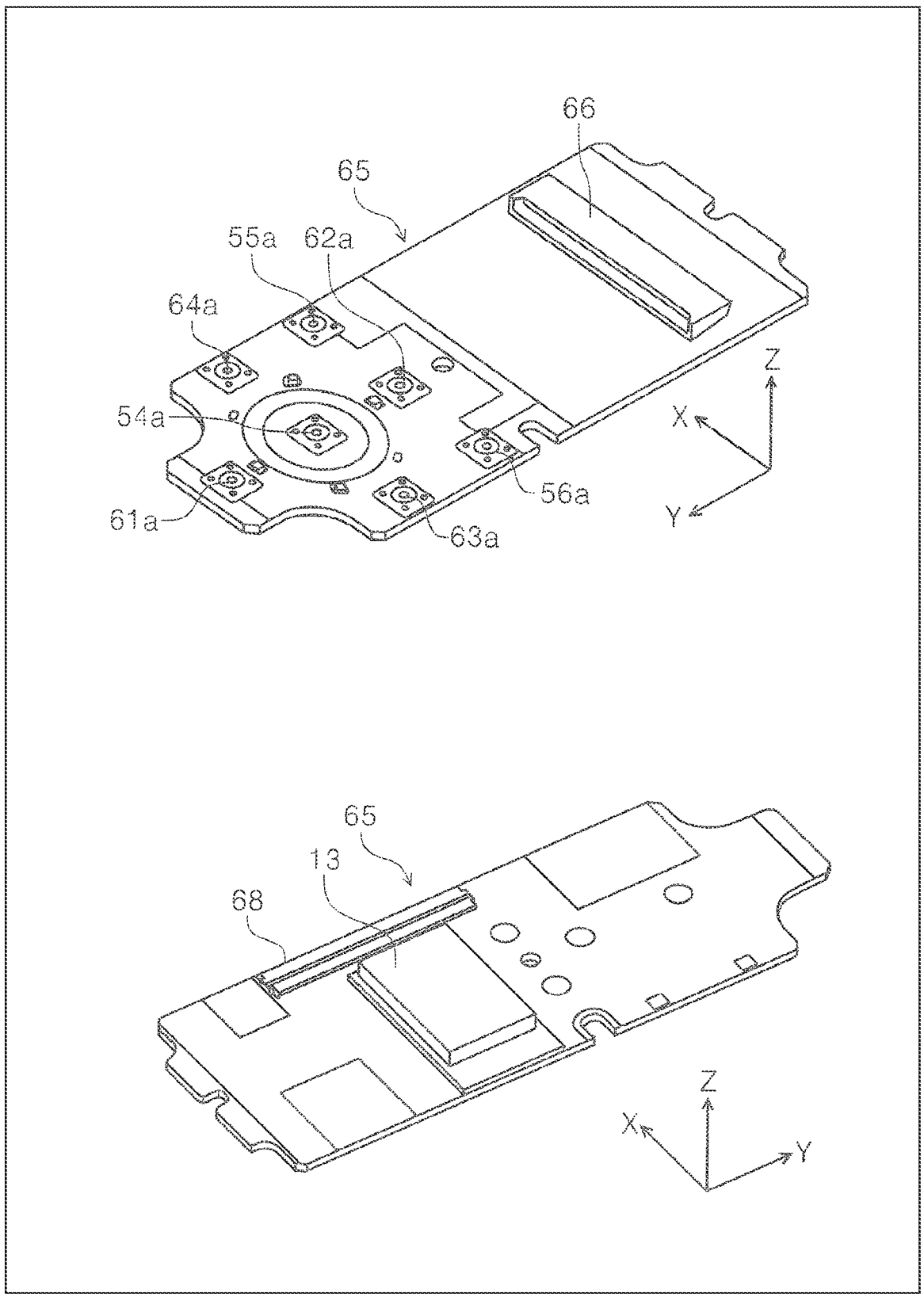

An upper part of FIG. 10 is a perspective view illustrating an upper surface of a panel substrate, and a lower part of FIG. 10 is a perspective view illustrating a lower surface of the panel substrate.

Figure 11:
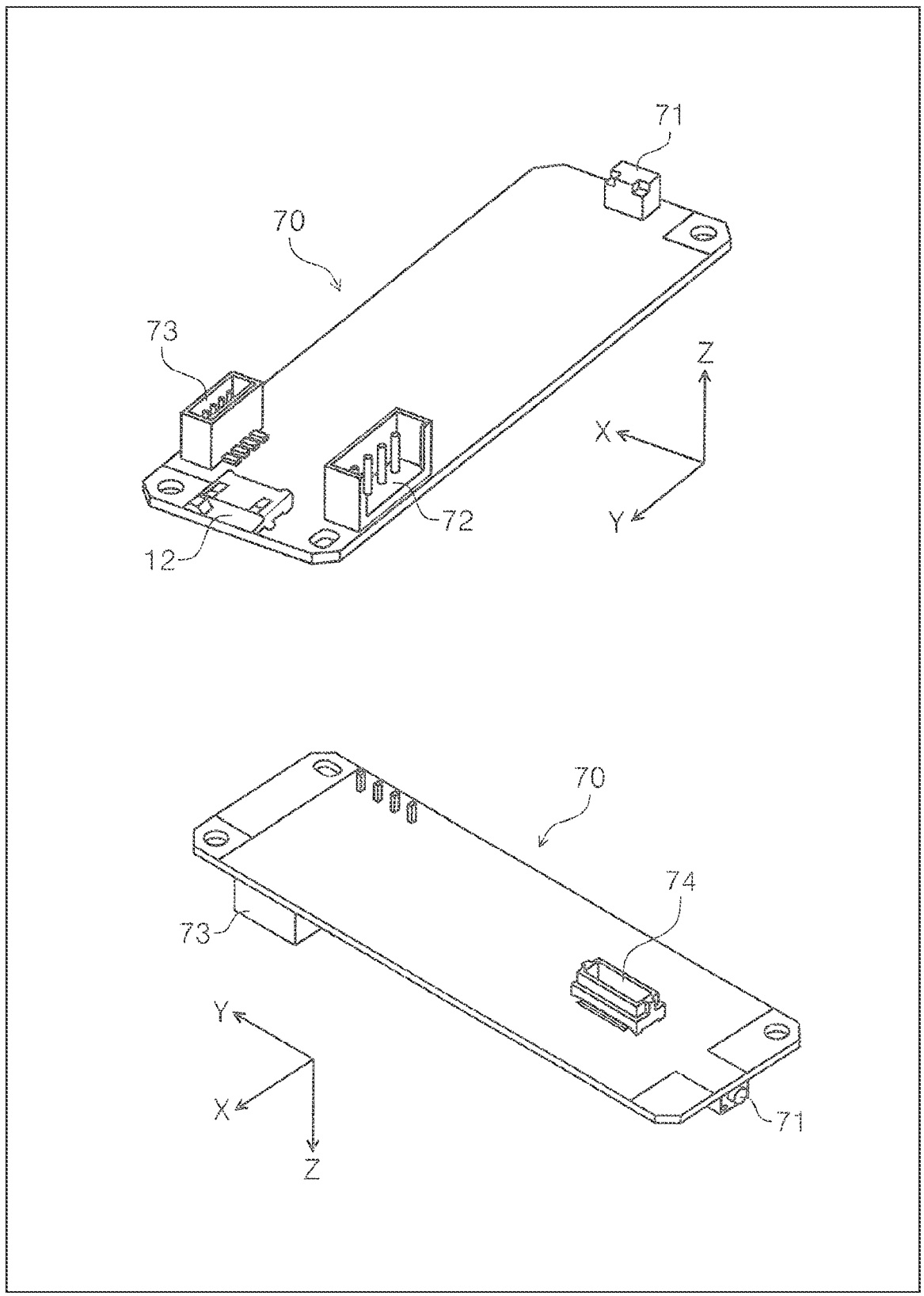

An upper part of FIG. 11 is a perspective view illustrating an upper surface of a battery control substrate, and a lower part of FIG. 11 is a perspective view illustrating a lower surface of the battery control substrate.

Figure 12:
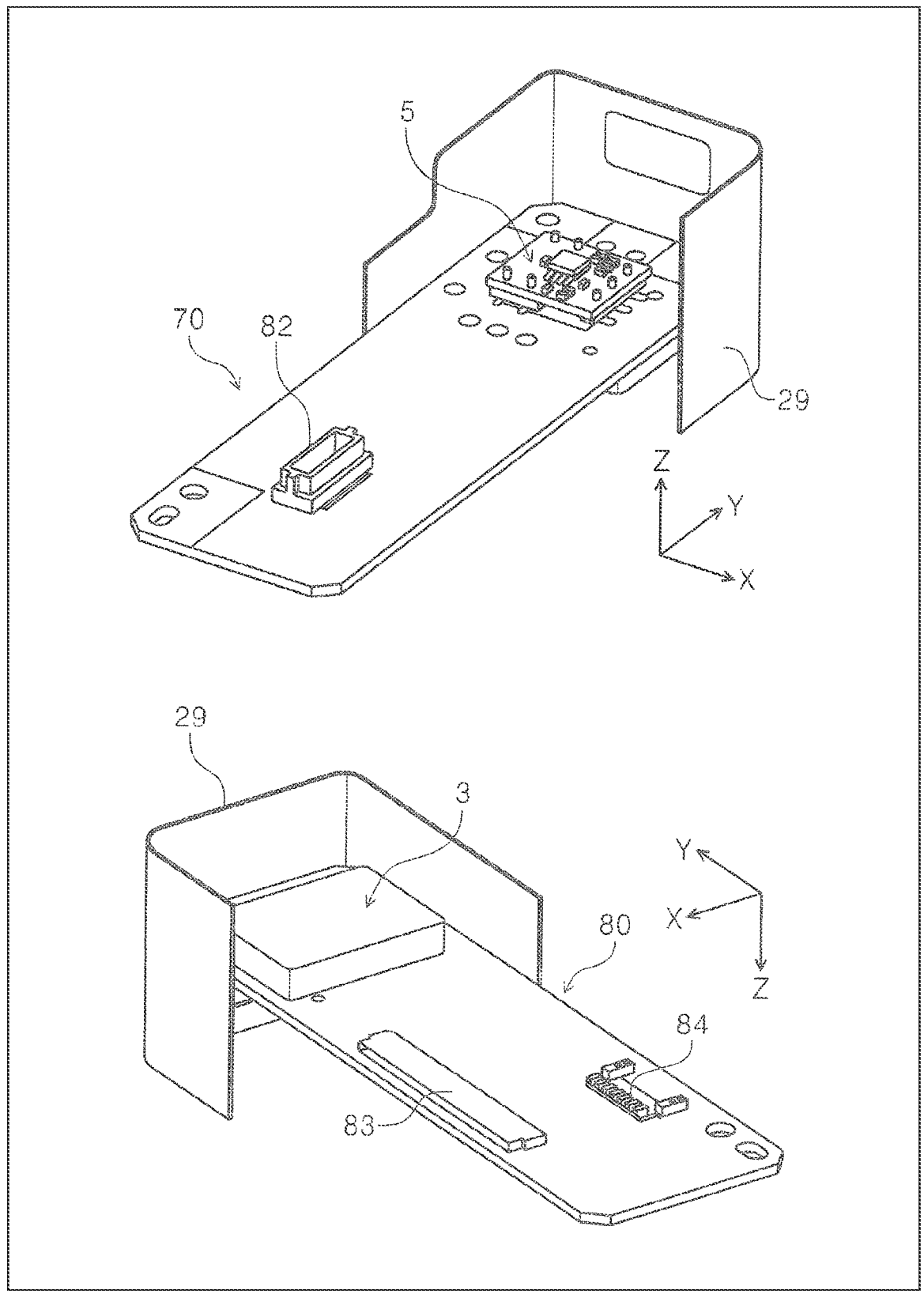

An upper part of FIG. 12 is a perspective view illustrating an upper surface of a light reception portion substrate, and a lower part of FIG. 12 is a perspective view illustrating a lower surface of the light reception portion substrate.

Figure 13:
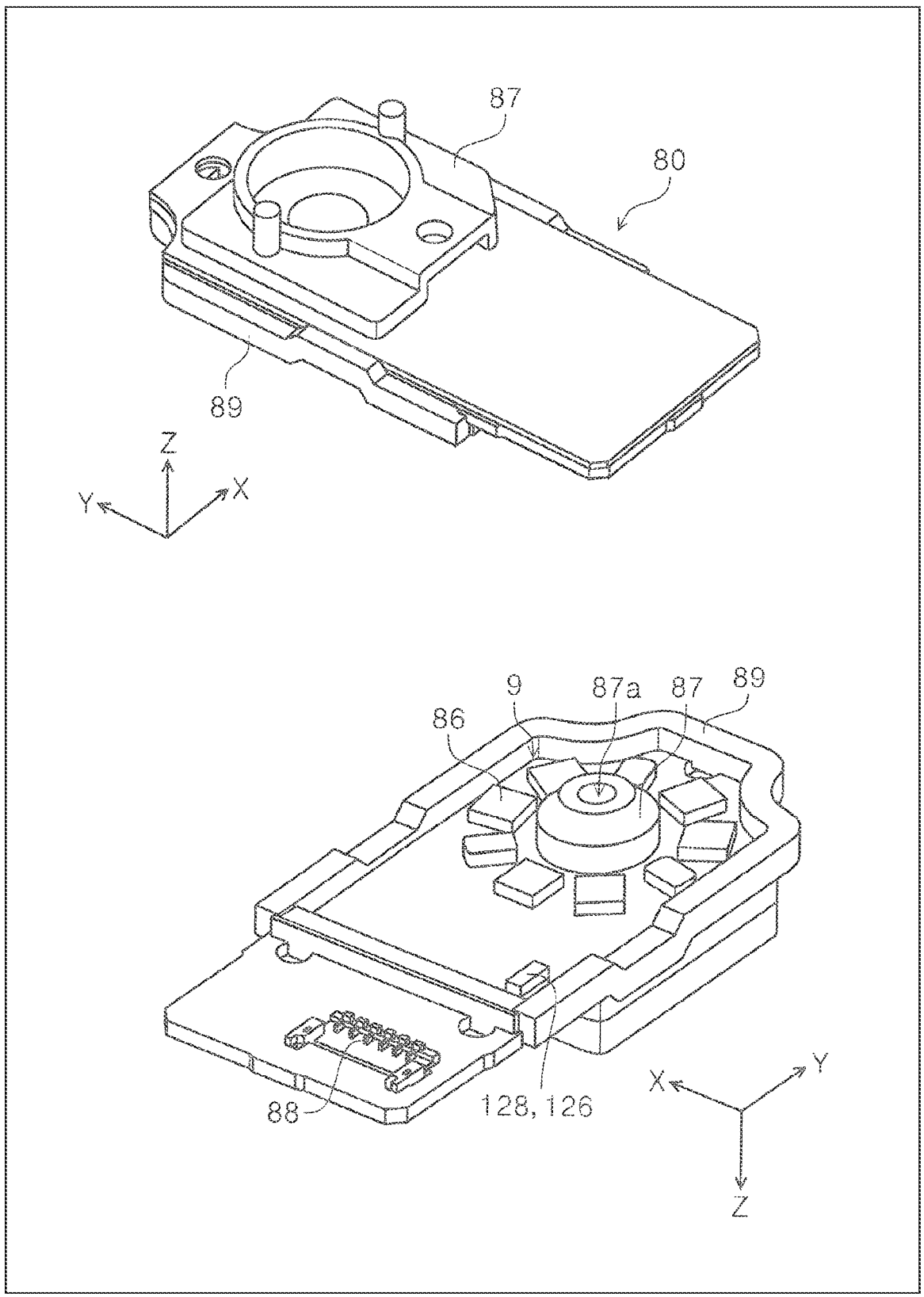

An upper part of FIG. 13 is a perspective view illustrating an upper surface of a light emission portion substrate, and a lower part of FIG. 13 is a perspective view illustrating a lower surface of the light emission portion substrate.

Figure 14:
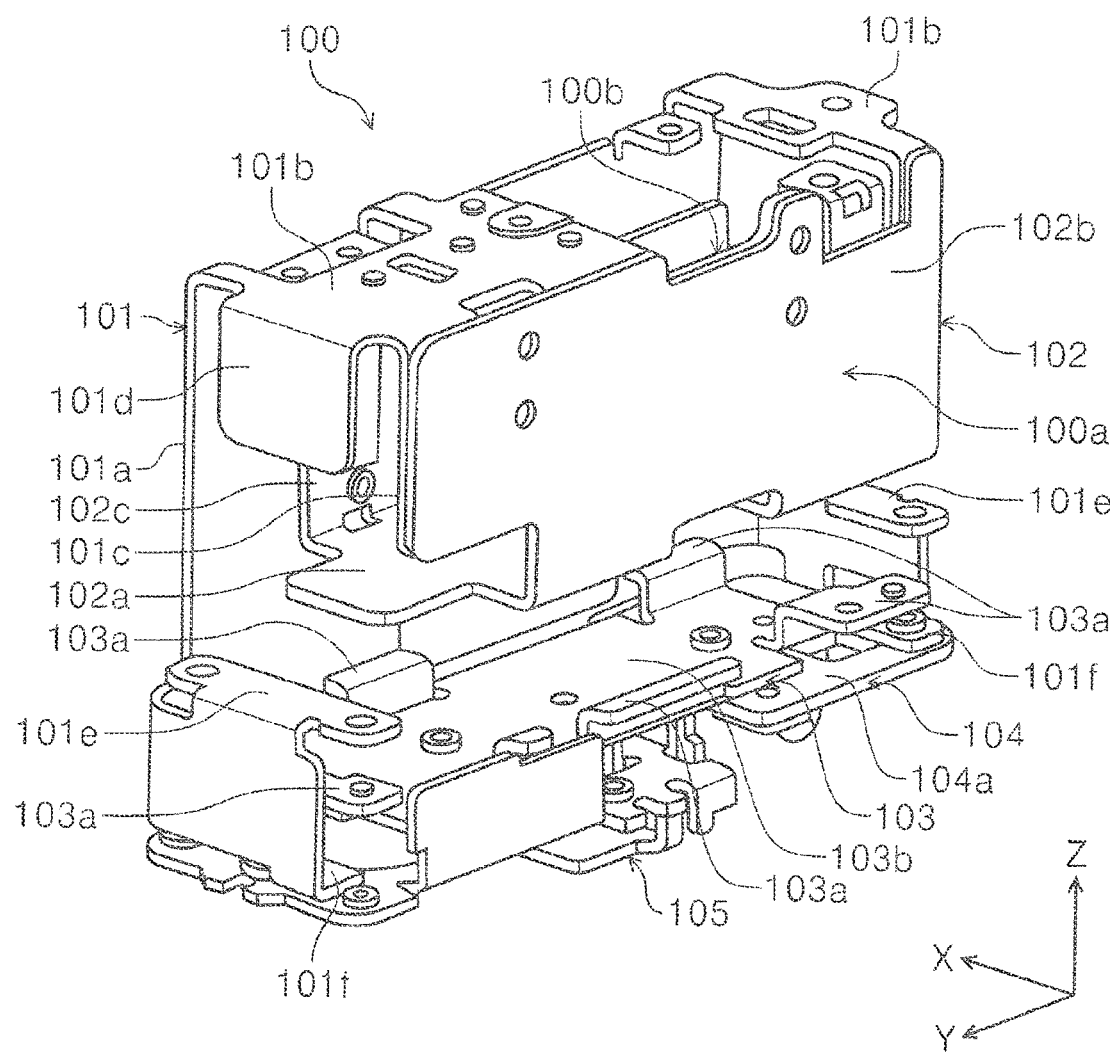

FIG. 14 is a perspective view of a frame assembly viewed from above.

Figure 15:
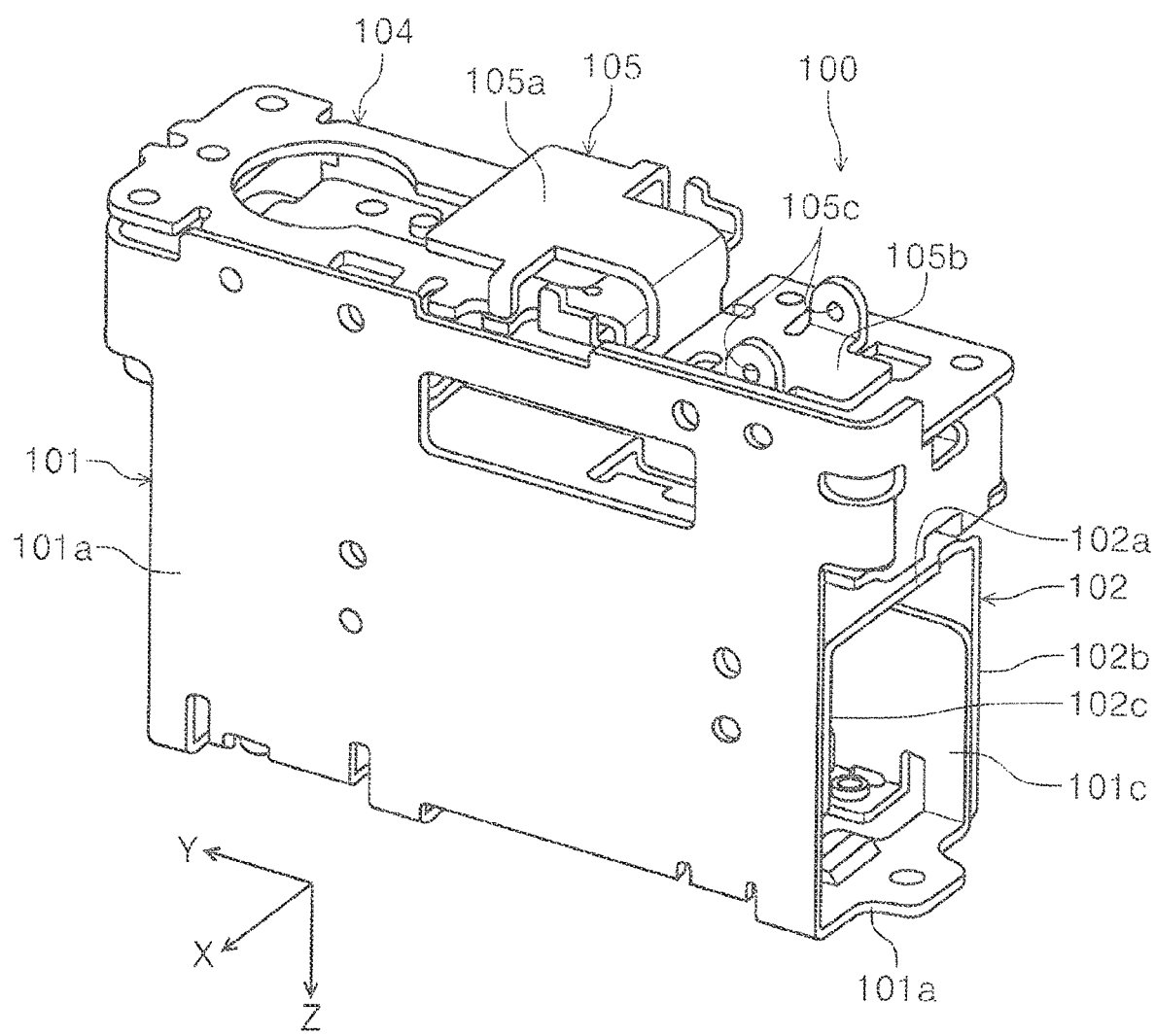

FIG. 15 is a perspective view of the frame assembly viewed from below.

Figure 16:
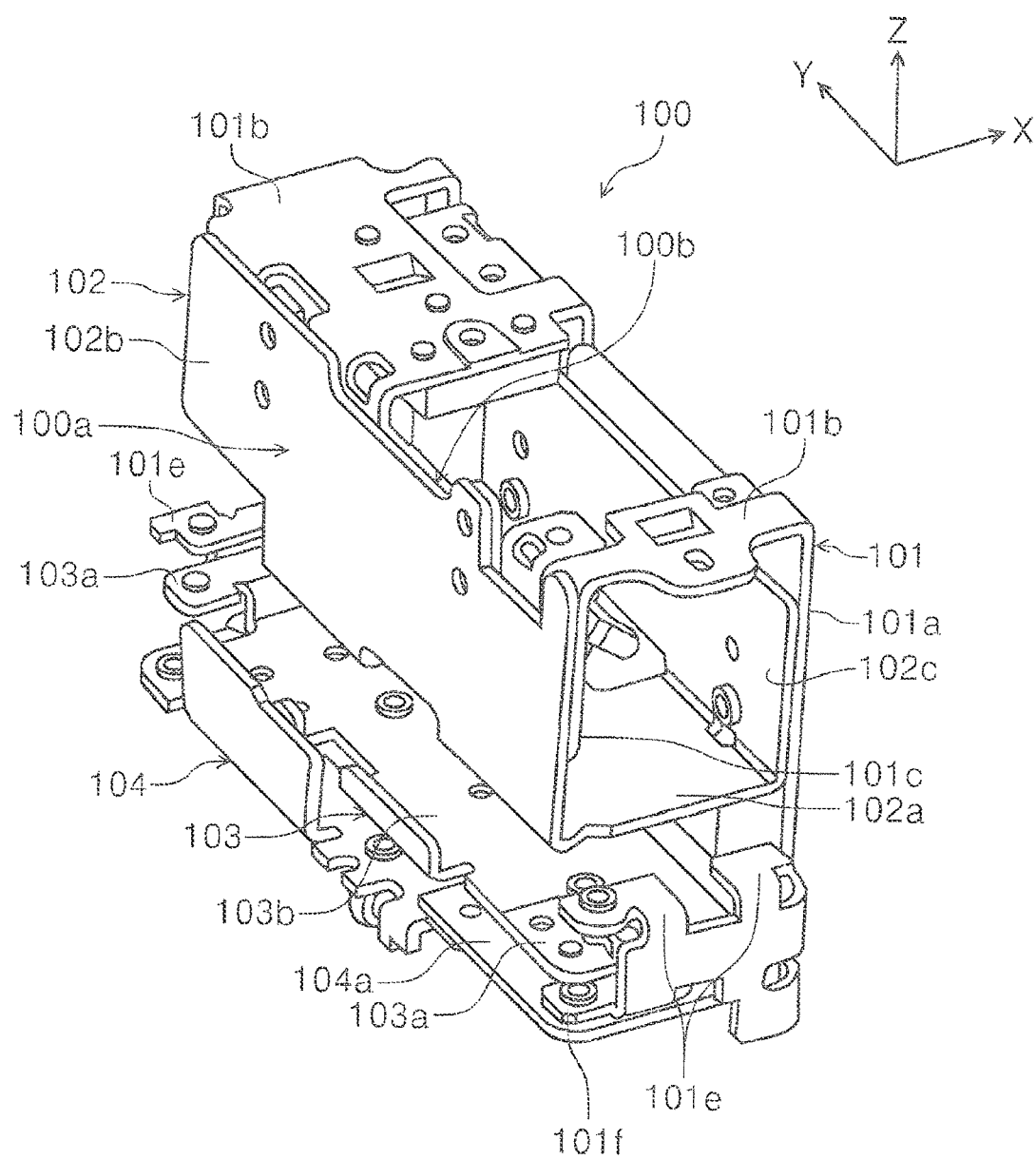

FIG. 16 is a perspective view of the frame assembly viewed from above.

Figure 17:
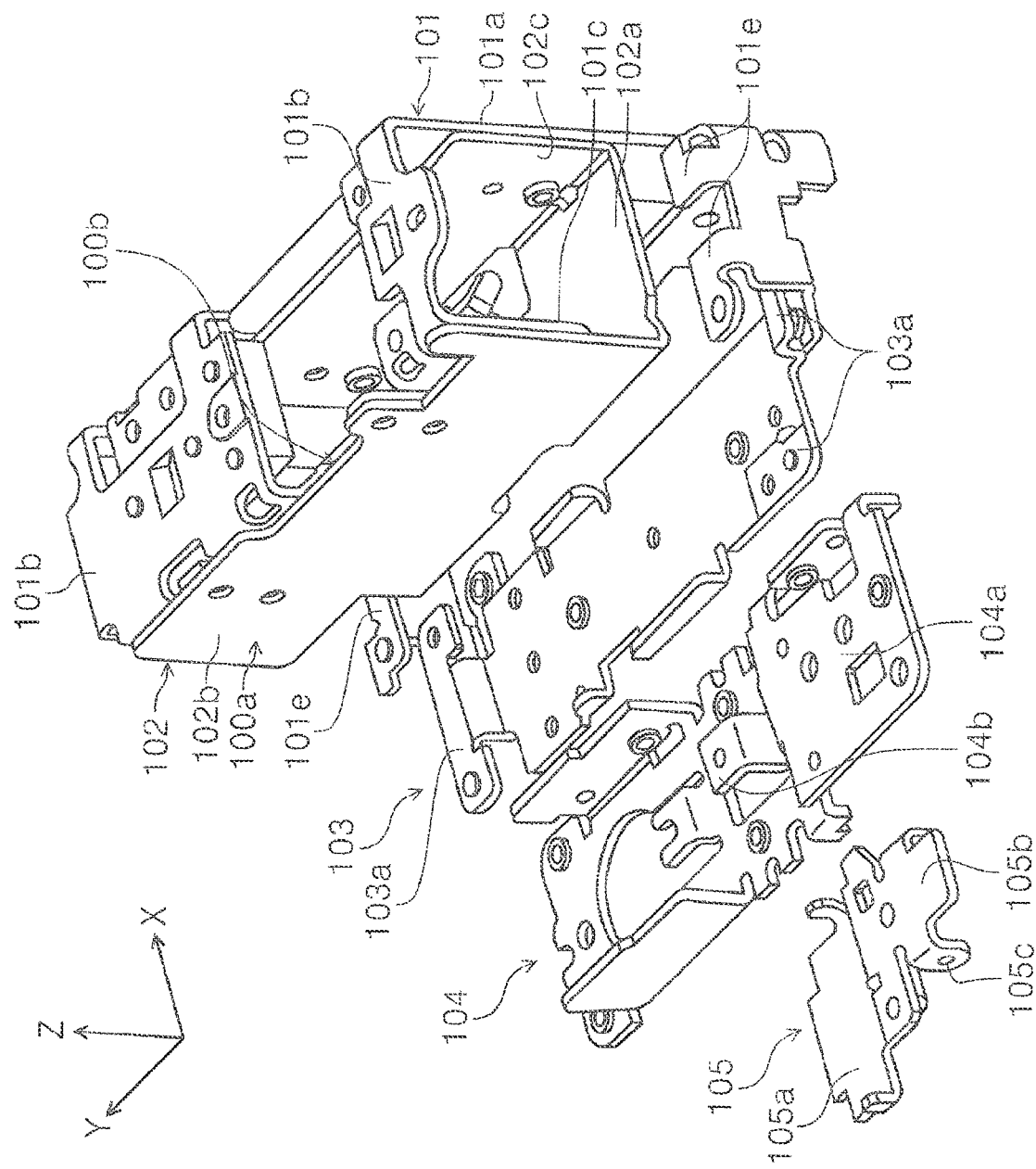

FIG. 17 is an exploded perspective view of the frame assembly.

Figure 18:
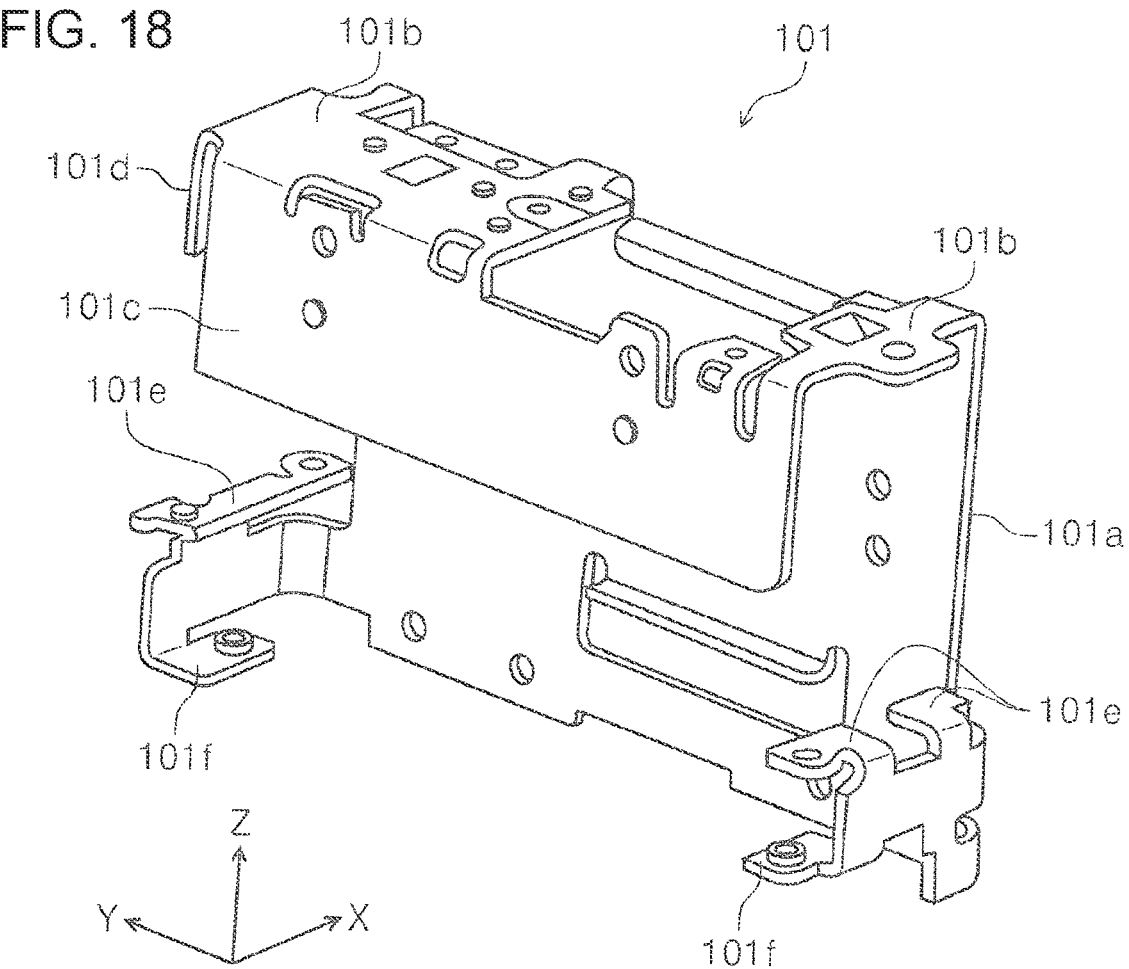

FIG. 18 is a perspective view of a main frame viewed from above.

Figure 19:
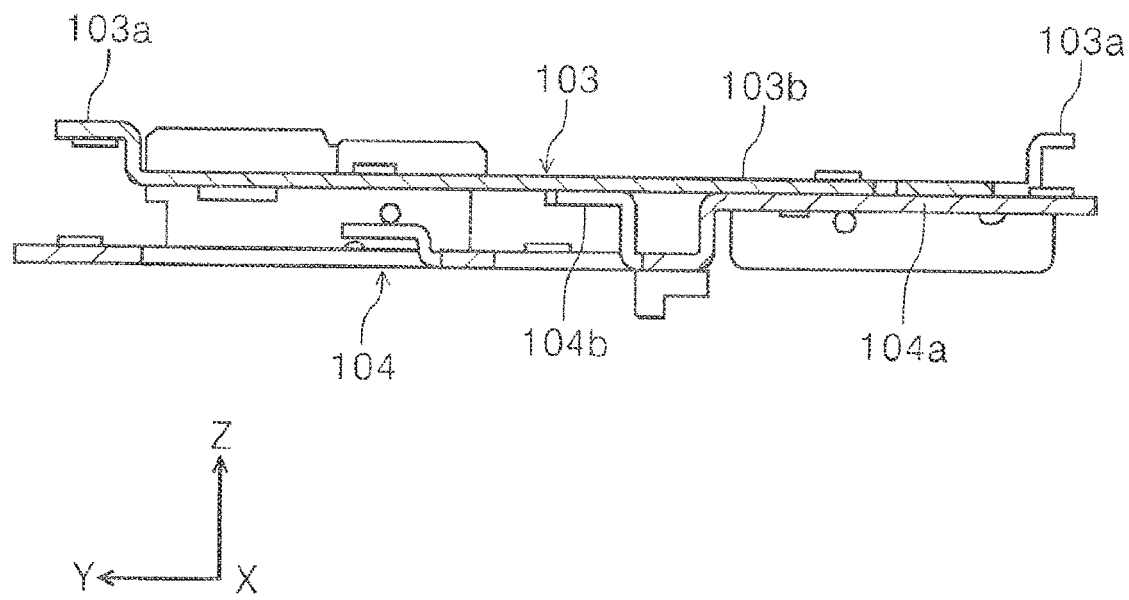

FIG. 19 is a cross-sectional view of a light reception portion substrate holding frame and a light emission portion substrate holding frame cut along a Y-Z plane.

Figure 5:
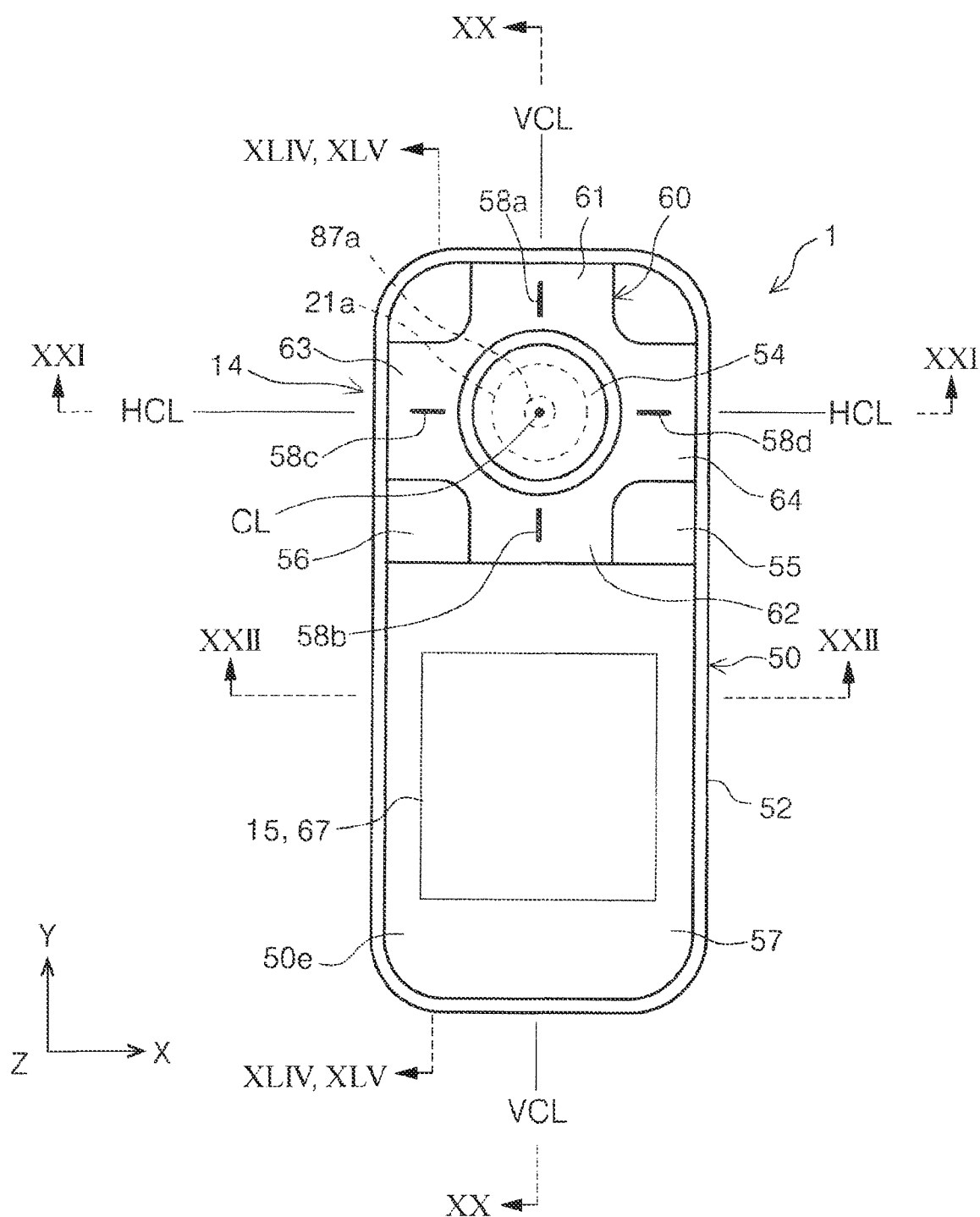
FIG. 5 is a plan view of the color measurement apparatus viewed from above.
Figure 20:
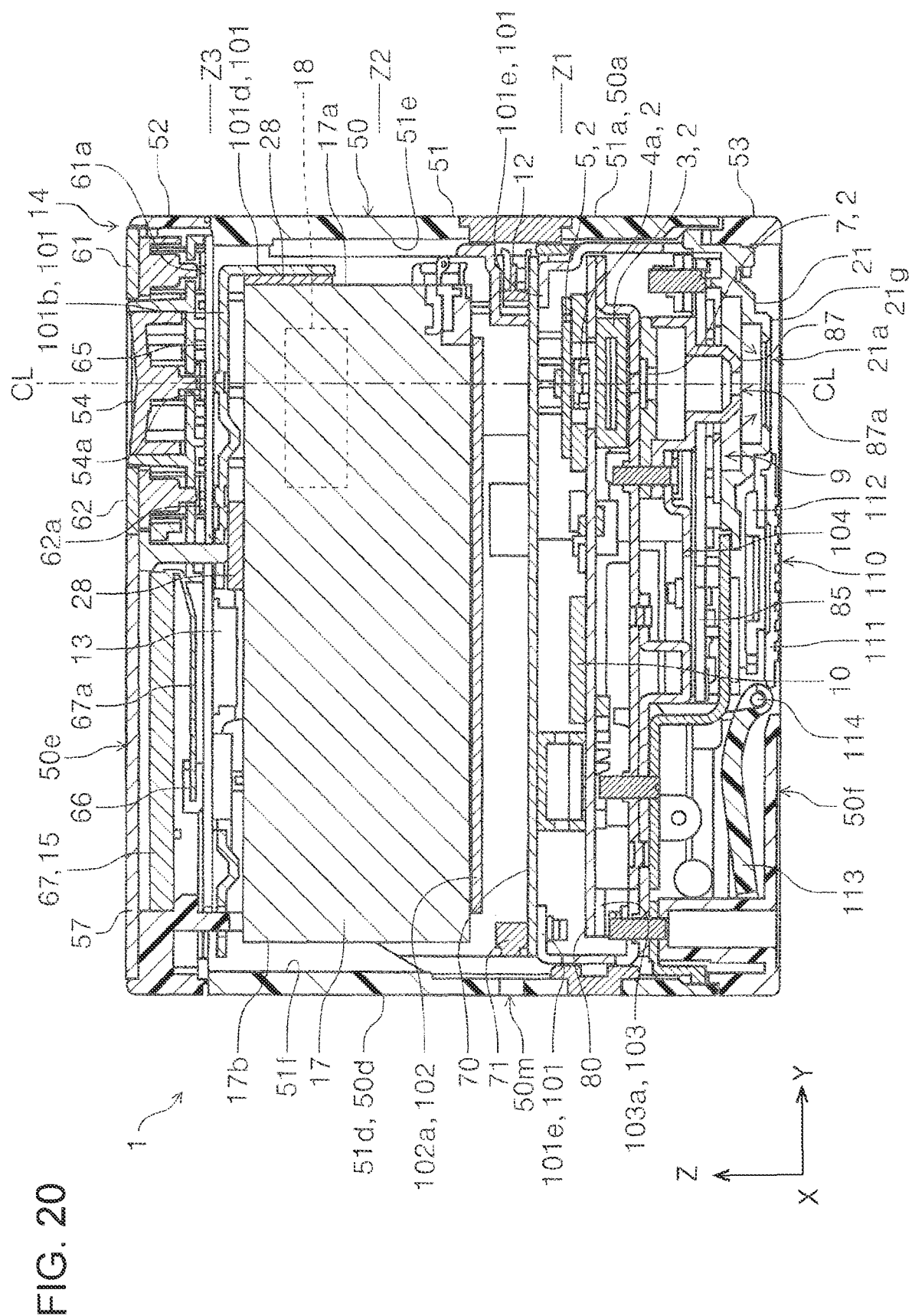

FIG. 20 is XX-XX cross-sectional view in FIG. 5.

Figure 21:
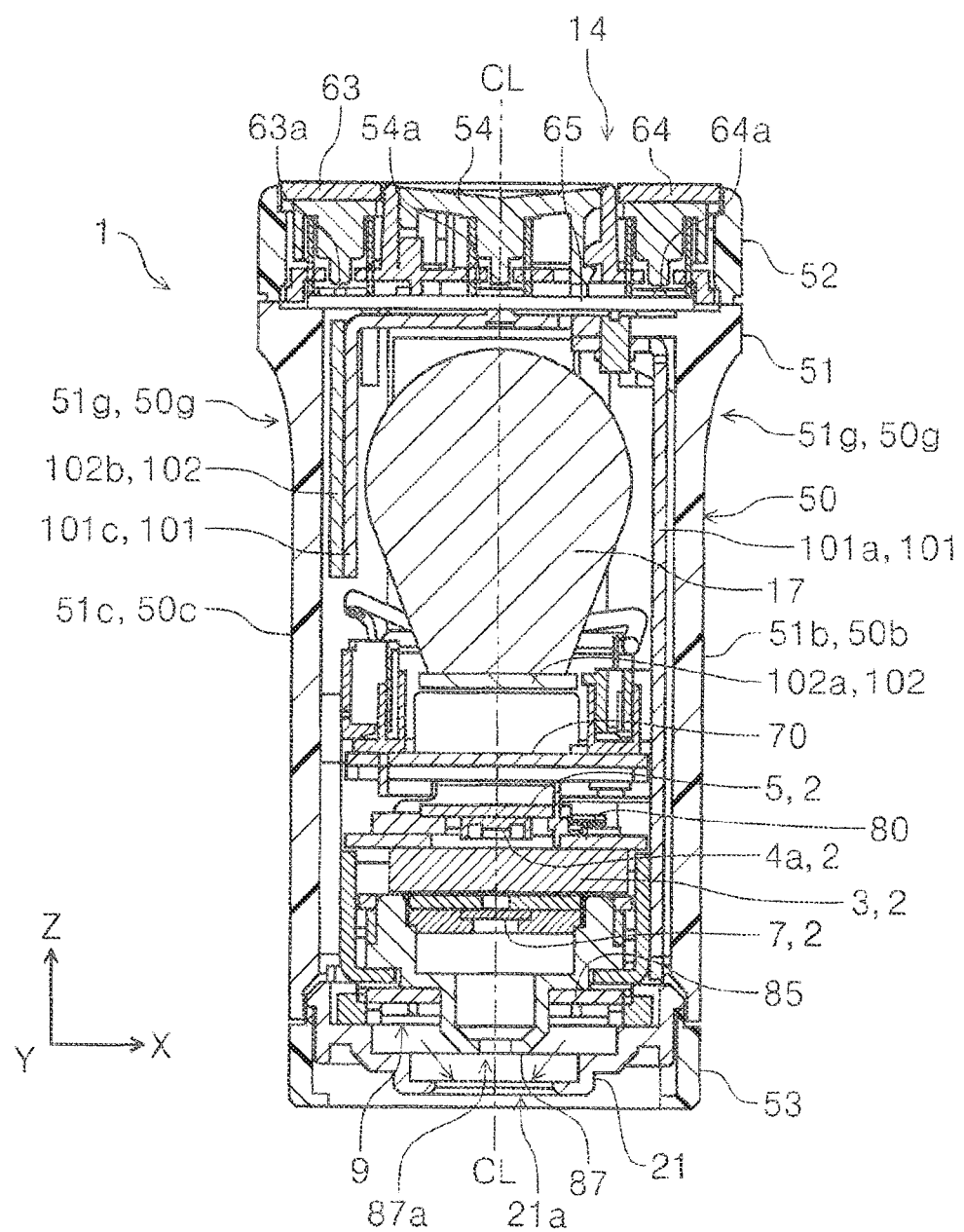

FIG. 21 is XXI-XXI cross-sectional view in FIG. 5.

Figure 22:
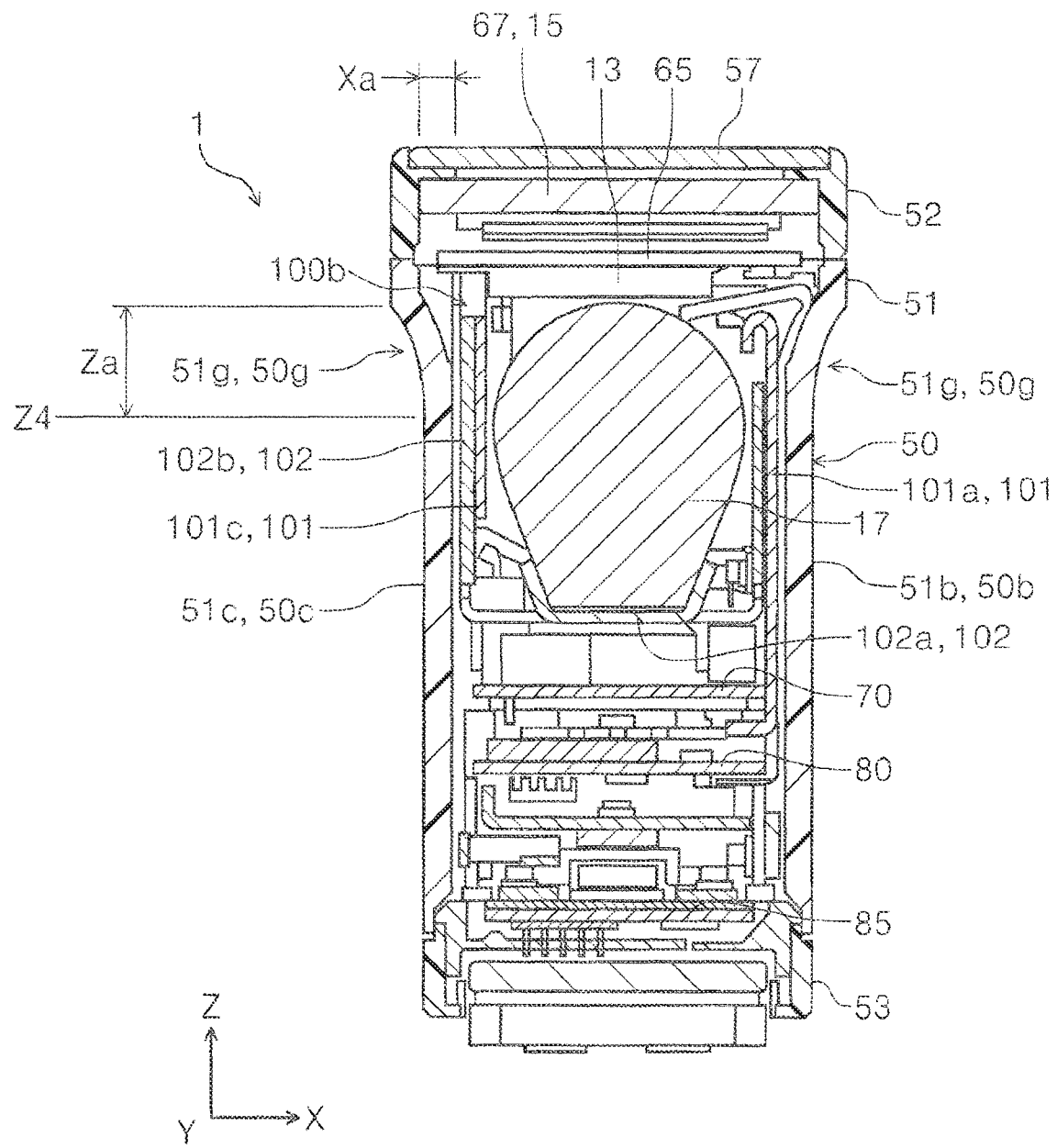

FIG. 22 is XXII-XXII cross-sectional view in FIG. 5.

Figure 23:
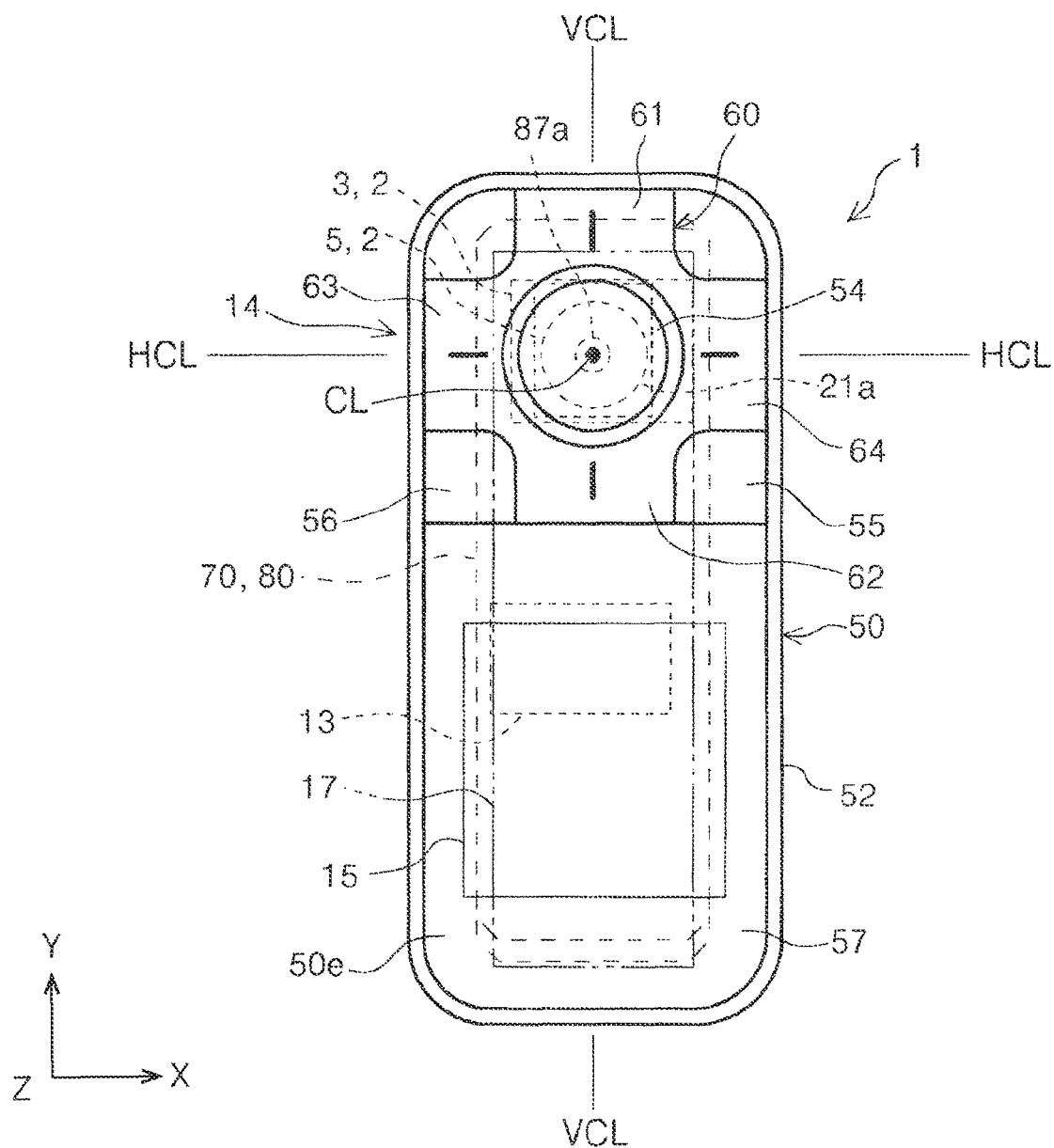

FIG. 23 is a plan view of the color measurement apparatus viewed from above.

Figure 24:
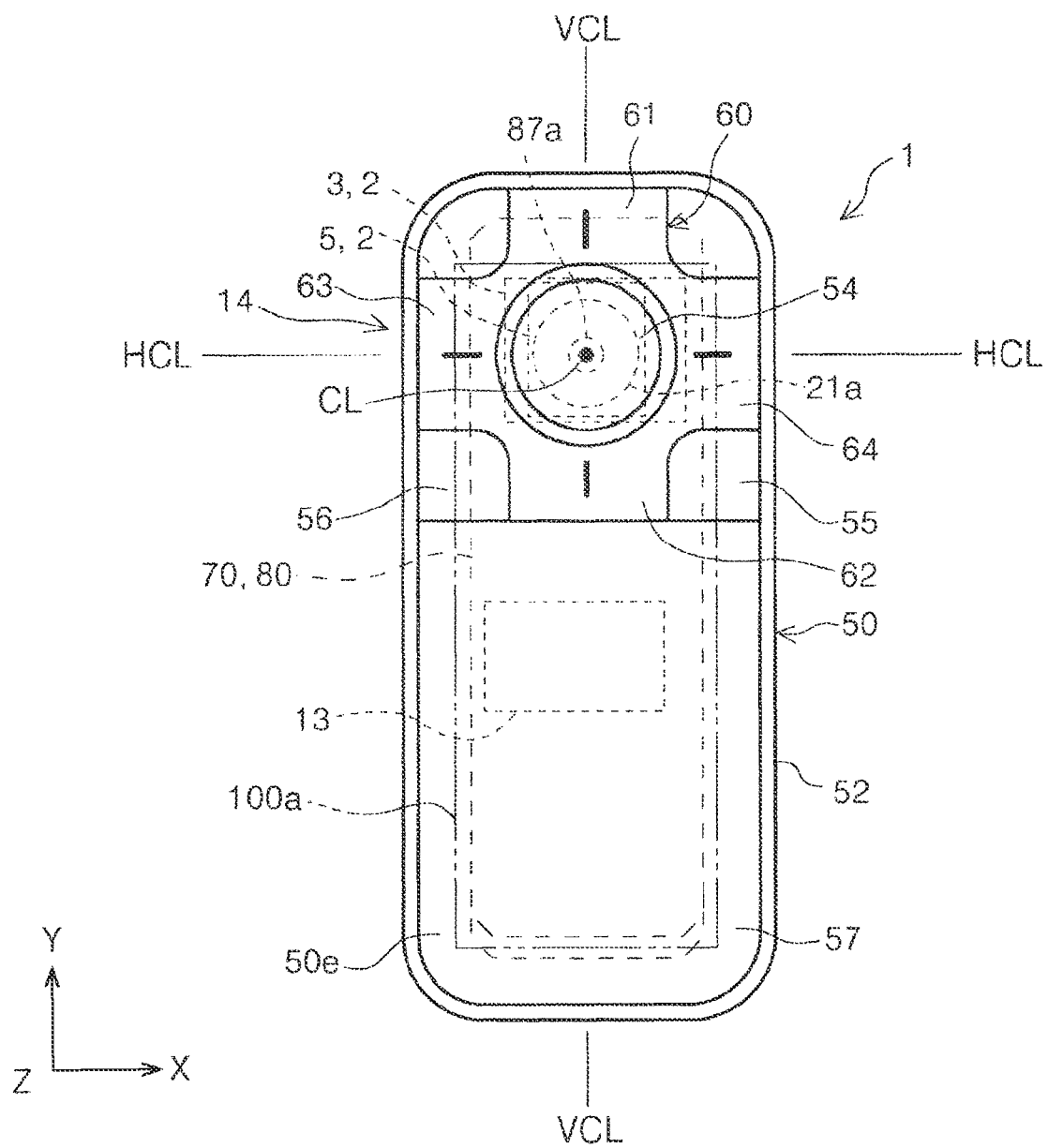

FIG. 24 is a plan view of the color measurement apparatus viewed from above.

Figure 25:
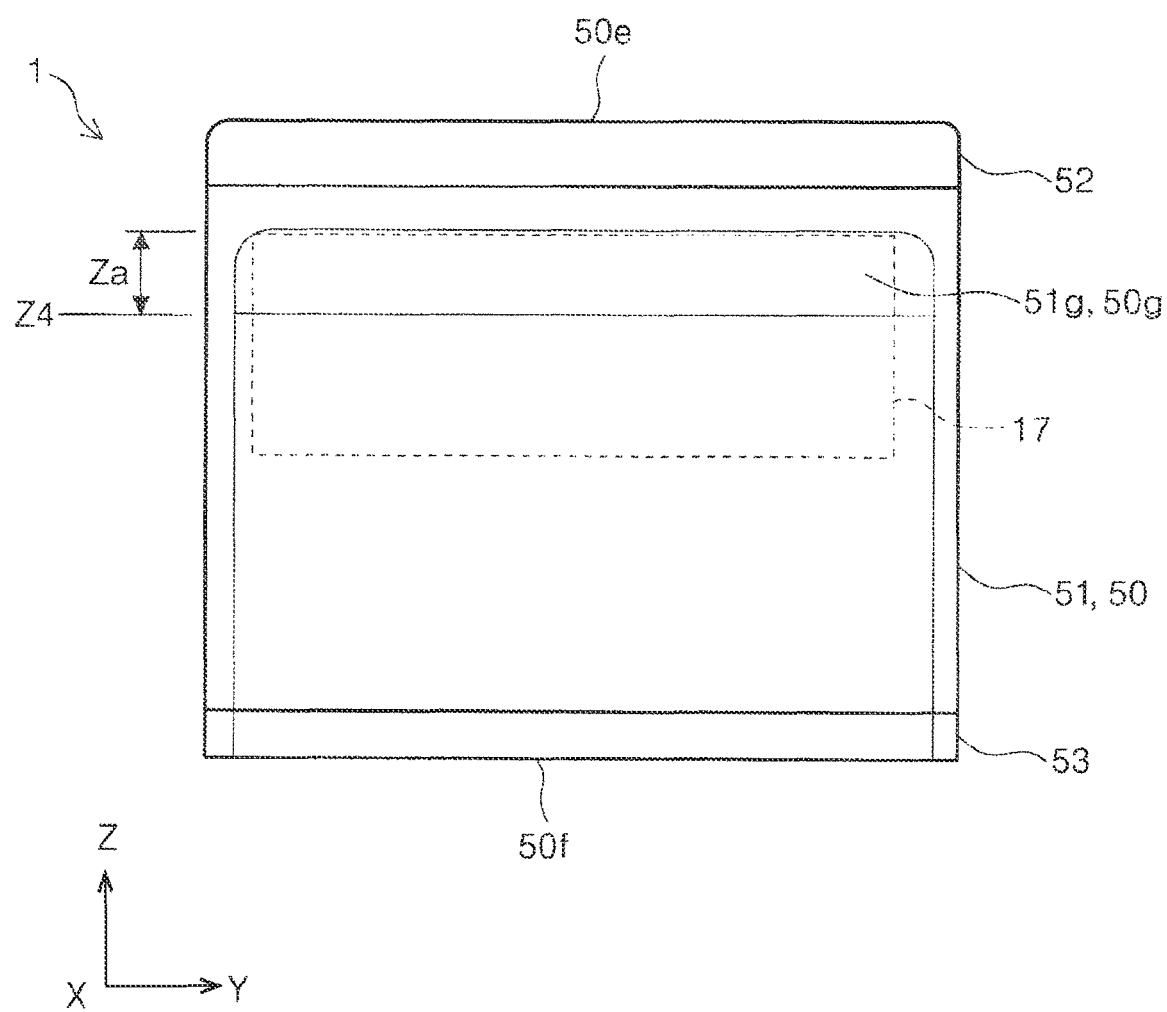

FIG. 25 is a side view of the color measurement apparatus.

Figure 26:
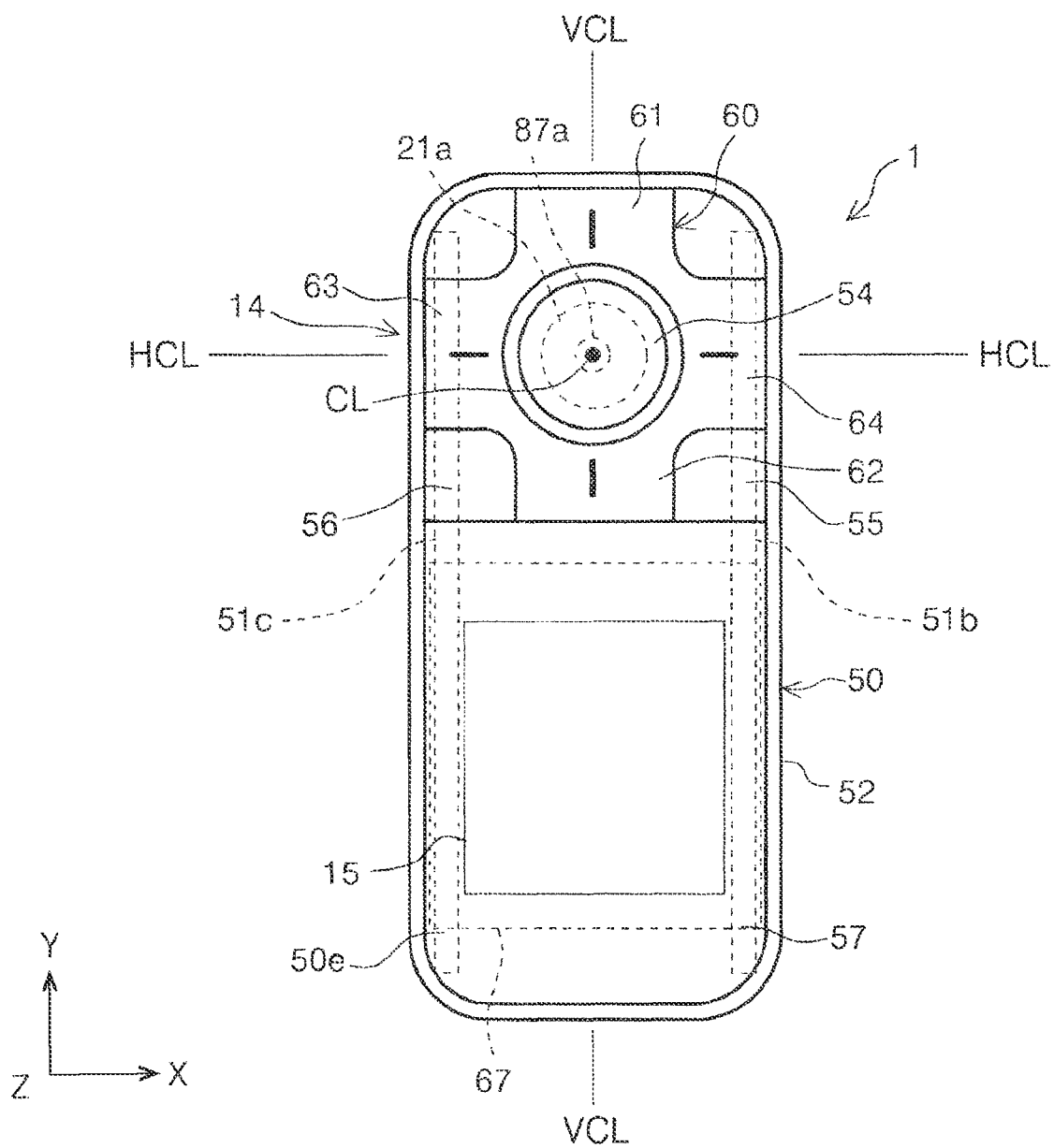

FIG. 26 is a plan view of the color measurement apparatus viewed from above.

Figure 27:
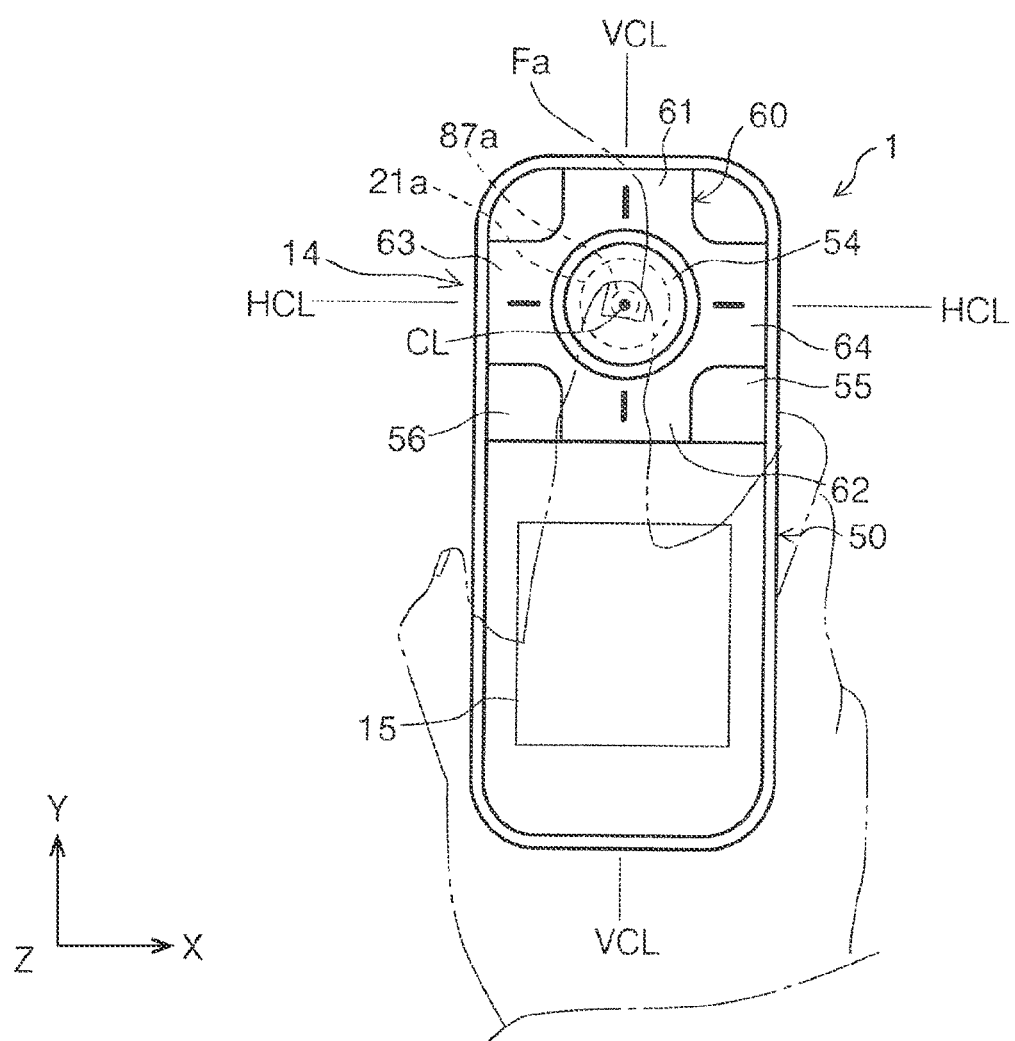

FIG. 27 is a plan view of the color measurement apparatus viewed from above.

Figure 28:
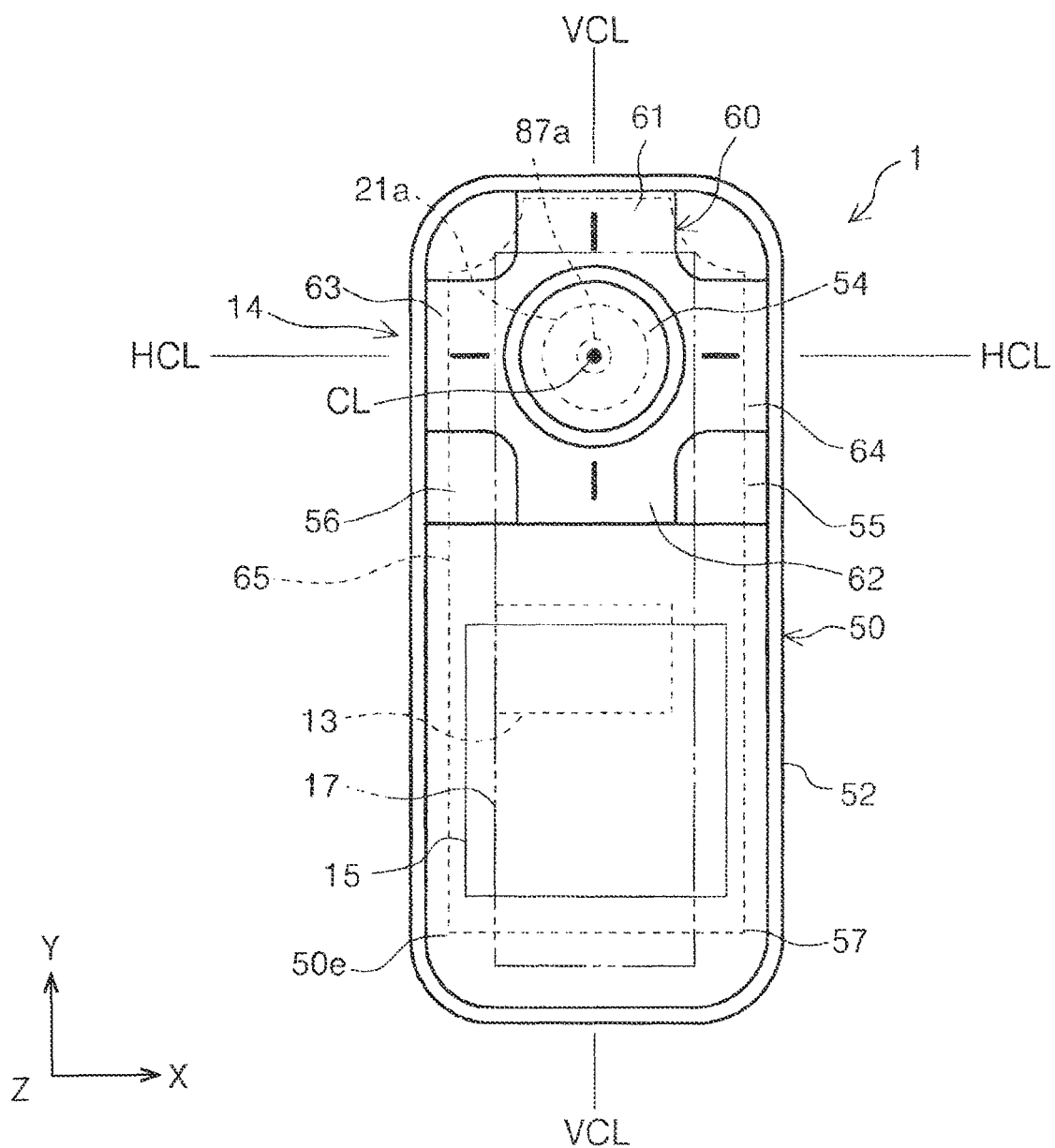

FIG. 28 is a plan view of the color measurement apparatus viewed from above.

Figure 29:
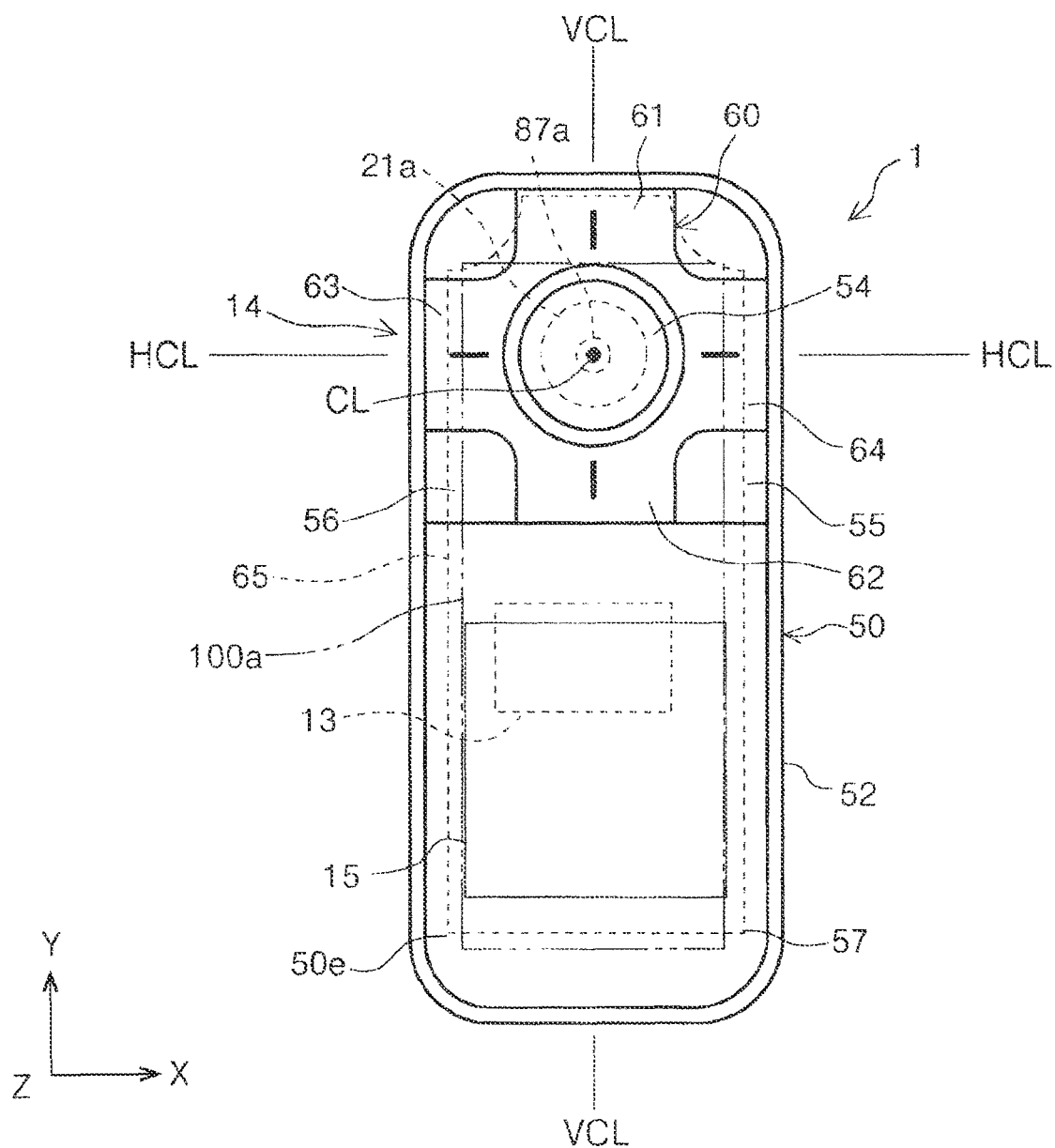

FIG. 29 is a plan view of the color measurement apparatus viewed from above.

Figure 30:
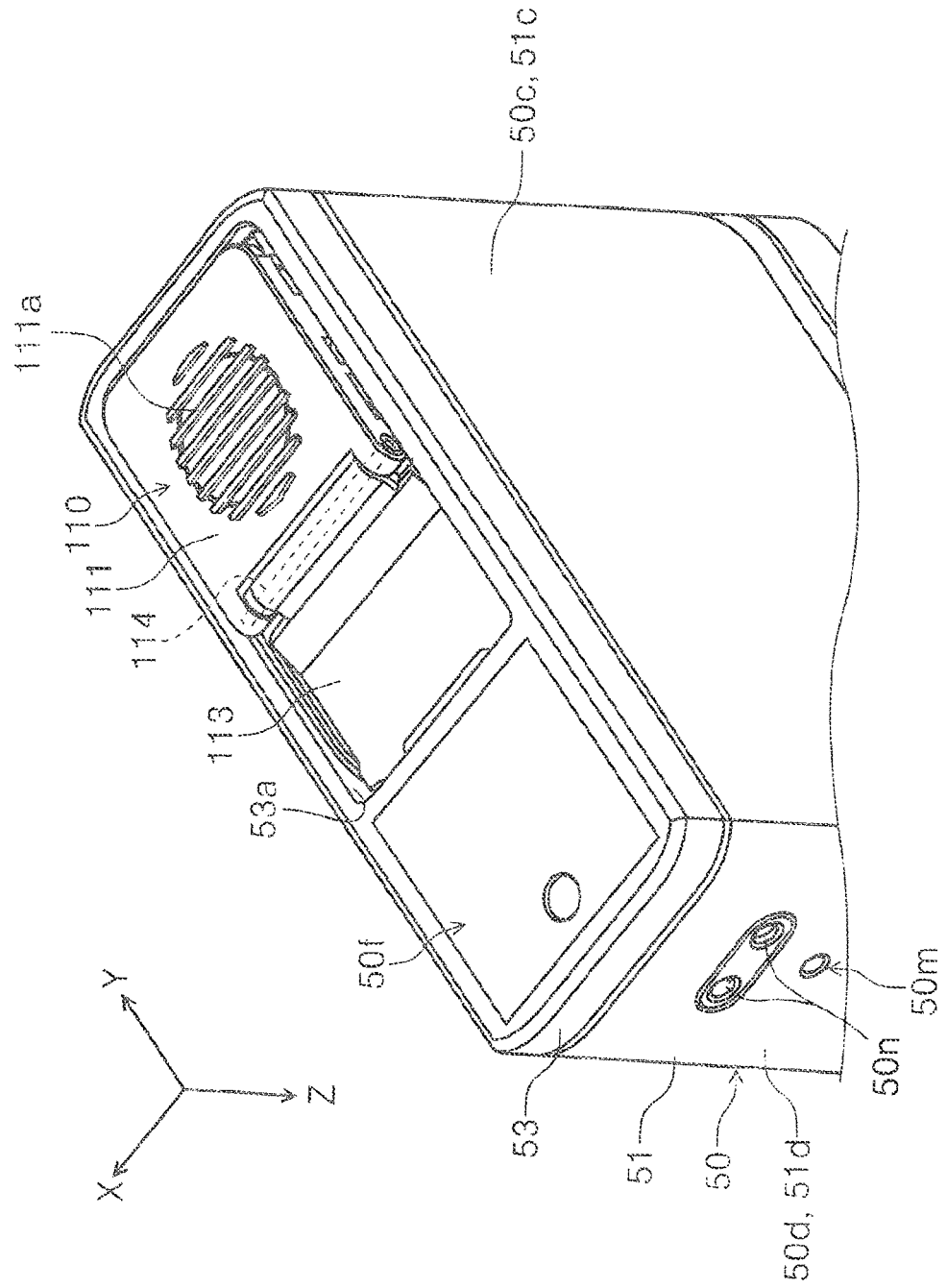

FIG. 30 is a perspective view of the color measurement apparatus viewed from below and is a diagram in which a shutter unit is at a closed position.

Figure 31:
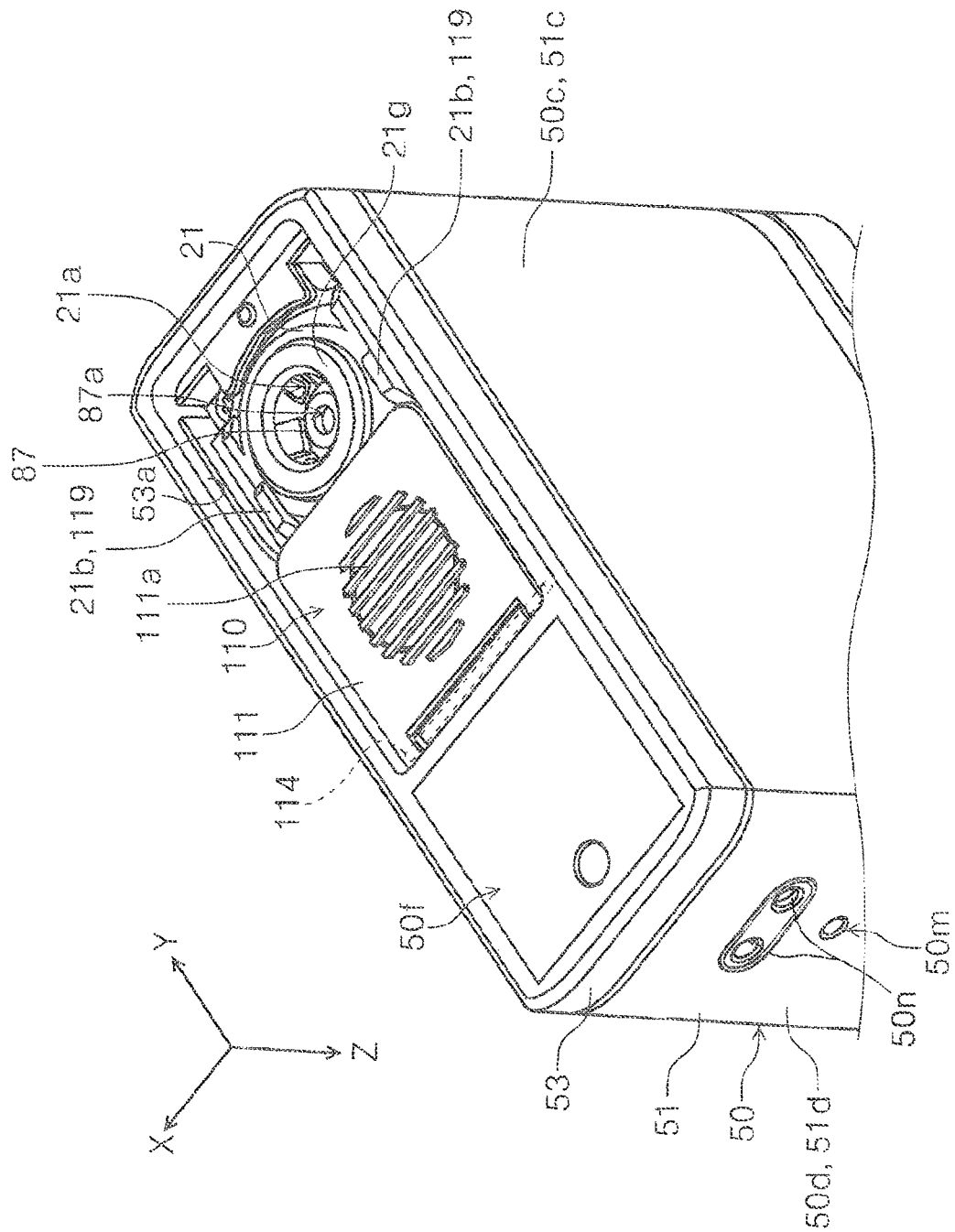

FIG. 31 is a perspective view of the color measurement apparatus viewed from below and is a diagram in which the shutter unit is at an open position.

Figure 32:
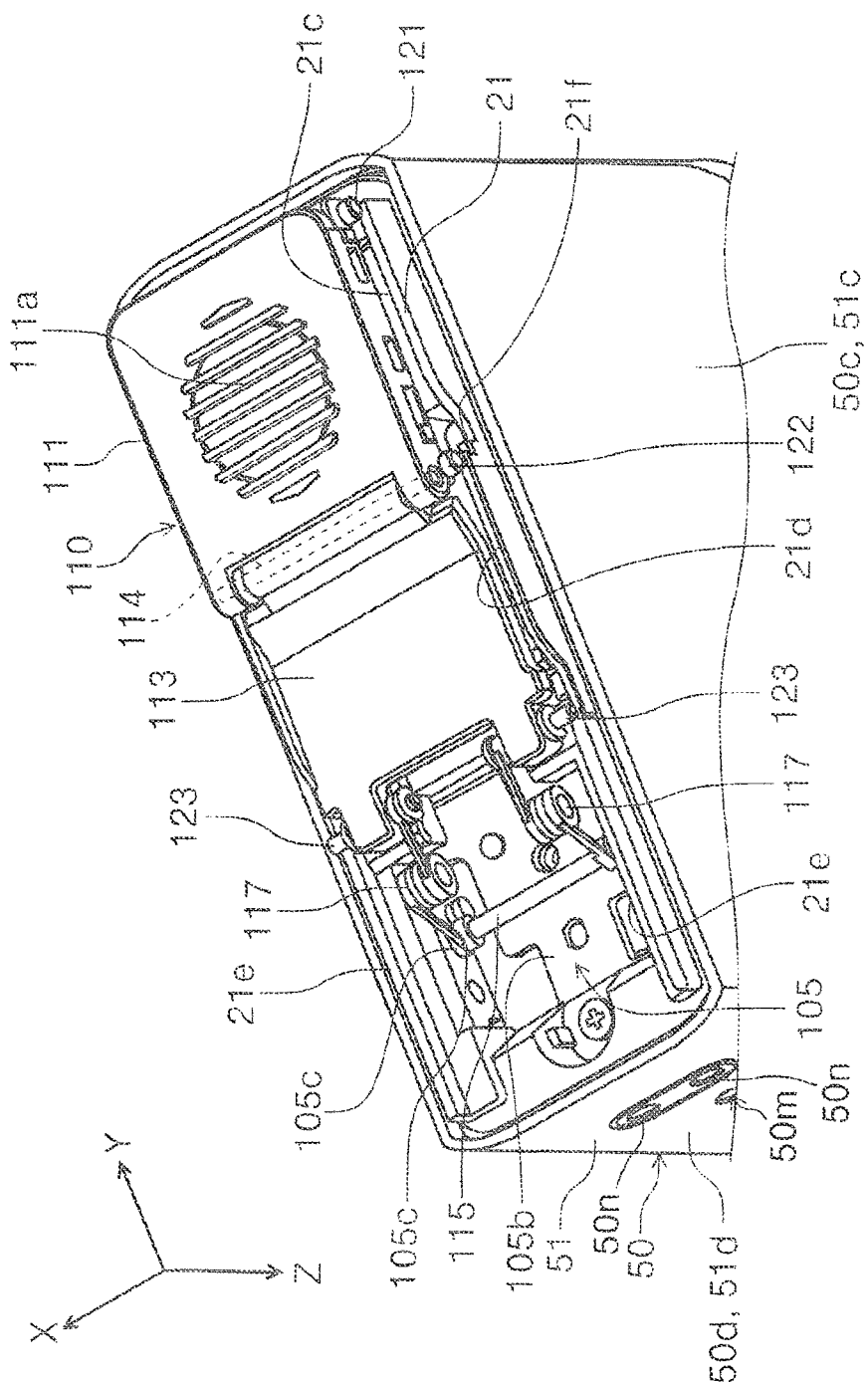

FIG. 32 is a perspective view, viewed from below, of the color measurement apparatus from which a bottom casing is detached, and is a diagram in which the shutter unit is at the closed position.

Figure 33:
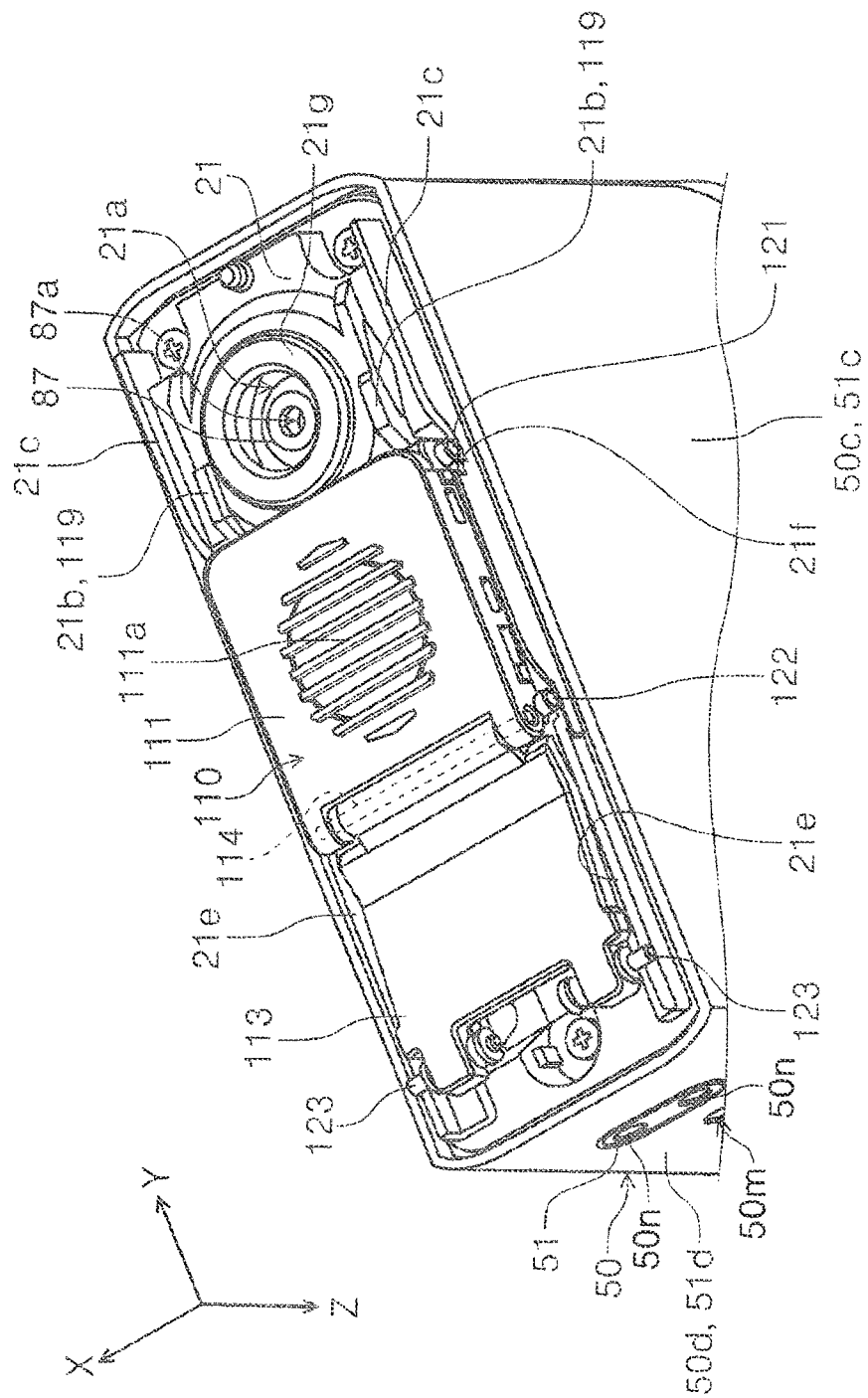

FIG. 33 is a perspective view, viewed from below, of the color measurement apparatus from which the bottom casing is detached, and is a diagram in which the shutter unit is at the open position.

Figure 6:
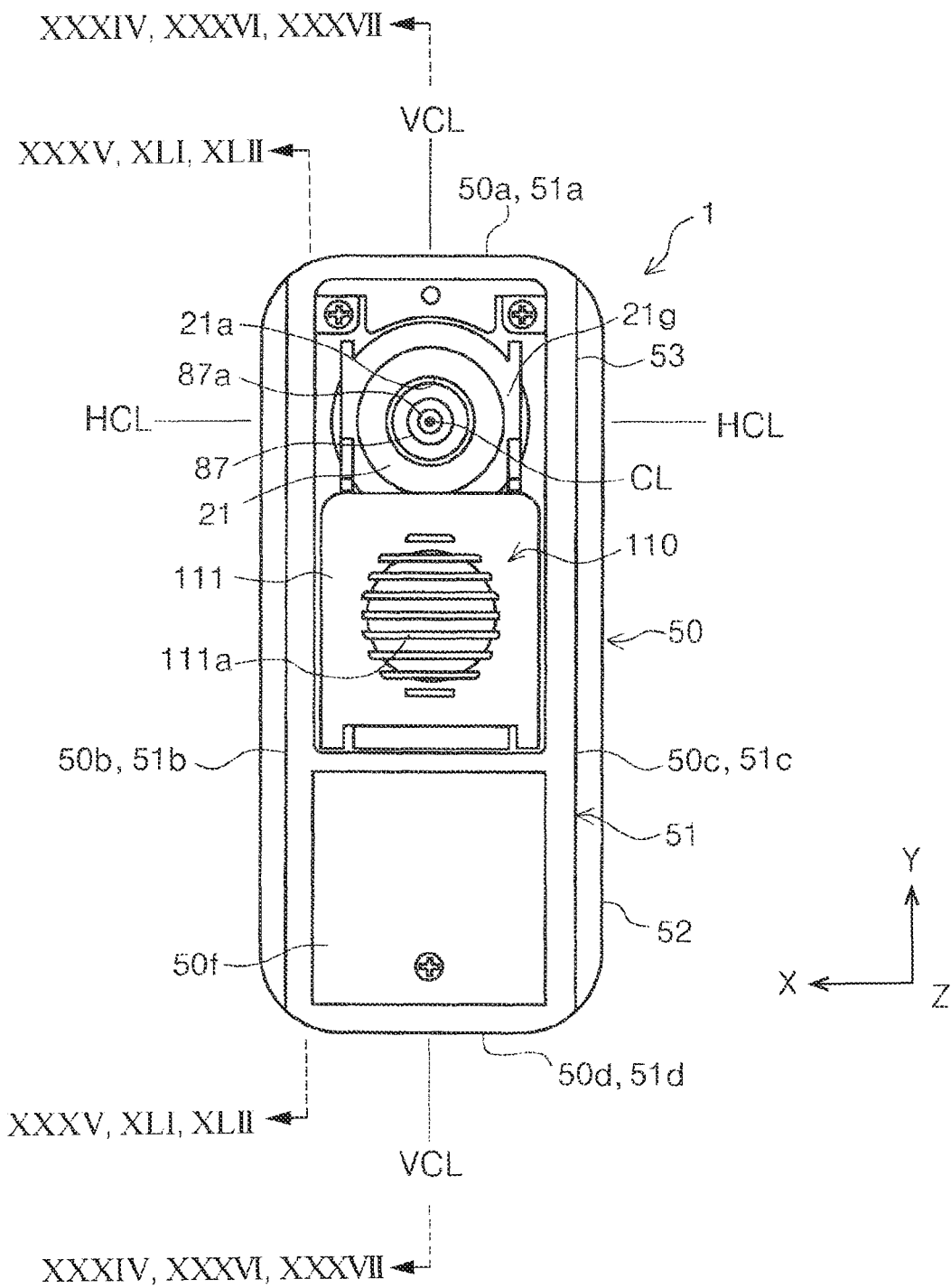
FIG. 6 is a plan view of the color measurement apparatus viewed from below.
Figure 34:
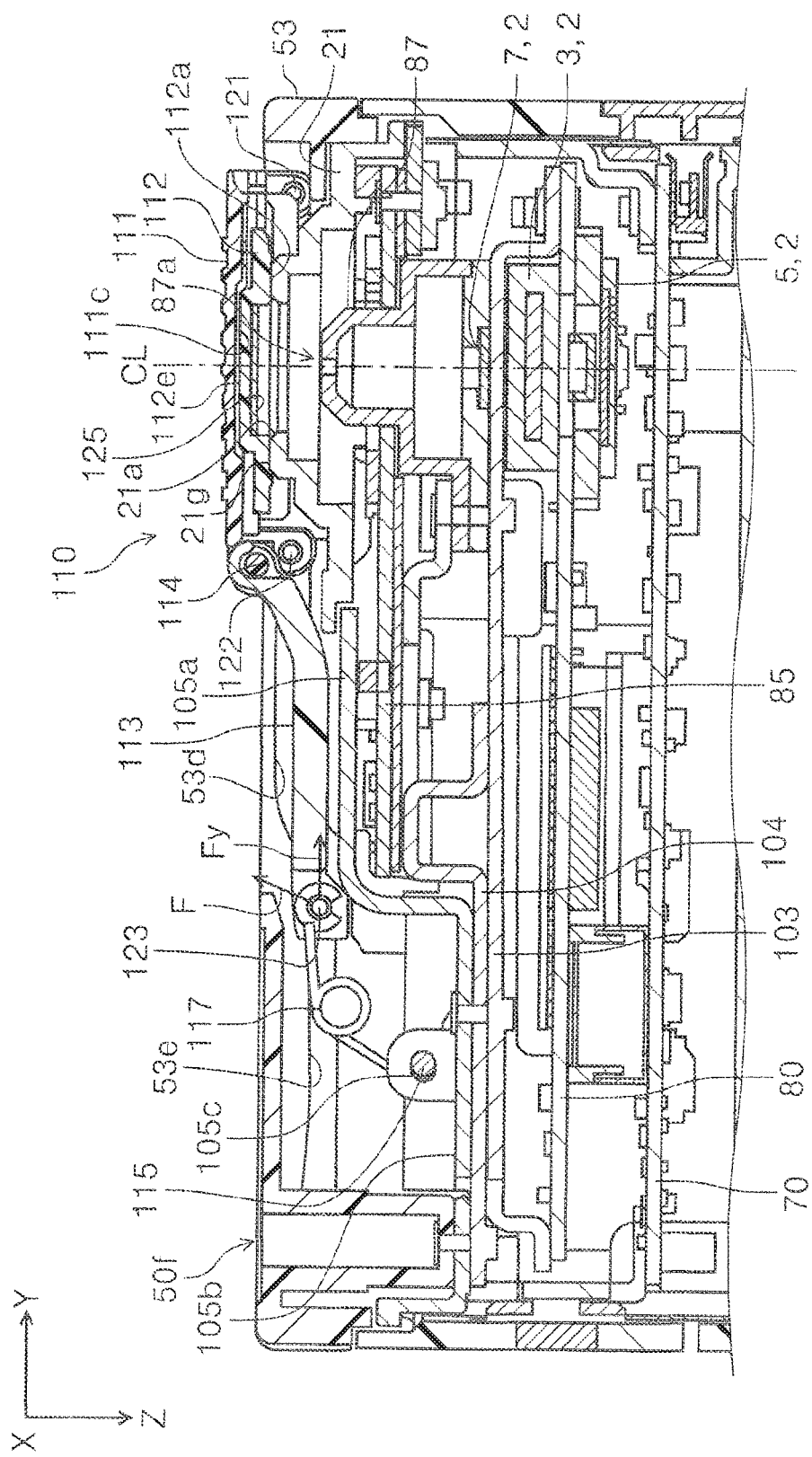

FIG. 34 is a diagram corresponding to a part of XXXIV-XXXIV cross section in FIG. 6 and is a diagram in which the shutter unit is at the closed position.

Figure 35:
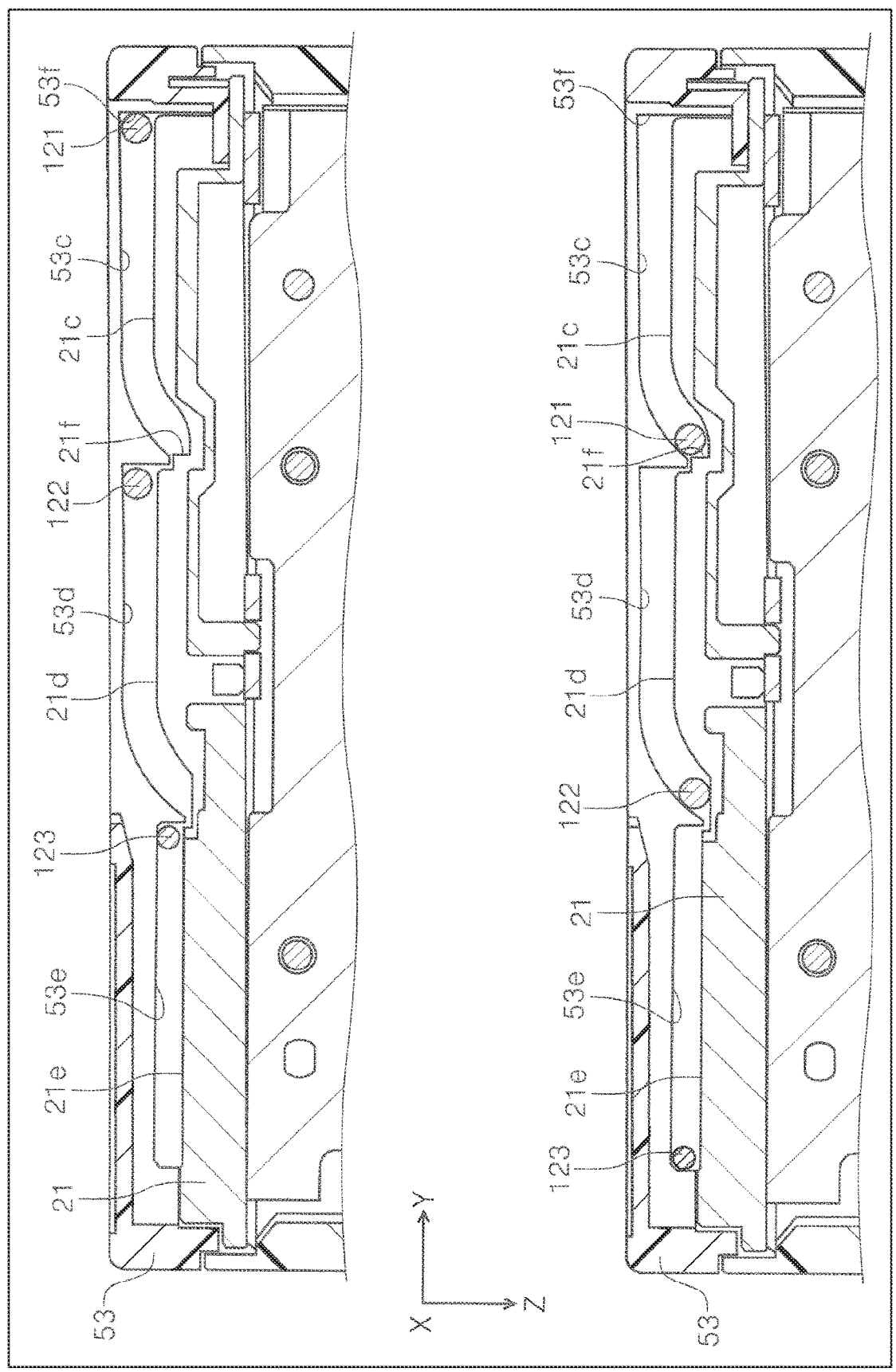

FIG. 35 is a diagram corresponding to a part of XXXV-XXXV cross section in FIG. 6: an upper part of FIG. 35 is a diagram in which the shutter unit is at the closed position, and a lower part of FIG. 35 is a diagram in which the shutter unit is at the open position.

Figure 36:
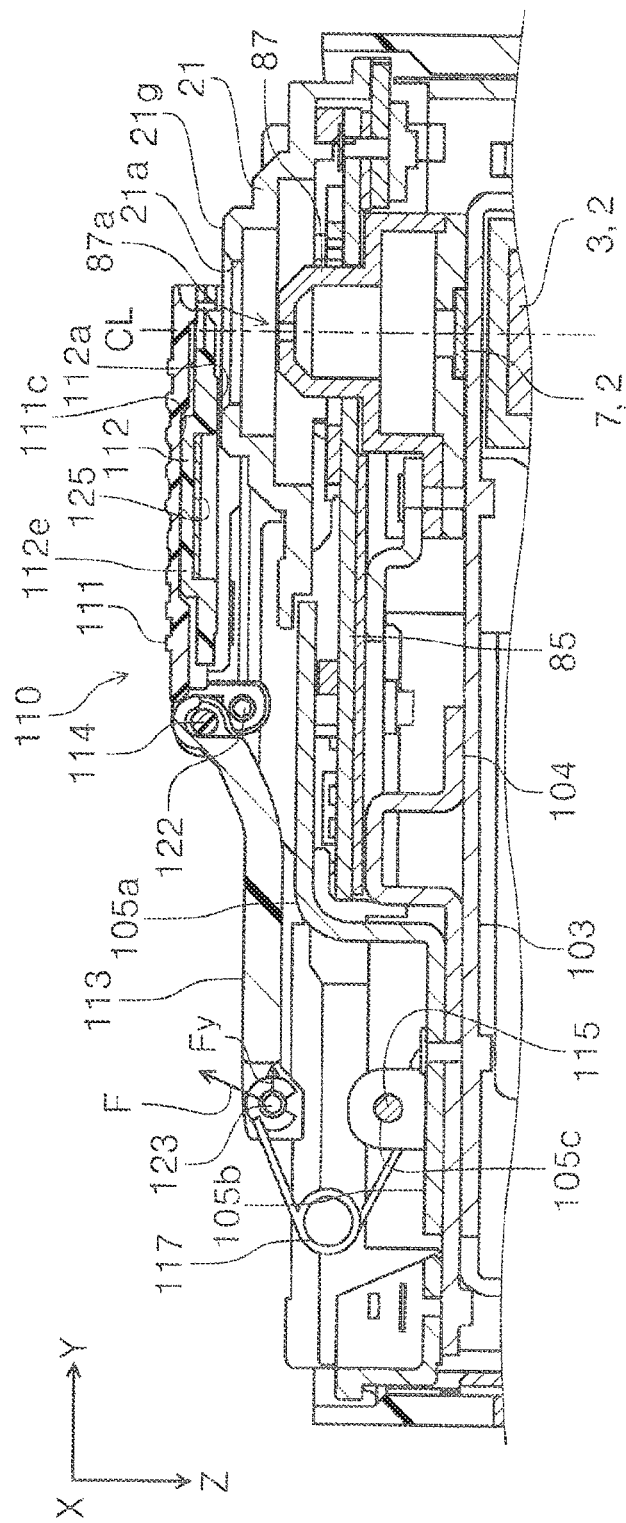

FIG. 36 is a diagram corresponding to a part of XXXVI-XXXVI cross section in FIG. 6 and is a diagram illustrating, without the bottom casing, a state where the shutter unit is further in a −Y direction than the closed position.

Figure 37:
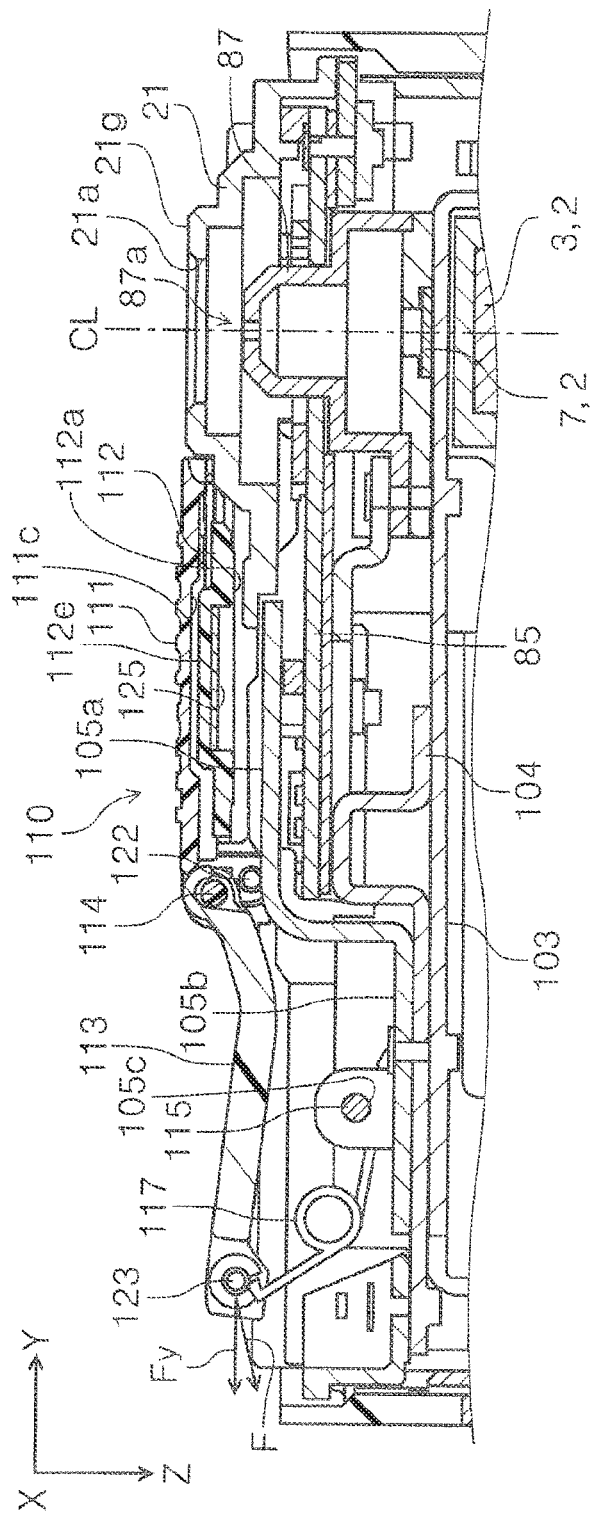

FIG. 37 is a diagram corresponding to a part of XXXVII-XXXVII cross section in FIG. 6 and is a diagram illustrating, without the bottom casing, a state where the shutter unit is at the open position.

Figure 38:
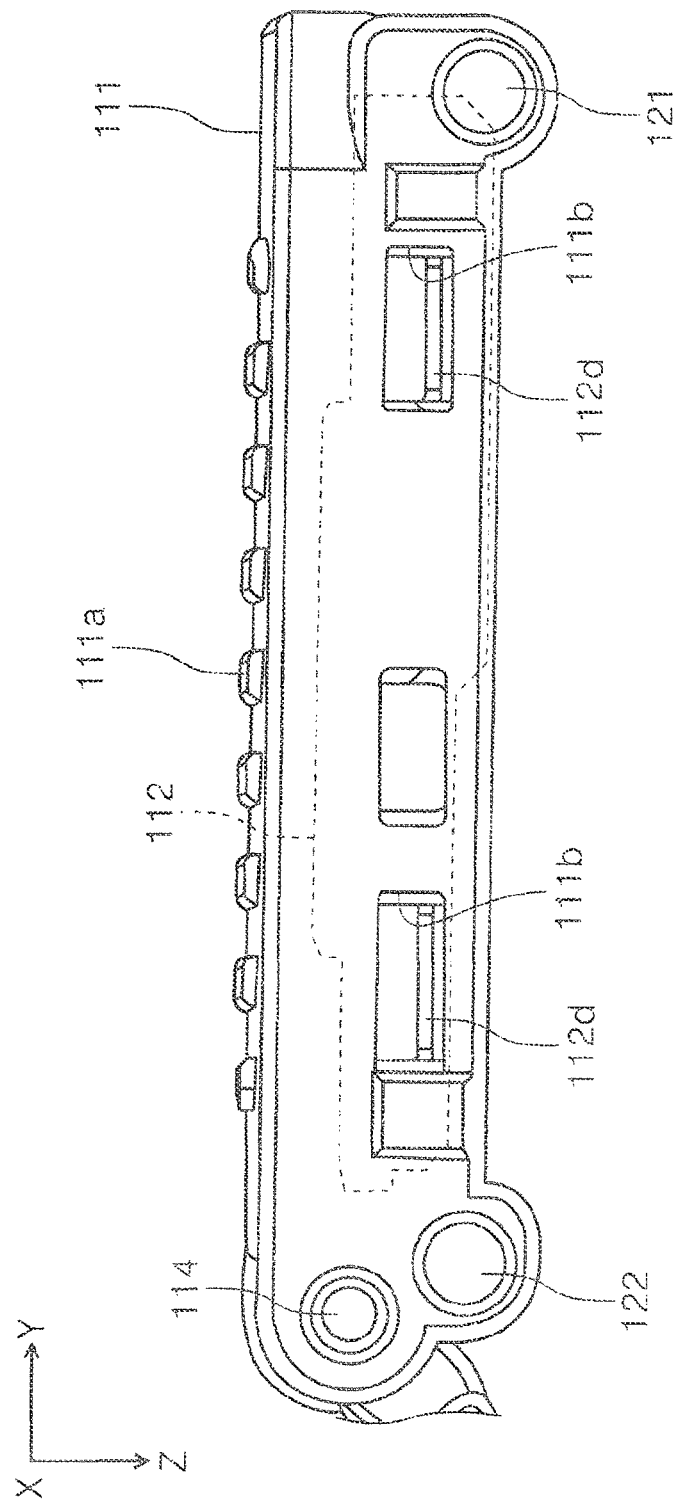

FIG. 38 is a side view of a shutter holding member.

Figure 39:
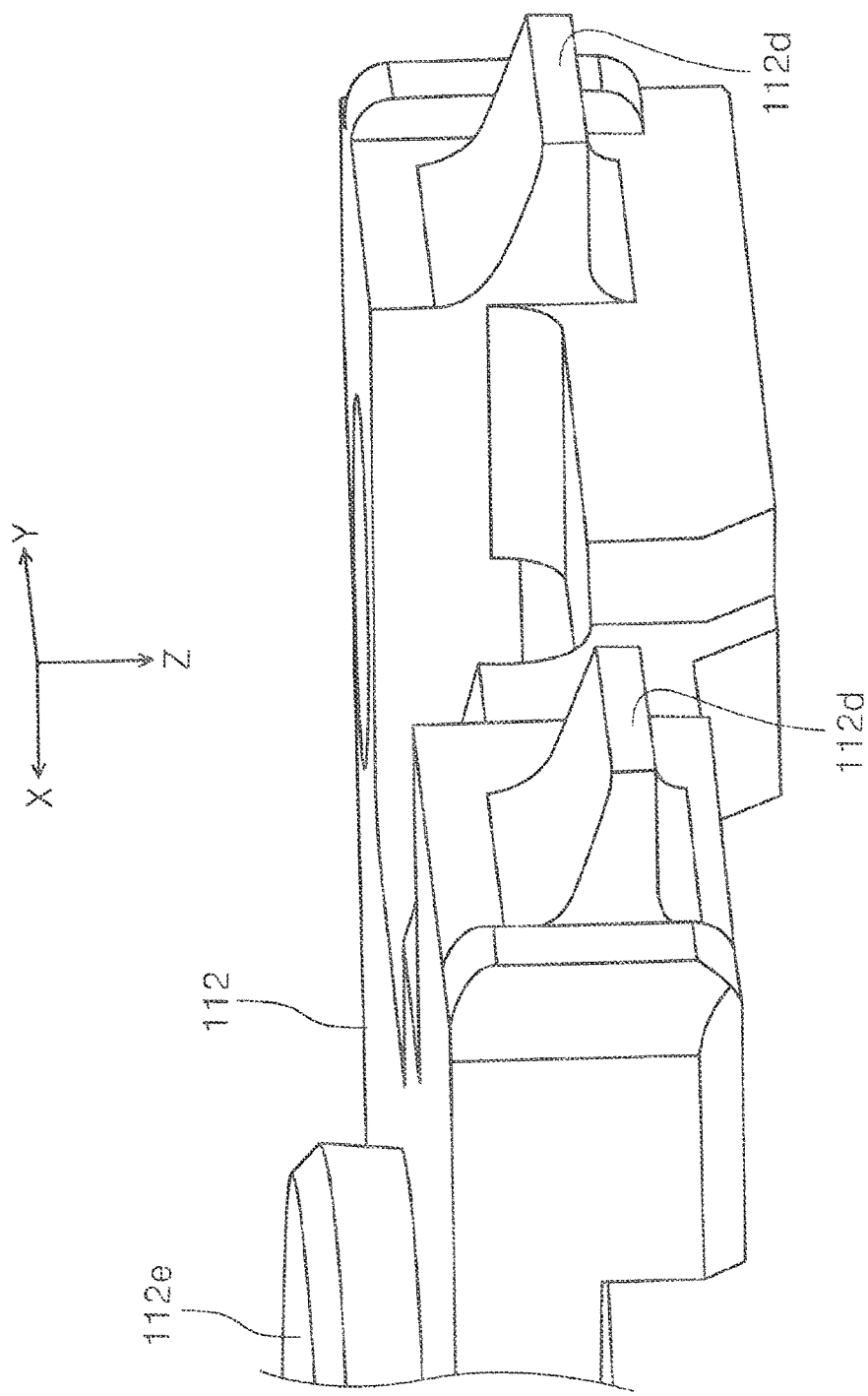

FIG. 39 is a partial enlarged perspective view of a shutter member.

Figure 40:
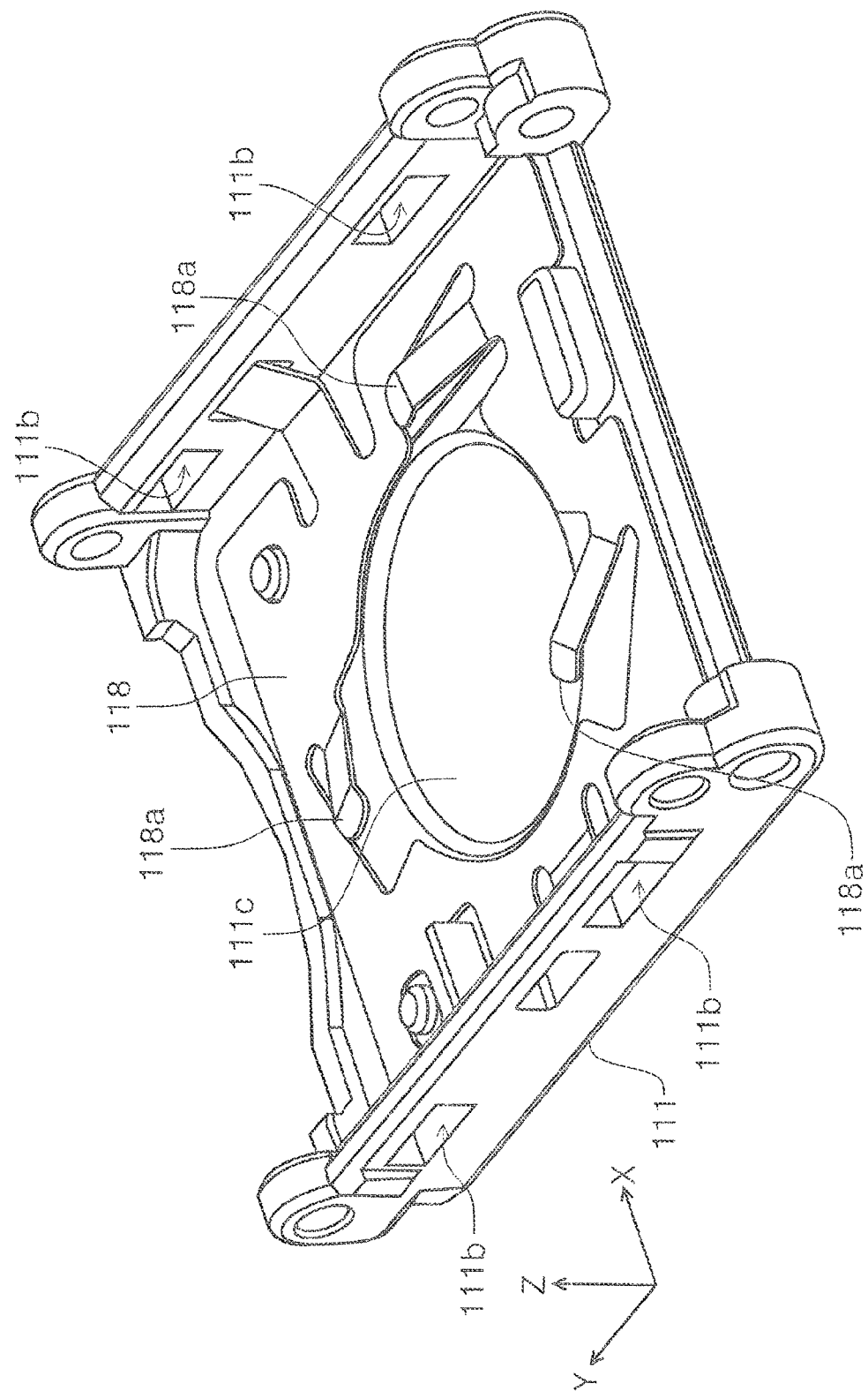

FIG. 40 is a perspective view of the shutter holding member and a plate spring.

Figure 41:
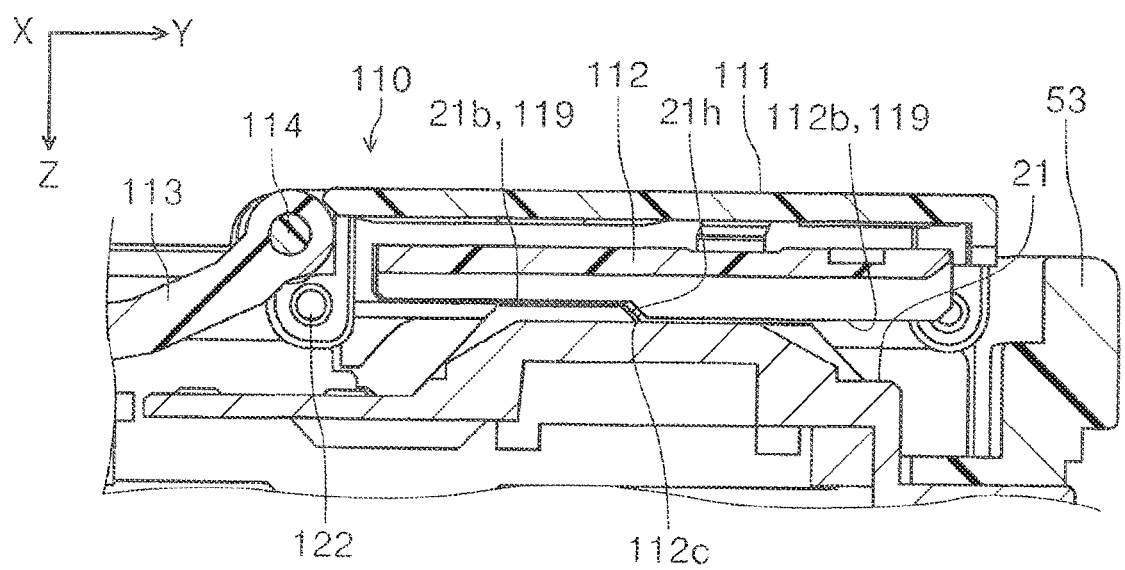

FIG. 41 is a diagram corresponding to a part of XLI-XLI cross section in FIG. 6 and is a diagram in which the shutter unit is at the closed position.

Figure 42:
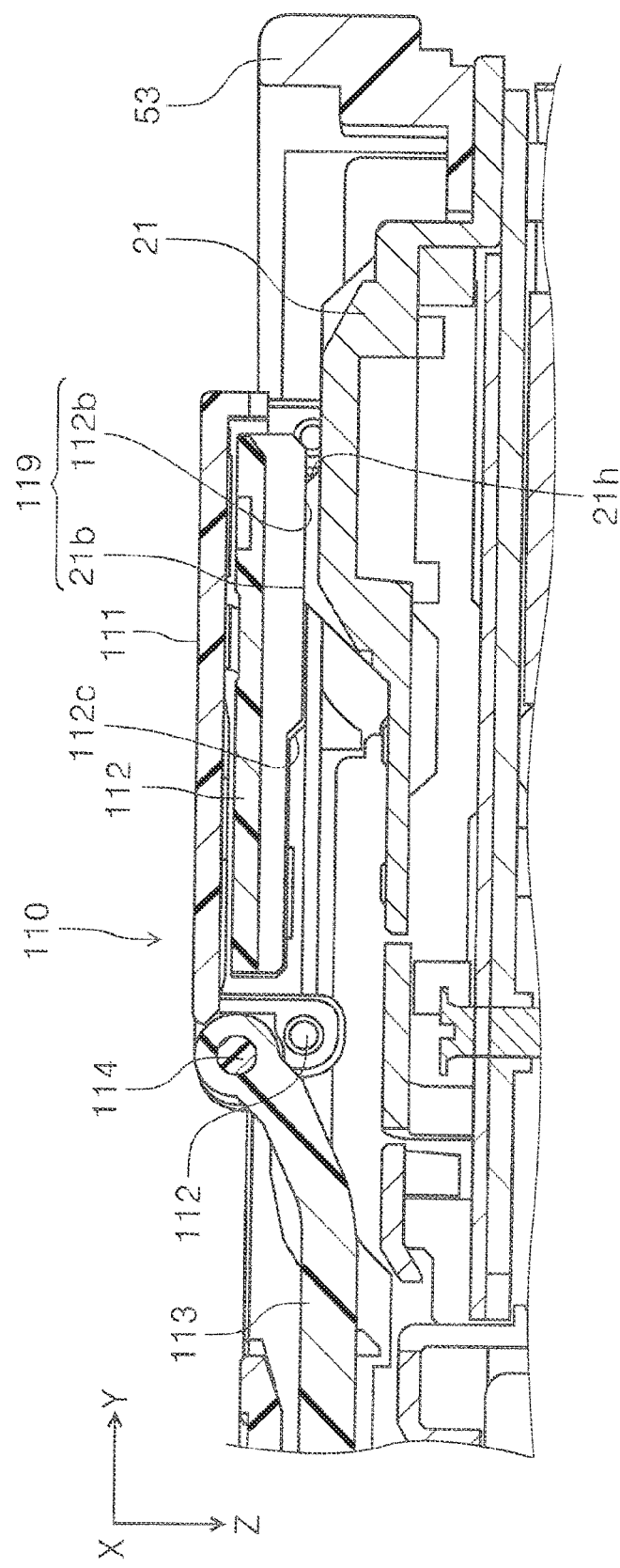

FIG. 42 is a diagram corresponding to a part of XLII-XLII cross section in FIG. 6 and is a diagram illustrating a state where the shutter unit is further in the −Y direction than the closed position.

Figure 43:
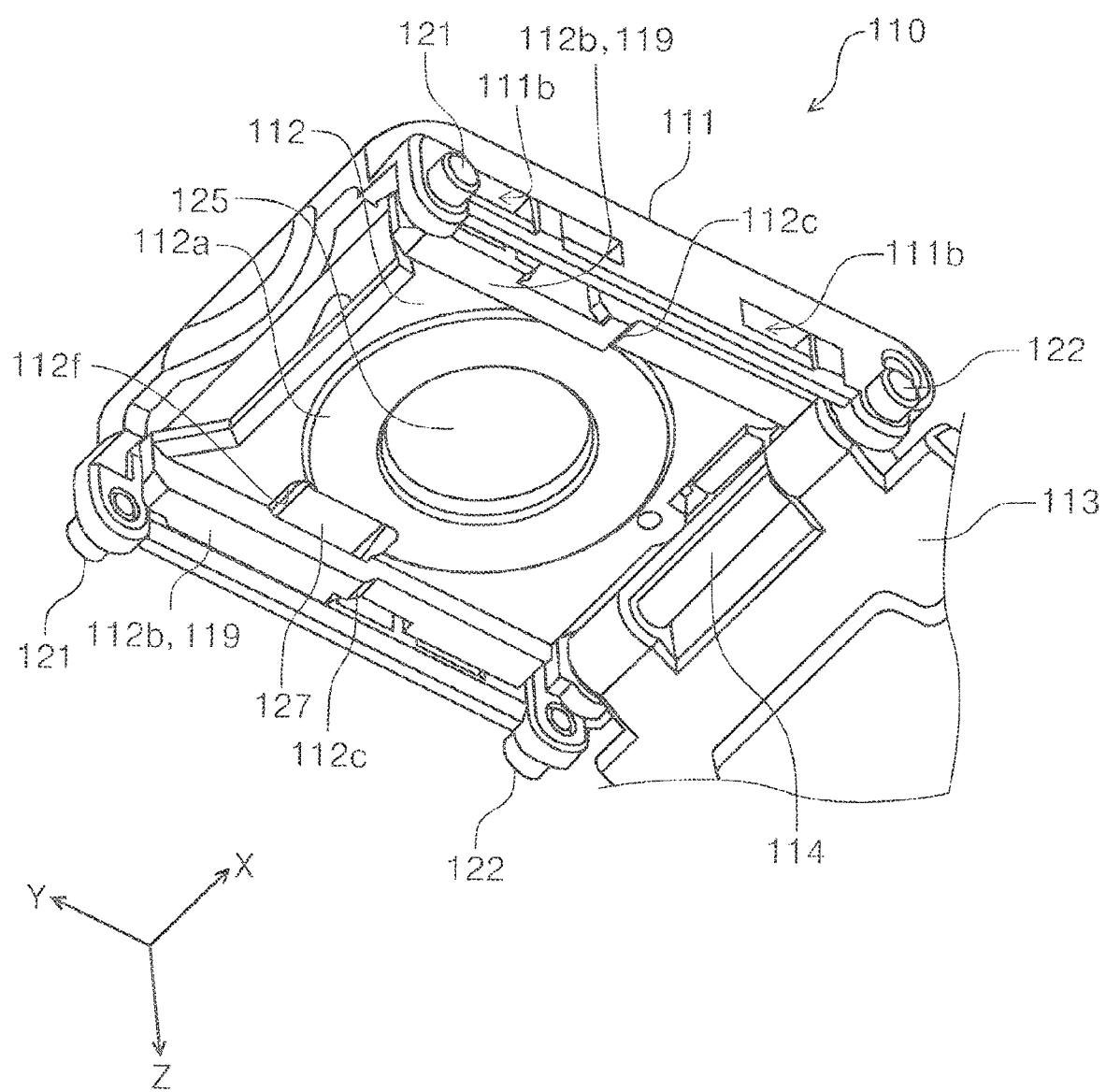

FIG. 43 is a partial enlarged perspective view of the shutter unit.

Figure 44:
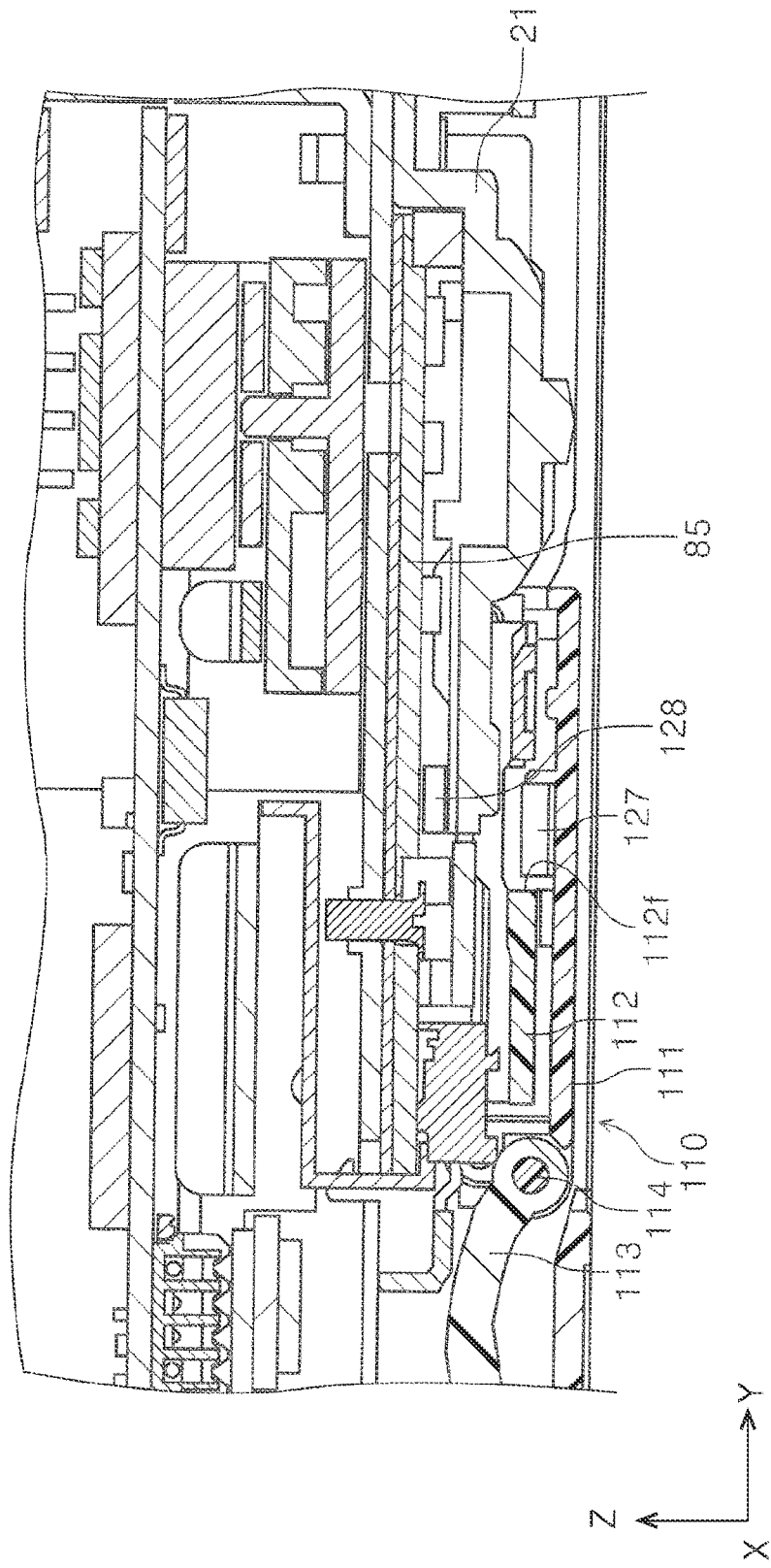

FIG. 44 is a diagram corresponding to a part of XLIV-XLIV cross section in FIG. 5 and is a diagram illustrating a state where the shutter unit is at the open position.

Figure 45:
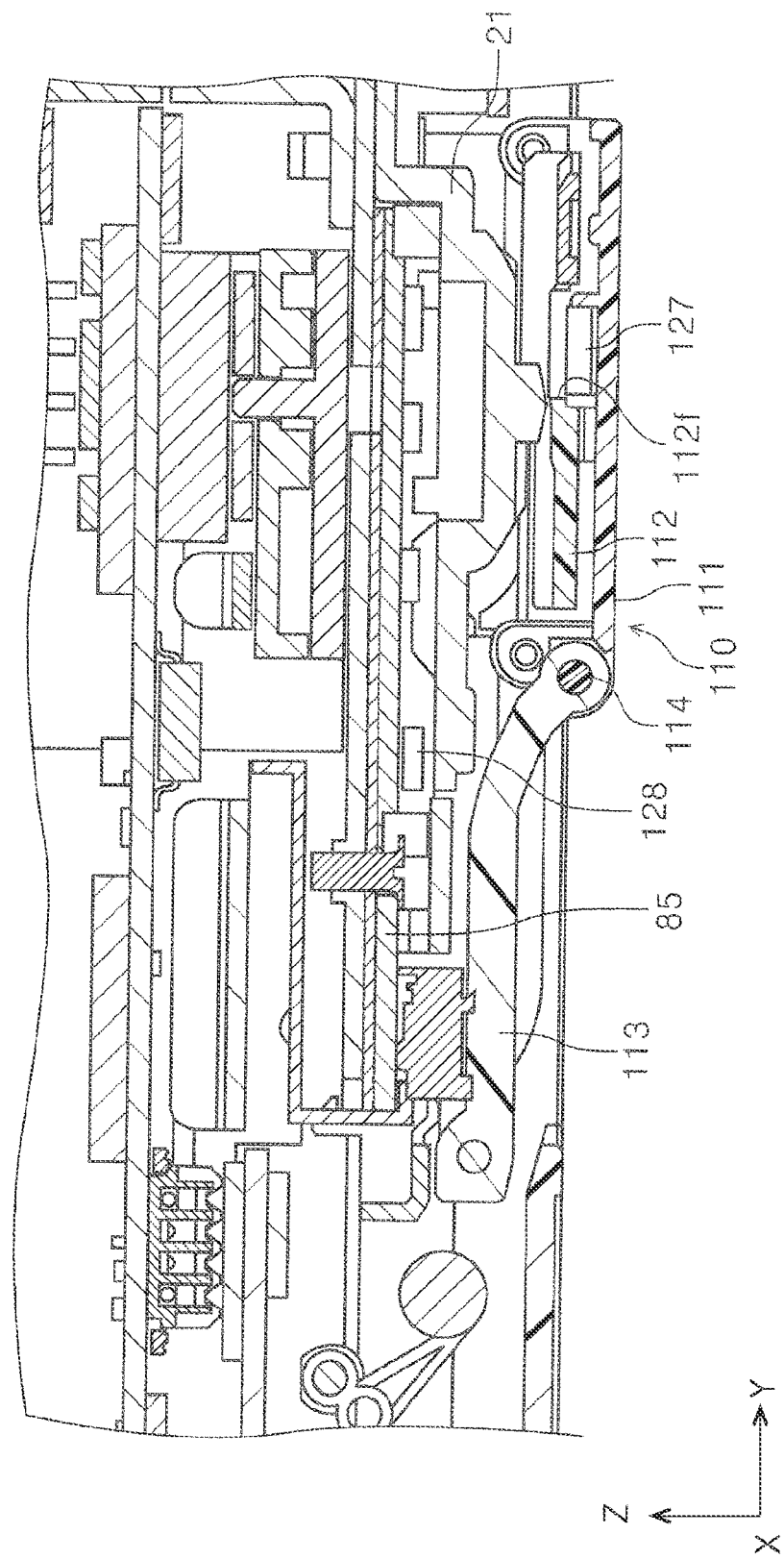

FIG. 45 is a diagram corresponding to a part of XLV-XLV cross section in FIG. 5 and is a diagram illustrating a state where the shutter unit is at the closed position.

Figure 46:
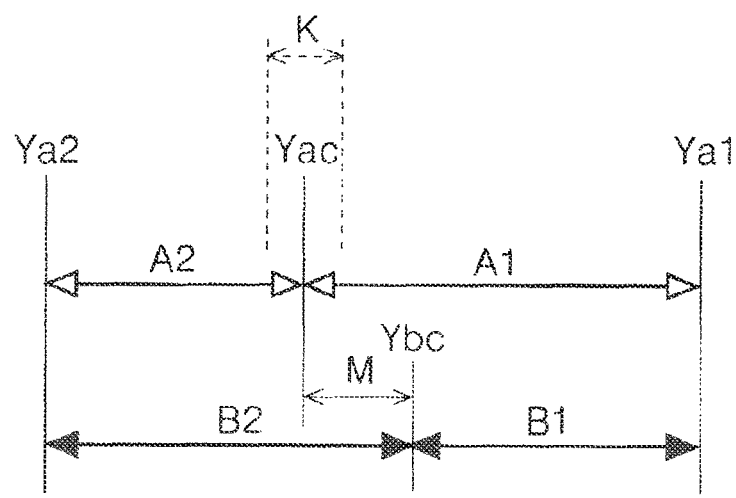

FIG. 46 is a diagram schematically illustrating a relationship between an operation region of the shutter unit and a detection region of a shutter detection portion.

Figure 47:
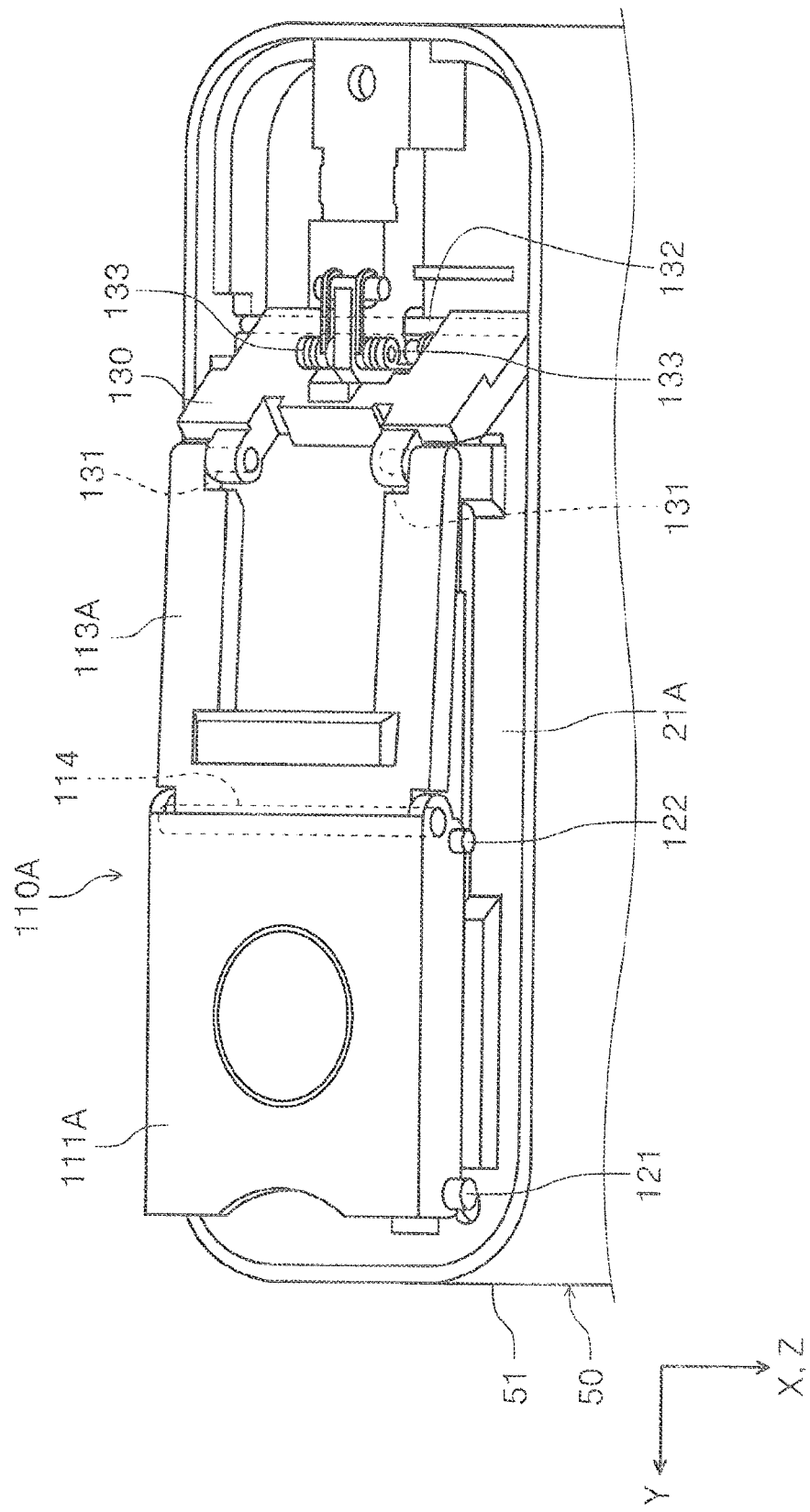

FIG. 47 is a diagram illustrating another embodiment of the shutter unit and is a diagram illustrating a state where the shutter unit is at the closed position.

Figure 48:
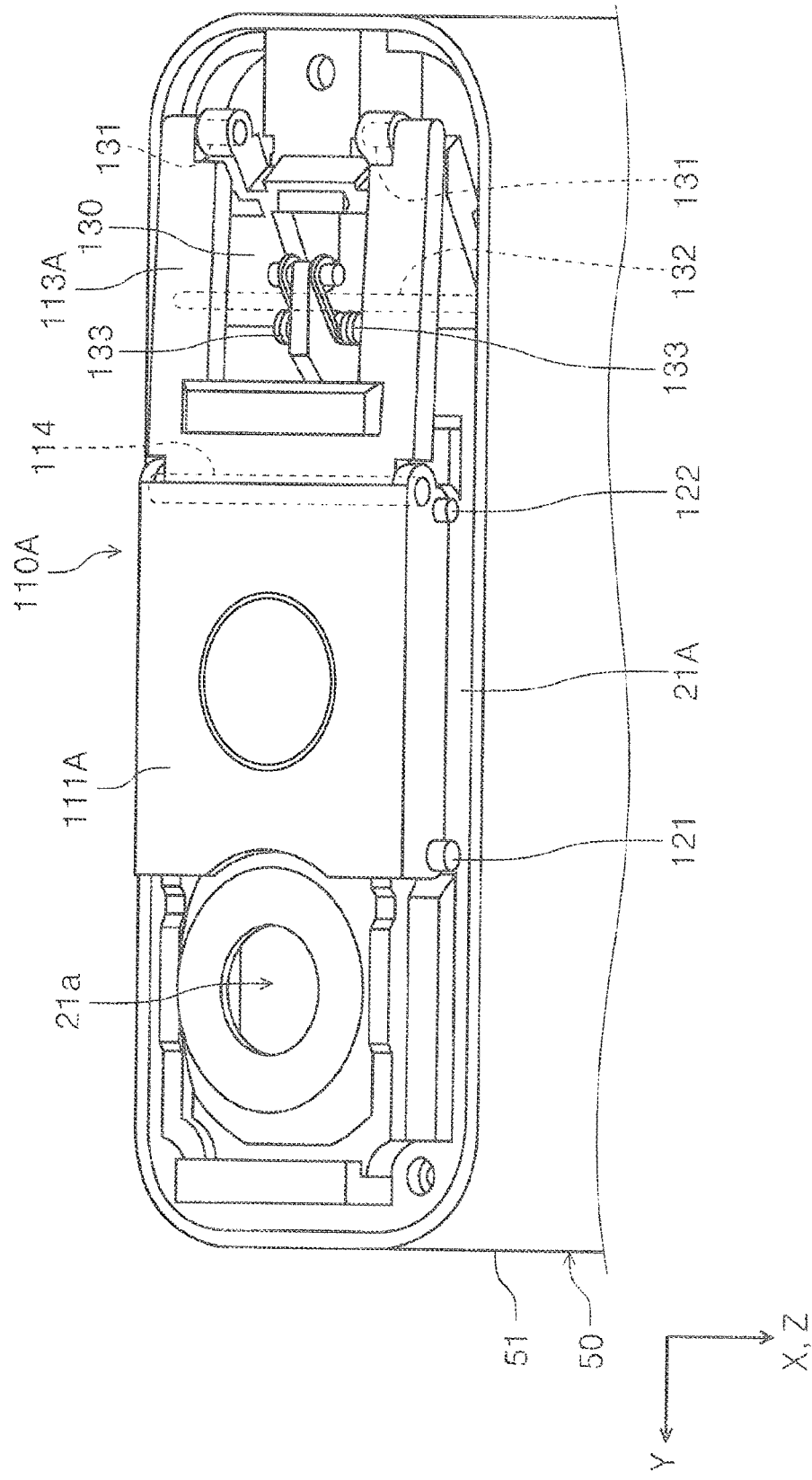

FIG. 48 is a diagram illustrating another embodiment of the shutter unit and is a diagram illustrating a state where the shutter unit is at the open position.

Figure 49:
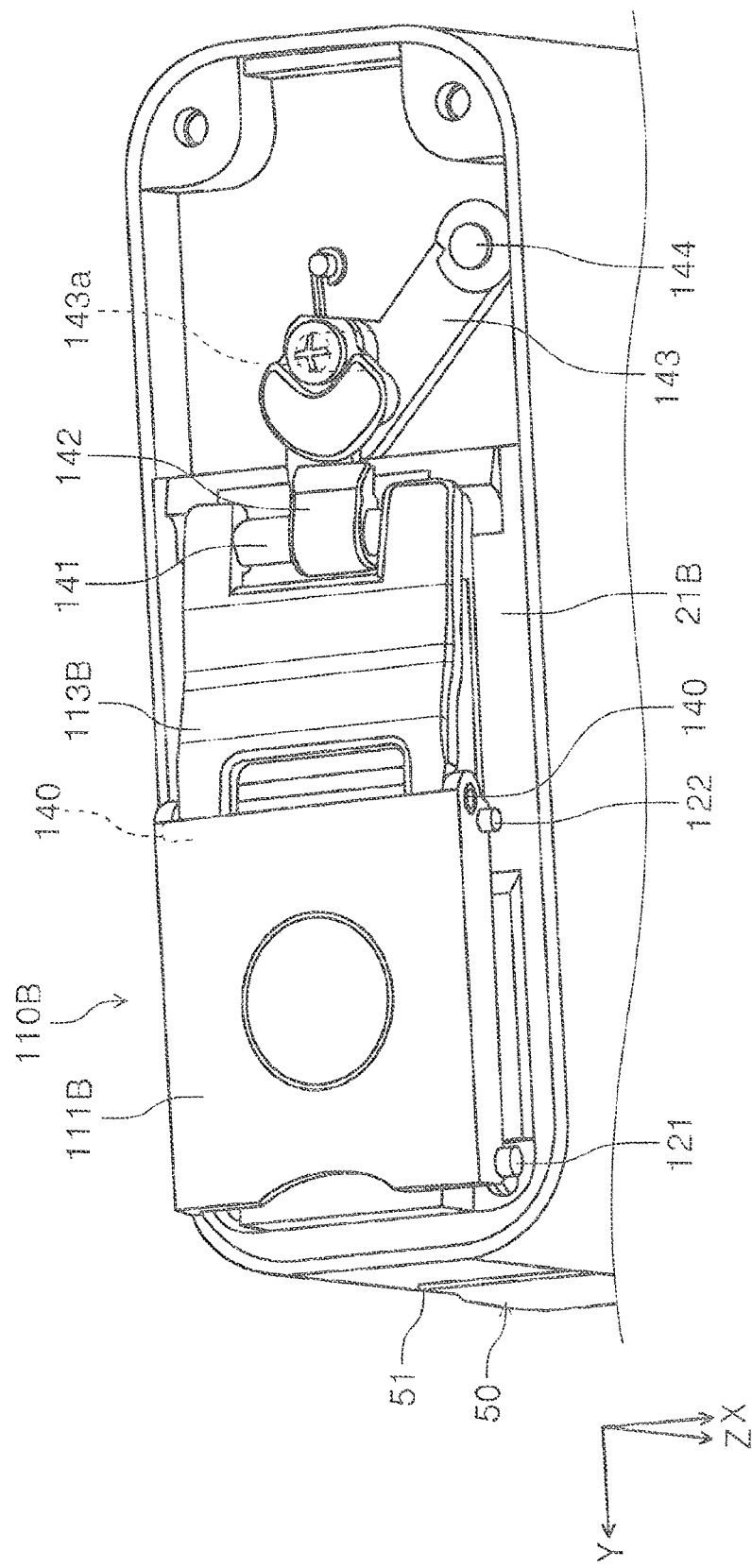

FIG. 49 is a diagram illustrating another embodiment of the shutter unit and is a diagram illustrating a state where the shutter unit is at the closed position.

Figure 50:
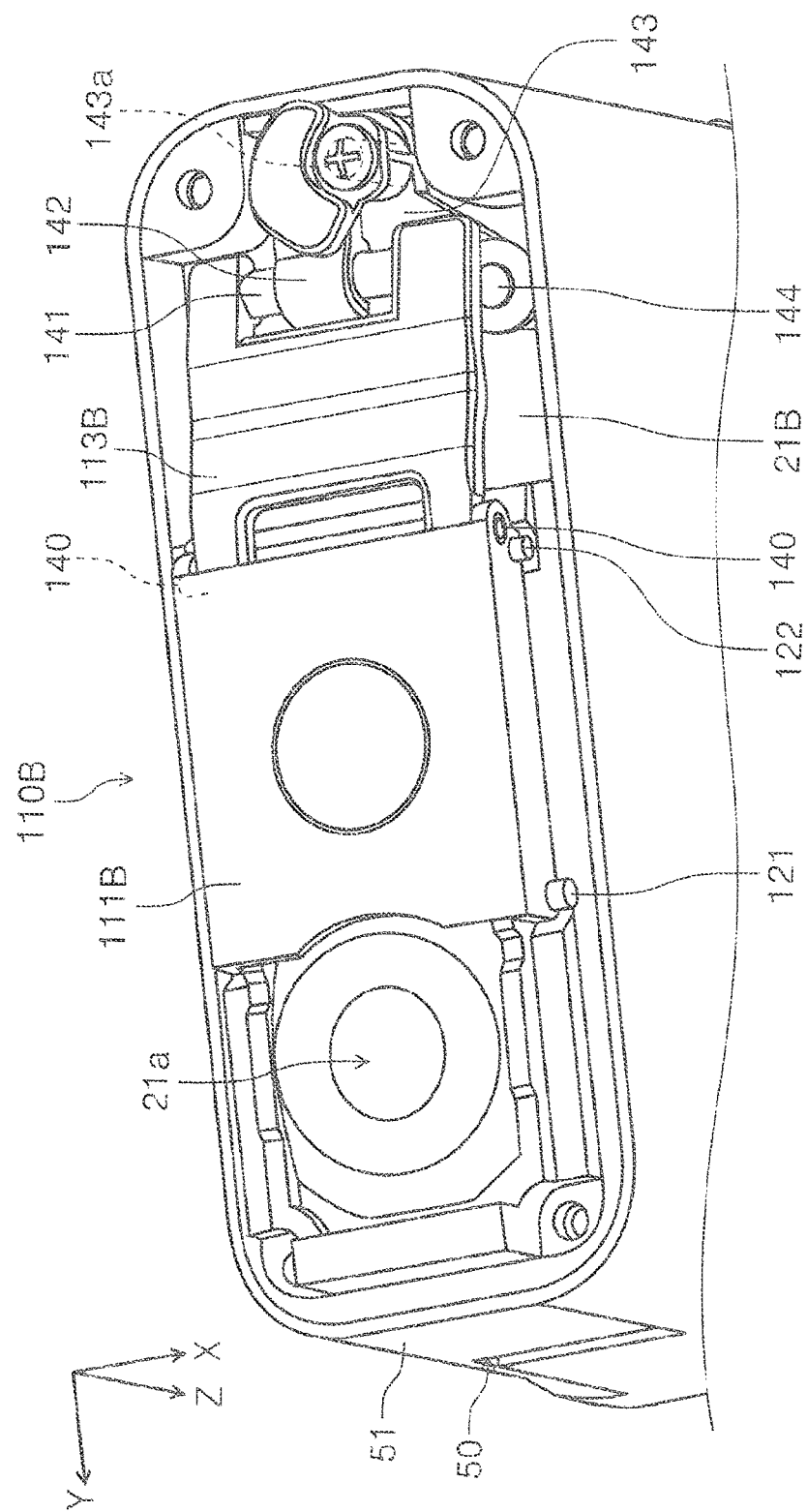

FIG. 50 is a diagram illustrating another embodiment of the shutter unit and is a diagram illustrating a state where the shutter unit is at the open position.

Figure 51:
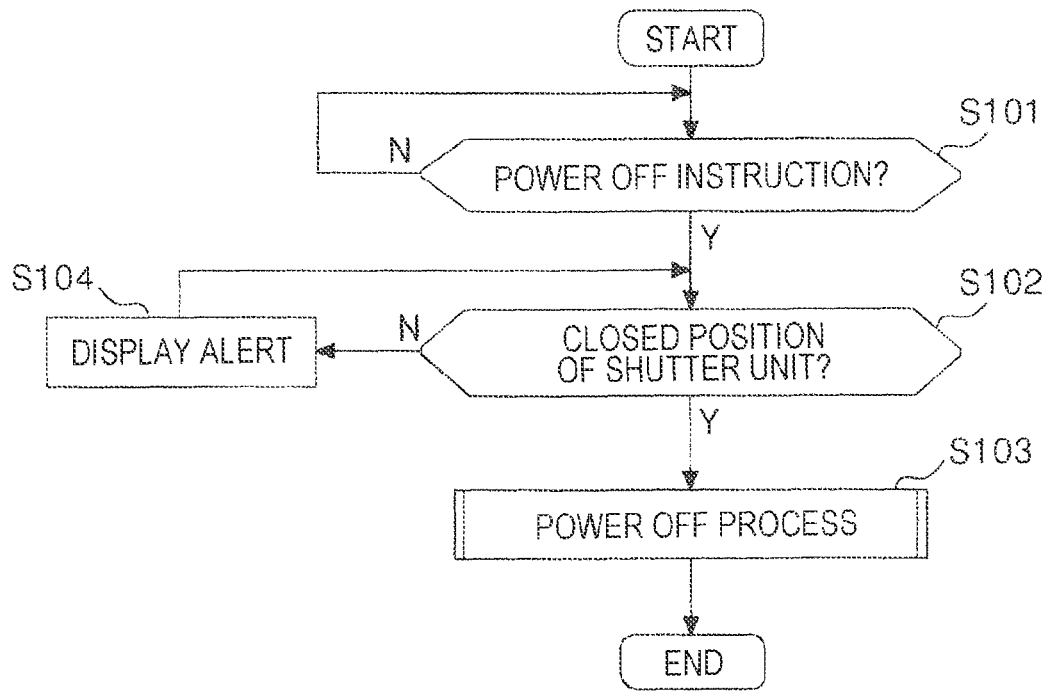

FIG. 51 is a flowchart illustrating a processing content of a control portion when a power OFF instruction is received.

Figure 52:
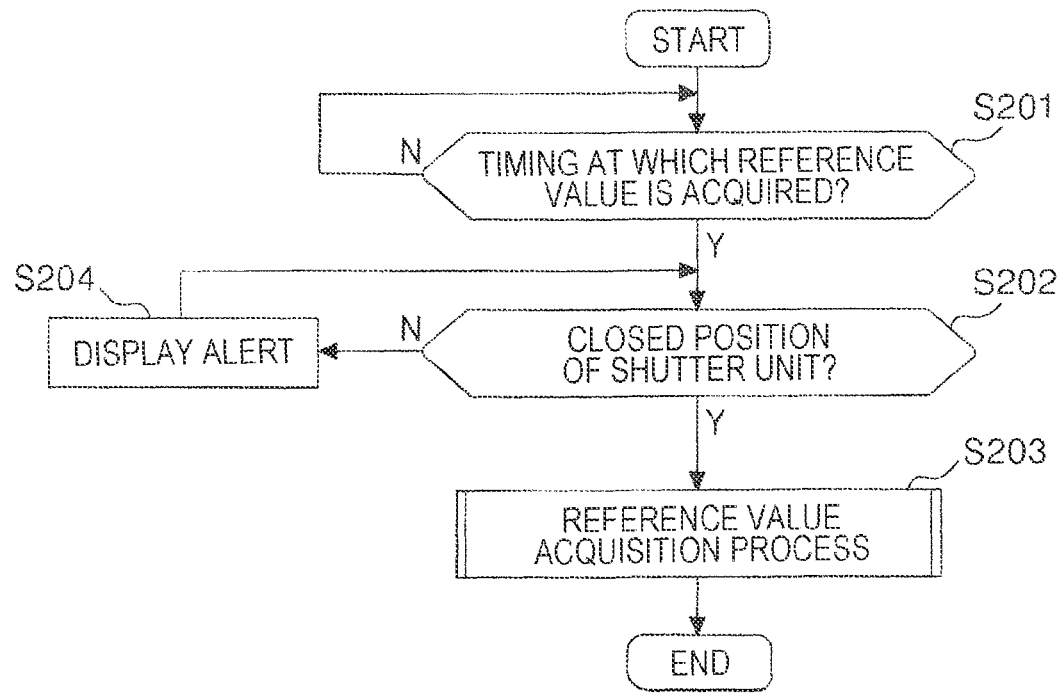

FIG. 52 is a flowchart illustrating the processing content of the control portion when acquiring a reference value.

Figure 53:
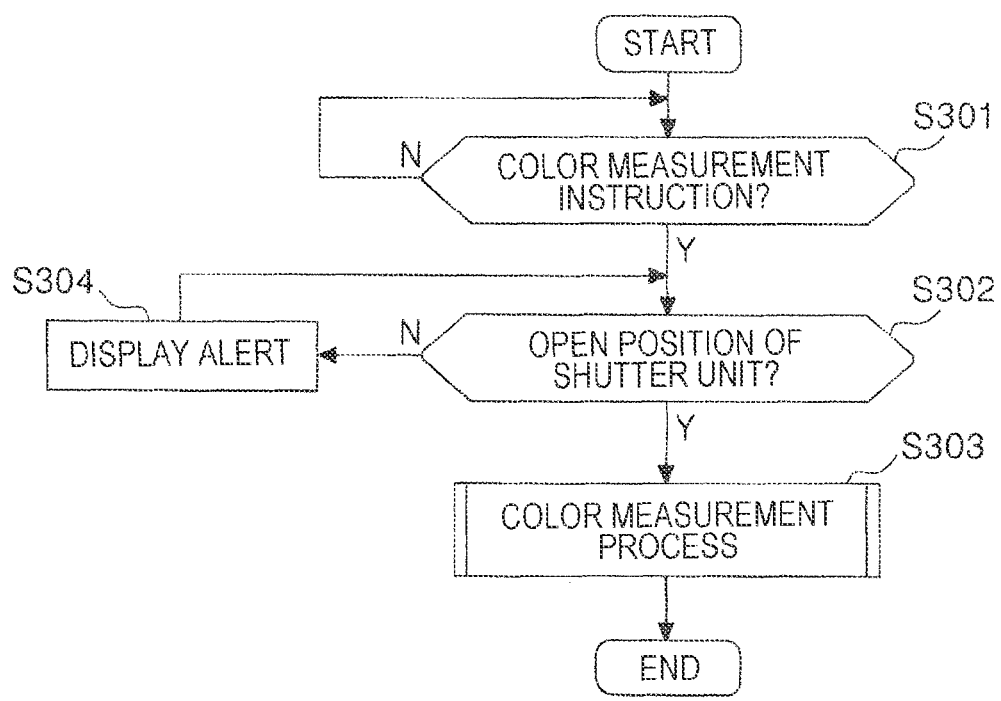

FIG. 53 is a flowchart illustrating the processing content of the control portion when performing color measurement.

DESCRIPTION OF EXEMPLARY EMBODIMENTS

Hereinafter, the present disclosure will be schematically described.

A color measurement apparatus according to a first aspect includes an opening portion forming member that is a member in which an opening portion for causing light arriving from a measurement target to enter inside the apparatus is formed, and that is arranged on a bottom surface at a time of measurement performed by the apparatus, an incident light processing portion that processes light incident through the opening portion, and an operation portion that is positioned on an upper surface which is a surface on an opposite side from the bottom surface, and that receives various operations, in which in a view from a first direction that is a vertical direction intersecting with the bottom surface and the upper surface which is the surface on the opposite side from the bottom surface and includes a display portion, the opening portion and the operation portion have an overlapping part.

According to the present aspect, in the color measurement apparatus, in a view from the first direction that is the direction intersecting with the bottom surface and the upper surface which is the surface on the opposite side from the bottom surface, the opening portion and the operation portion have an overlapping part. Thus, when a user positions the opening portion to a measured part, positioning can be performed based on a position of the operation portion. That is, the opening portion can be positioned to the measured part with a simple configuration.

Particularly, in the color measurement apparatus of a handy type, when the operation portion is operated with a fingertip, a position of the fingertip is close to or coincides with the position of the opening portion. Thus, the position of the opening portion is intuitively easily perceived.

A second aspect is the color measurement apparatus according to the first aspect, in which the operation portion includes a decision button that receives at least one of decision of a measurement condition and execution of measurement, and in a view from the first direction, a center position of the opening portion coincides with a center position of the decision button.

According to the present aspect, the operation portion includes the decision button that receives at least one of decision of the measurement condition and execution of measurement, and in a view from the first direction, the center position of the opening portion coincides with the center position of the decision button. Thus, the opening portion can be more accurately positioned to the measured part.

A third aspect is the color measurement apparatus according to the second aspect, in which a cross button for selecting various items is arranged around the decision button, and a mark line is disposed in the cross button.

According to the present aspect, the cross button for selecting various items is arranged around the decision button, and the mark line is disposed in the cross button. Thus, when the upper surface of the apparatus is viewed, the center position of the opening portion can be easily perceived.

A fourth aspect is the color measurement apparatus according to any one of the first to third aspects, in which the operation portion is configured to include a power button and all buttons related to measurement on the upper surface.

According to the present aspect, the operation portion is configured to include the power button and all buttons related to measurement on the upper surface. Thus, the power button and all buttons related to measurement can be easily recognized, and the apparatus can be easily operated.

A fifth aspect is the color measurement apparatus according to any one of the first to fourth aspects, in which the upper surface including the operation portion is formed into a planar shape.

According to the present aspect, the upper surface including the operation portion is formed into the planar shape. Thus, even when mounting is performed with the upper surface of the apparatus down, mounting can be stably performed.

A sixth aspect is the color measurement apparatus according to any one of the first to fifth aspects, which further includes a first circuit substrate that includes the incident light processing portion, and the display portion that is positioned on the upper surface and performs various kinds of display, in which in a view from the first direction, the display portion and the first circuit substrate have an overlapping part.

A seventh aspect is the color measurement apparatus according to any one of the first to sixth aspects, which further includes a battery that supplies power to the incident light processing portion, in which the battery has a shape that extends in a second direction which is a direction intersecting with the first direction and is a longitudinal direction of the apparatus in a view from the first direction, and both end portions of the battery in the second direction face a side wall inner surface, in the second direction, of a casing that forms an outline of the apparatus.

According to the present aspect, the battery has the shape that extends in the second direction which is the direction intersecting with the first direction and is the longitudinal direction of the apparatus in a view from the first direction, and both end portions of the battery in the second direction face the side wall inner surface, in the second direction, of the casing that forms the outline of the apparatus. Thus, excellent weight balance in the second direction is achieved, and handleability of the apparatus is improved, compared to a configuration in which the battery is arranged in a biased manner in the second direction.

An eighth aspect is the color measurement apparatus according to the seventh aspect, in which the casing includes a recessed portion for grip on a side wall in a third direction that is a direction orthogonal to the second direction and is a short direction of the apparatus in a view from the first direction, and the battery and the recessed portion have an overlapping part in a view from the third direction.

According to the present aspect, the casing includes the recessed portion for grip on the side wall in the third direction that is the direction orthogonal to the second direction and is the short direction of the apparatus in a view from the first direction, and the battery and the recessed portion have the overlapping part in a view from the third direction. Thus, the battery that is a heavy object is configured to be close to a grip position, and the handleability of the apparatus is improved.

A ninth aspect is the color measurement apparatus according to any one of the first to eighth aspects, in which the incident light processing portion includes a variable wavelength optical filter that transmits a predetermined wavelength component of incident light, and a light reception portion that receives light transmitted through the optical filter.

According to the present aspect, an effect of any one of the first to eighth aspects is obtained in a configuration in which the incident light processing portion includes the variable wavelength optical filter that transmits the predetermined wavelength component of the incident light, and the light reception portion that receives the light transmitted through the optical filter.

A tenth aspect is the color measurement apparatus according to the ninth aspect, in which the optical filter is a Fabry-Perot etalon.

According to the present aspect, an effect of the ninth aspect is obtained in a configuration in which the optical filter is the Fabry-Perot etalon.

Hereinafter, the present disclosure will be specifically described.

An X-Y-Z coordinate system illustrated in each drawing is an orthogonal coordinate system. An X-Y plane is a horizontal plane, and a Y-Z plane is a vertical plane.

In addition, a Z axis direction is a vertical direction and is one example of a first direction that intersects with an upper surface $50e$ and a bottom surface $50f$ of a color measurement apparatus 1. In addition, a Y axis direction is a direction orthogonal to the first direction, that is, the vertical direction, and is one example of a second direction that is a longitudinal direction when the color measurement apparatus 1 is viewed from the vertical direction. In addition, an X axis direction is a direction orthogonal to the Y axis direction and is one example of a third direction that is a short direction when the color measurement apparatus 1 is viewed from the vertical direction.

In description of a configuration of the color measurement apparatus 1 in the present specification, the bottom surface $50f$ is mounted on a mounting surface parallel to the horizontal plane, and the longitudinal direction of the color measurement apparatus 1 is in the Y axis direction.

Overall Configuration of Color Measurement Apparatus 1

Figure 1:
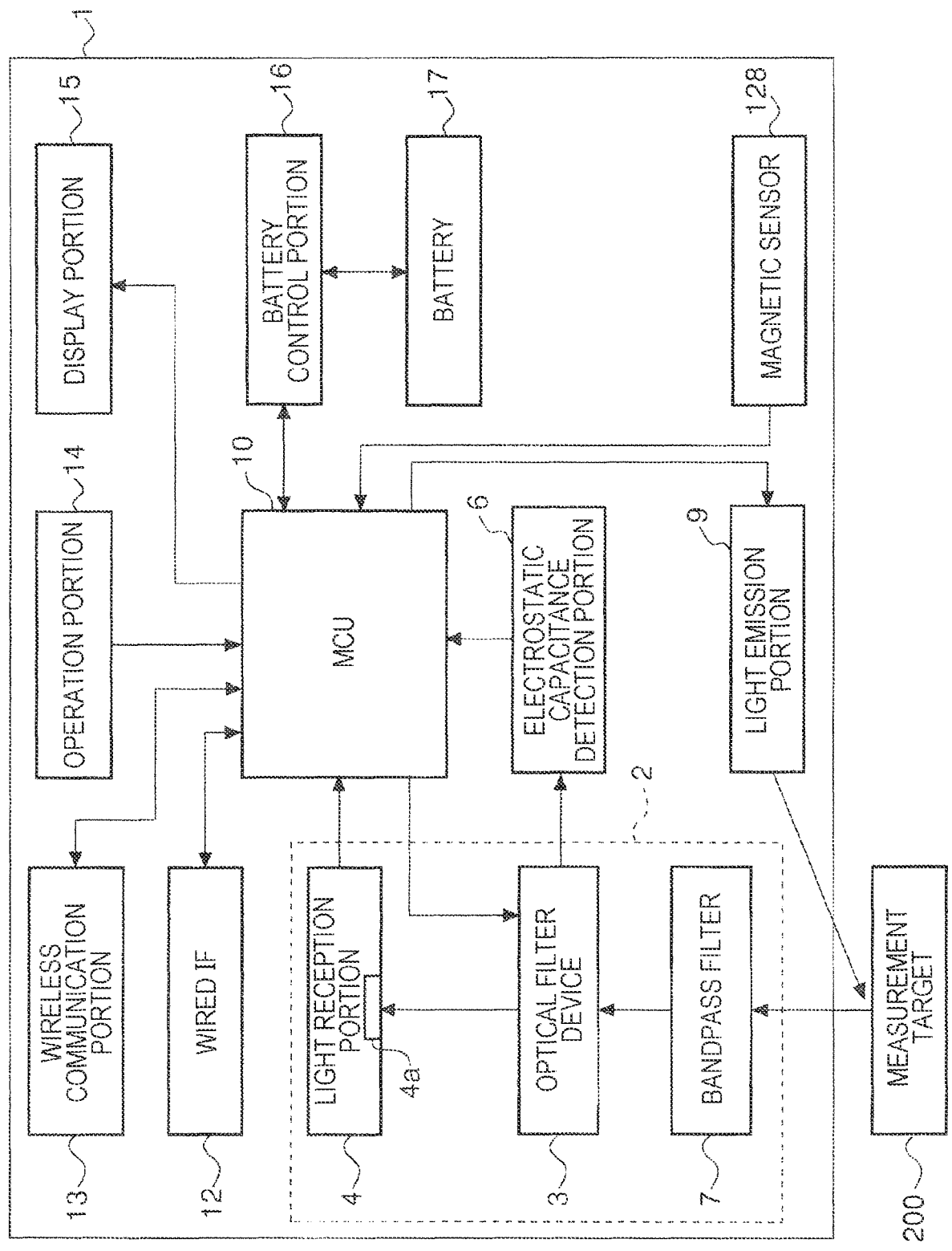
FIG. 1 is a block diagram illustrating functions of a color measurement apparatus.

First, an overall configuration of the color measurement apparatus 1 according to the present embodiment will be described with reference to FIG. 1 and FIG. 2.

The color measurement apparatus 1 has a configuration for performing color measurement based on light arriving from a measurement target 200. Examples of light arriving from the measurement target 200 include light reflected by the measurement target 200 and light emitted by the measurement target 200 itself.

The color measurement apparatus 1 includes a bandpass filter 7, an optical filter device 3, a light reception portion 4, an electrostatic capacitance detection portion 6, a light emission portion 9, a micro controller unit (MCU) 10, a wired interface (IF) 12, a wireless communication portion 13, an operation portion 14, a display portion 15, a battery control portion 16, and a battery 17.

The bandpass filter 7, the optical filter device 3, and the light reception portion 4 constitute an incident light processing portion 2 that processes incident light arriving from the measurement target 200.

The bandpass filter 7 transmits light of a visible light range, for example, 380 nm to 720 nm, and cuts light of an ultraviolet light range and an infrared light range out of the incident light arriving from the measurement target 200. Accordingly, light of the visible light range is incident on the optical filter device 3. Light arriving the bandpass filter 7 from the measurement target 200 reaches the bandpass filter 7 through an opening portion 21a and a measurement window portion 87a (refer to FIG. 20) described later.

The optical filter device 3 selectively transmits any wavelength component from visible light passing through the bandpass filter 7. Light transmitted through the optical filter device 3 is incident on a photo diode 4a (refer to FIG. 20) that is one example of a light reception element, and is processed by the light reception portion 4 including the photo diode 4a. The light reception portion 4 converts an intensity of received light into a voltage value, further converts the voltage value into a digital signal, and outputs the digital signal to the MCU 10. The color measurement apparatus 1 can measure a spectrum of the measurement target 200 by repeating wavelength selection performed by the optical filter device 3 and acquisition of a light reception intensity using the light reception portion 4.

Here, a configuration of the optical filter device 3 will be described with reference to FIG. 2. The optical filter device 3 in the present embodiment is a variable wavelength Fabry-Perot etalon that transmits a predetermined wavelength component of the incident light arriving from the measurement target 200, and is a wavelength filter that uses multiple interference between two reflection surfaces facing each other.

Figure 2:
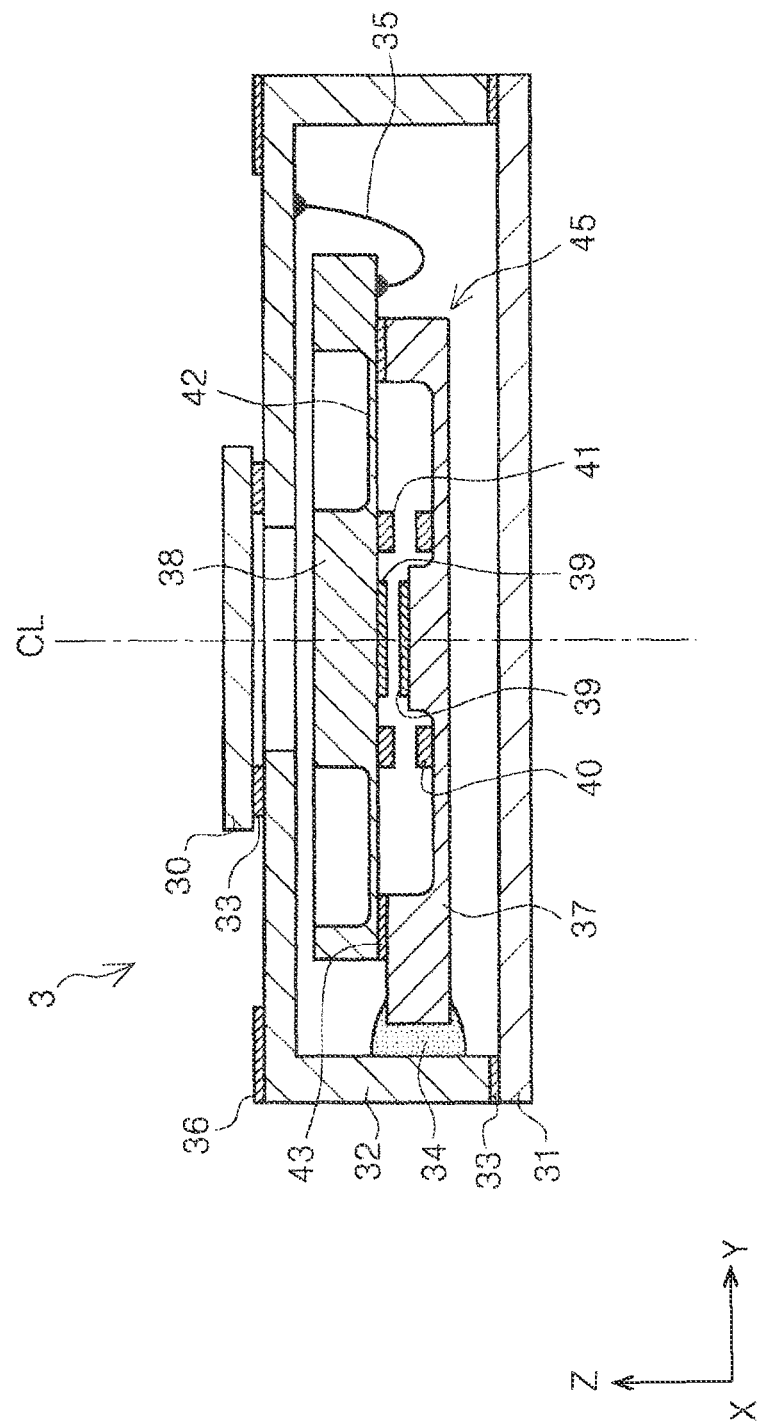
FIG. 2 is a cross-sectional view of an optical filter device.

In FIG. 2, the optical filter device 3 includes a variable wavelength interference filter 45. The variable wavelength interference filter 45 is incorporated inside an exterior body that is configured with a first glass member 30, a second glass member 31, and a case 32.

The case 32 and the first glass member 30, and the case 32 and the second glass member 31 are joined to each other by a joining member 33 such as low melting point glass or epoxy resin. In addition, the variable wavelength interference filter 45 and the case 32 are fixed by a fixing material 34 such as an adhesive. An electrode 36 on an outer surface of the case 32 and the variable wavelength interference filter 45 are conducted by wire bonding 35 and wiring inside the case 32.

The variable wavelength interference filter 45 includes a base substrate 37 and a diaphragm substrate 38. The base substrate 37 and the diaphragm substrate 38 are joined by a joining film 43. A mirror 39 is deposited on each of the base substrate 37 and the diaphragm substrate 38. The outermost surfaces of the mirrors 39 facing each other are formed of a conductor. An electrostatic capacitance between the mirrors 39 facing each other is detected by the electrostatic capacitance detection portion 6 (refer to FIG. 1). The electrostatic capacitance detection portion 6 is configured with a capacitance to voltage (CV) converter and converts the detected electrostatic capacitance into a voltage value, further converts the voltage value into a digital value, and transmits the digital value to the MCU 10.

A distance between the mirrors 39 facing each other is controlled by an electrostatic actuator that is configured by causing a fixed electrode 40 and a movable electrode 41 that are concentrically formed in a view from the Z axis direction to face each other.

When a voltage is applied between the fixed electrode 40 and the movable electrode 41 facing each other, a force that attracts the fixed electrode 40 and the movable electrode 41 to each other is generated by an electrostatic force. At this point, a diaphragm portion 42 that is concentrically formed is deformed. This attracts the mirror 39 of the diaphragm substrate 38 to a base substrate 37 side, and the distance between the mirrors 39 facing each other is controlled. A wavelength of light transmitted through the variable wavelength interference filter 45 is selected in accordance with the distance between the mirrors 39 facing each other.

At a time of spectroscopic measurement, light from the measurement target 200 is incident on the optical filter device 3 from a second glass member 31 side to a first glass member 30 side along an optical axis CL. The optical axis CL is a line that is parallel to the Z axis direction and passes through centers of the opening portion 21a (refer to FIG. 20), the measurement window portion 87a (refer to FIG. 20), the variable wavelength interference filter 45, and the photo diode 4a (refer to FIG. 20). Particularly, the opening portion 21a, the measurement window portion 87a, and the variable wavelength interference filter 45 (refer to FIG. 2) have a perfect circular shape in a view from the Z axis direction, and the optical axis CL passes through the centers thereof. Hereinafter, the optical axis CL may be referred to as a center position CL.

Light incident on the optical filter device 3 interferes between the mirrors 39 facing each other, and light of a wavelength selected in accordance with the distance between the mirrors 39 facing each other is transmitted through the variable wavelength interference filter 45. Light transmitted through the variable wavelength interference filter 45 is transmitted through the first glass member 30 and heads toward the light reception portion 4.

The above is the configuration of the optical filter device 3.

Returning to FIG. 1, the MCU 10 is a control apparatus based on a microprocessor and incorporates a memory storing various programs and various data necessary for controlling the color measurement apparatus 1.

The MCU 10 transmits control information necessary for driving the electrostatic actuator, which is configured by causing the fixed electrode 40 and the movable electrode 41 to face each other as described with reference to FIG. 2, to an amplifier, not illustrated, and supplies a predetermined drive voltage to the optical filter device 3 from the amplifier. The MCU 10 compares information related to the voltage value output from the electrostatic capacitance detection portion 6 with a stored value and performs a feedback control of the optical filter device 3 based on the comparison.

The light emission portion 9 emits light for measurement toward the measurement target 200. The light emission portion 9 is configured with a plurality of light emission elements, specifically, a plurality of LEDs, having different wavelength distributions for light emission. The MCU 10 controls turn-on and turn-off of the light emission portion 9.

The wired IF 12 and the wireless communication portion 13 are constituents for communicating with an external apparatus. For example, Universal Serial Bus (USB) can be employed as a standard for communication through the wired IF 12. In addition, for example, Bluetooth can be employed as a standard of the wireless communication portion 13. USB and Bluetooth are registered trademarks. The MCU 10 transmits various data to the external apparatus and receives various data from the external apparatus through the wired IF 12 or the wireless communication portion 13. In addition, the color measurement apparatus 1 can charge the battery 17 by receiving a supply of power from the external apparatus through the wired IF 12.

The operation portion 14 is configured with a power button and various operation setting buttons and transmits a signal corresponding to an operation to the MCU 10. The operation portion 14 will be described in further detail later.

The display portion 15 is configured with, for example, a liquid crystal panel and displays various information such as a user interface for setting a color measurement condition based on a signal transmitted from the MCU 10, and a color measurement result.

A magnetic sensor 128 that transmits a detection signal to the MCU 10 is a sensor for detecting a position of a shutter unit 110 described later. The magnetic sensor 128 will be described later.

The battery 17 is a lithium ion secondary battery in the present embodiment and supplies power to each constituent needing power in the color measurement apparatus 1. The constituents receiving the supply of power from the battery 17 include an incident light processing portion 2 described later. The battery control portion 16 performs various controls such as a charging control of the battery 17.

Exterior Configuration of Color Measurement Apparatus 1

Next, an exterior configuration of the color measurement apparatus 1 will be described with reference to FIG. 3, FIG. 4, FIG. 5, and FIG. 6.

An apparatus main body 50 of the color measurement apparatus 1 is configured to have an outline has a box shape as a whole by a main casing 51, an upper casing 52, and a bottom casing 53. The main casing 51, the upper casing 52, and the bottom casing 53 are formed of a resin material in the present embodiment.

In each drawing, reference sign 50a denotes a side surface of the apparatus main body 50 in a +Y direction. Hereinafter, the side surface will be referred to as a front surface 50a. In addition, reference sign 50b (refer to FIG. 6) denotes a side surface of the apparatus main body 50 in a +X direction. Hereinafter, the side surface will be referred to as a right surface 50b. In addition, reference sign 50c denotes a side surface of the apparatus main body 50 in a –X direction. Hereinafter, the side surface will be referred to as a left surface 50c. In addition, reference sign 50d denotes a side surface of the apparatus main body 50 in a –Y direction. Hereinafter, the side surface will be referred to as a rear surface 50d.

In the present specification, each term of "up", "down", "left", and "right" is used based on a direction of view from a user when the user of the color measurement apparatus 1 uses the color measurement apparatus 1 by holding the color measurement apparatus 1 as illustrated in FIG. 27.

In FIG. 3 to FIG. 6, the front surface 50a is formed by a front wall portion 51a of the main casing 51. The right surface 50b is formed by a right wall portion 51b of the main casing 51. The left surface 50c is formed by a left wall portion 51c of the main casing 51. The rear surface 50d is formed by a rear wall portion 51d of the main casing 51.

In addition, reference sign 50e denotes a surface of the apparatus main body 50 in a +Z direction. Hereinafter, the surface will be referred to as an upper surface 50e. In addition, reference sign 50f denotes a surface of the apparatus main body 50 in a –Z direction. Hereinafter, the surface will be referred to as a bottom surface 50f.

The operation portion 14 and the display portion 15 are arranged on the upper surface 50e of the apparatus main body 50 in the Y axis direction.

The operation portion 14 is configured to include a power button 55, a decision button 54, a return button 56, and a cross button 60. The cross button 60 is configured with an up button 61, a down button 62, a left button 63, and a right button 64. In the color measurement apparatus 1 according to the present embodiment, all operation buttons are arranged on the upper surface 50e and are integrated in the operation portion 14.

The power button 55 is a button for powering the color measurement apparatus 1 ON and OFF. In addition, the decision button 54 is a button for deciding various settings displayed on the display portion 15, that is, a button for deciding a color measurement condition, and is also a button for executing color measurement. The decision button 54 has a perfect circular shape in a view from the Z axis direction.

The return button 56 is a button for returning to an immediately previous state in the user interface displayed on the display portion 15 and is also a button for canceling execution of an operation.

The cross button 60 is a button for selecting various items in the user interface displayed on the display portion 15. A vertical line 58a parallel to the Y axis direction is attached to a surface of the up button 61, and a vertical line 58b parallel to the Y axis direction is attached to a surface of the down button 62. The vertical lines 58a and 58b are at positions that pass through the center position CL when the vertical lines 58a and 58b are extended in the Y axis direction.

In addition, a horizontal line 58c parallel to the X axis direction is attached to a surface of the left button 63, and a horizontal line 58d parallel to the X axis direction is attached to a surface of the right button 64. The horizontal lines 58c and 58d are at positions that pass through the center position CL when the horizontal lines 58c and 58d are extended in the X axis direction.

Various information such as the color measurement result is displayed on the display portion 15. The display portion 15 is configured with a liquid crystal display 67 in the present embodiment (refer to FIG. 8 as well). Hereinafter, the liquid crystal display 67 will be abbreviated to the LCD 67. A display portion cover 57 that is a transparent member is disposed in an upper portion of the LCD 67, and a part of the upper surface 50e is formed by the display portion cover 57.

In the present embodiment, it is configured that a step almost does not occur between an upper surface of the display portion cover 57 and an upper surface of the operation portion 14 as illustrated in FIG. 20. Accordingly, the upper surface 50e is configured as a planar surface that almost does not have a step as a whole. However, an upper surface of the decision button 54 is slightly recessed as illustrated in FIG. 20 and is formed into a shape that fits a pulp of a finger of the user pushing the decision button 54 as illustrated in FIG. 27.

Figure 4:
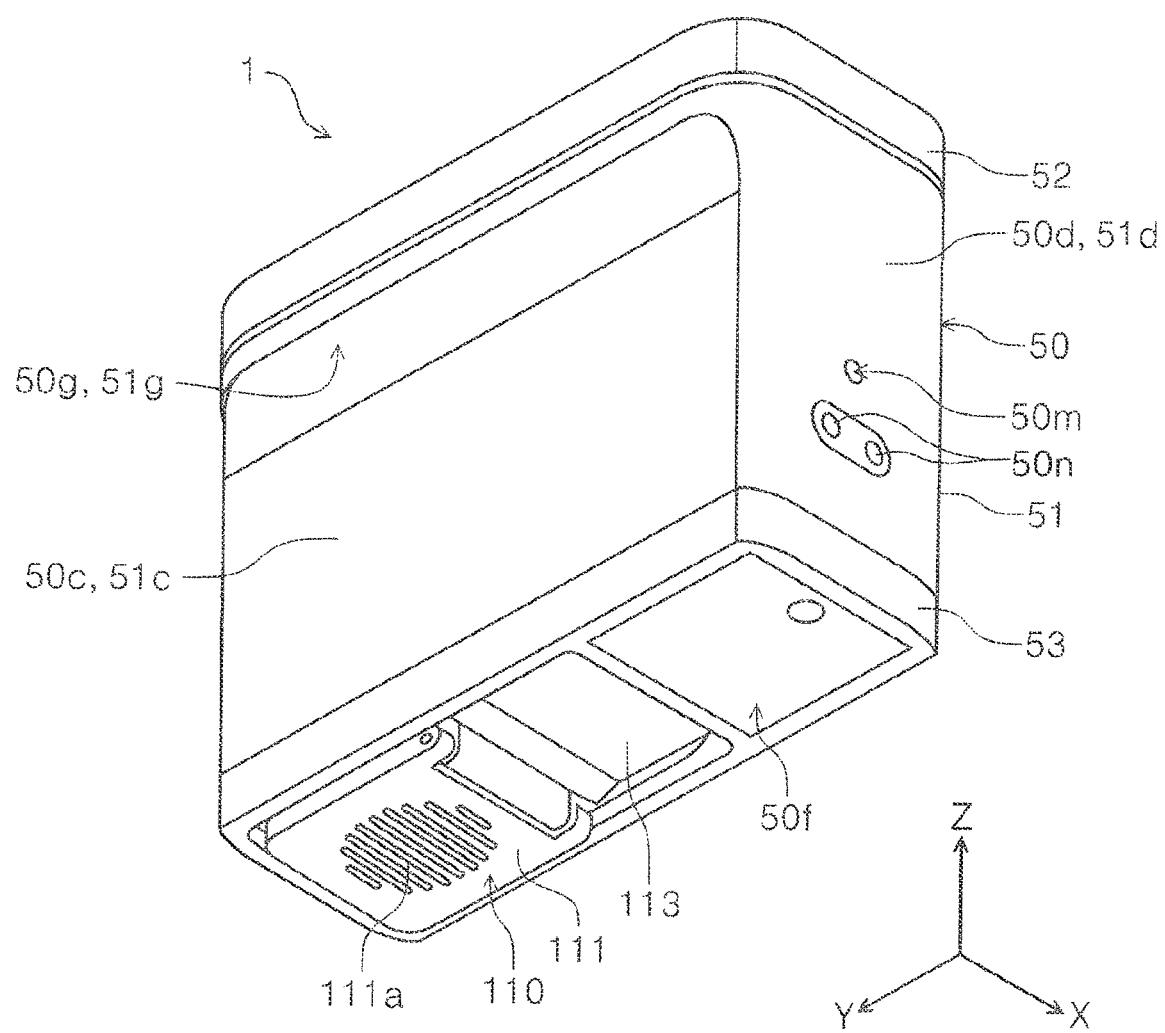
FIG. 4 is a perspective view of the color measurement apparatus viewed from below.

The shutter unit 110 is disposed on the bottom surface 50f as illustrated in FIG. 4 and FIG. 6. FIG. 4 illustrates a state where the shutter unit 110 is at a closed position, and FIG. 6 illustrates a state where the shutter unit 110 is at an open position. The shutter unit 110 can be displaced between the closed position and the open position by sliding the shutter unit 110 in the Y axis direction. In addition, the shutter unit 110 is disposed to be holdable at the closed position and the open position.

The shutter unit 110, as will be described in detail later, is configured to include a shutter holding member 111 and a link member 113. The shutter holding member 111 includes a plurality of ribs 111a on a surface thereof. The user can slide the shutter unit 110 in the Y axis direction by hooking the pulp of the finger to the ribs 111a.

Opening the shutter unit 110 exposes the opening portion 21a and the measurement window portion 87a as illustrated in FIG. 6. The opening portion 21a and the measurement window portion 87a are open on the bottom surface 50f of the apparatus. Here, being open means that light enters, and for example, means that a transparent glass plate may be disposed.

As illustrated in FIG. 20, the opening portion 21a is formed in an opening portion forming member 21, and the measurement window portion 87a is formed in a light condensing member 87 that is positioned in the +Z direction with respect to the opening portion forming member 21. Measurement light emitted from the light emission portion 9 passes between the light condensing member 87 and the opening portion forming member 21 as illustrated by an arrow inside the opening portion 21a in FIG. 20, and is emitted toward the measurement target 200 from the opening portion 21a. Light arriving from the measurement target 200 enters inside the apparatus from the opening portion 21a, further passes through the measurement window portion 87a, and is incident on the incident light processing portion 2.

As illustrated in FIG. 5 and FIG. 6, the center position CL coincides with center positions of the opening portion 21a and the measurement window portion 87a. In addition, a straight line VCL is a straight line parallel to the Y axis direction and is a straight line passing through the center position CL in a view from the Z axis direction. In addition, a straight line HCL is a straight line parallel to the Y axis direction and is a straight line passing through the center position CL in a view from the Z axis direction.

In the present embodiment, the center position CL coincides with a center position of the decision button 54 in the X-Y plane and also coincides with a center position of the cross button 60.

The power button 55 and the return button 56 are symmetrically arranged about the straight line VCL as illustrated in FIG. 5.

Figure 3:
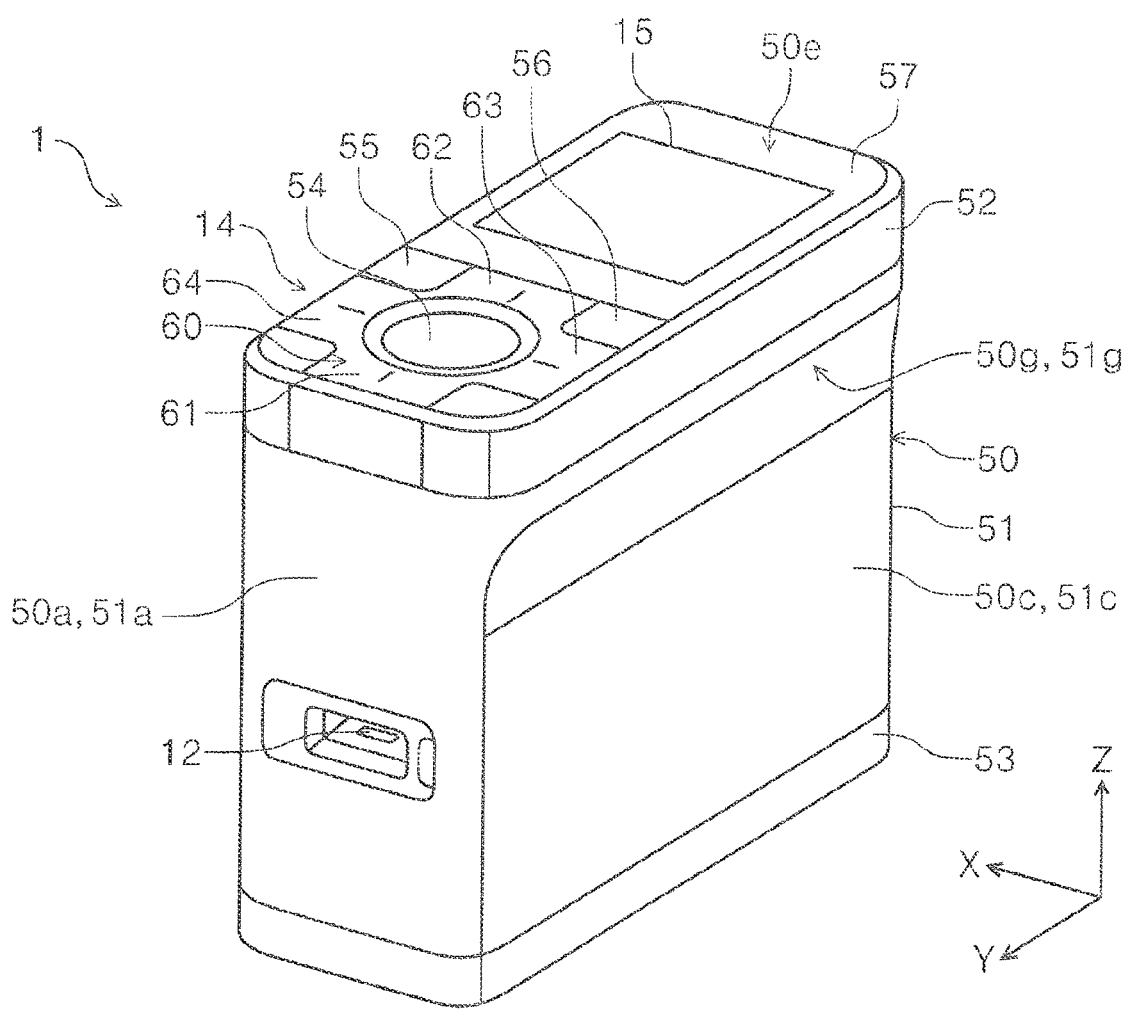
FIG. 3 is a perspective view of the color measurement apparatus viewed from above.

Next, as illustrated in FIG. 3, the wired IF 12 is disposed on the front surface 50a of the apparatus main body 50. In addition, as illustrated in FIG. 4, an opening 50m is formed on the rear surface 50d of the apparatus main body 50, and a reset switch 71 (refer to FIG. 9 and FIG. 20) is disposed behind the opening 50m. The reset switch 71 is a switch for returning various settings of the color measurement apparatus 1 to an initial state.

In addition, two openings 50n are formed at positions in the −Z direction with respect to the opening 50m, and it is configured that the user can easily carry the color measurement apparatus 1 by passing a strap (not illustrated) through the two openings 50n.

As illustrated in FIG. 3, FIG. 4, FIG. 21, and FIG. 22, a grip portion 50g is formed on the right surface 50b and the left surface 50c of the apparatus main body 50. The grip portion 50g is configured with a recessed portion 51g formed in each of the right wall portion 51b and the left wall portion 51c of the main casing 51. The recessed portion 51g is formed by a curved surface that faces toward a center, in the X axis direction, of the apparatus main body 50 in the −Z direction.

By disposing the grip portion 50g, the user can easily and securely grip the apparatus main body 50.

Substrate Configuration of Color Measurement Apparatus 1

Next, a substrate configuration of the color measurement apparatus 1 will be described.

Figure 7:
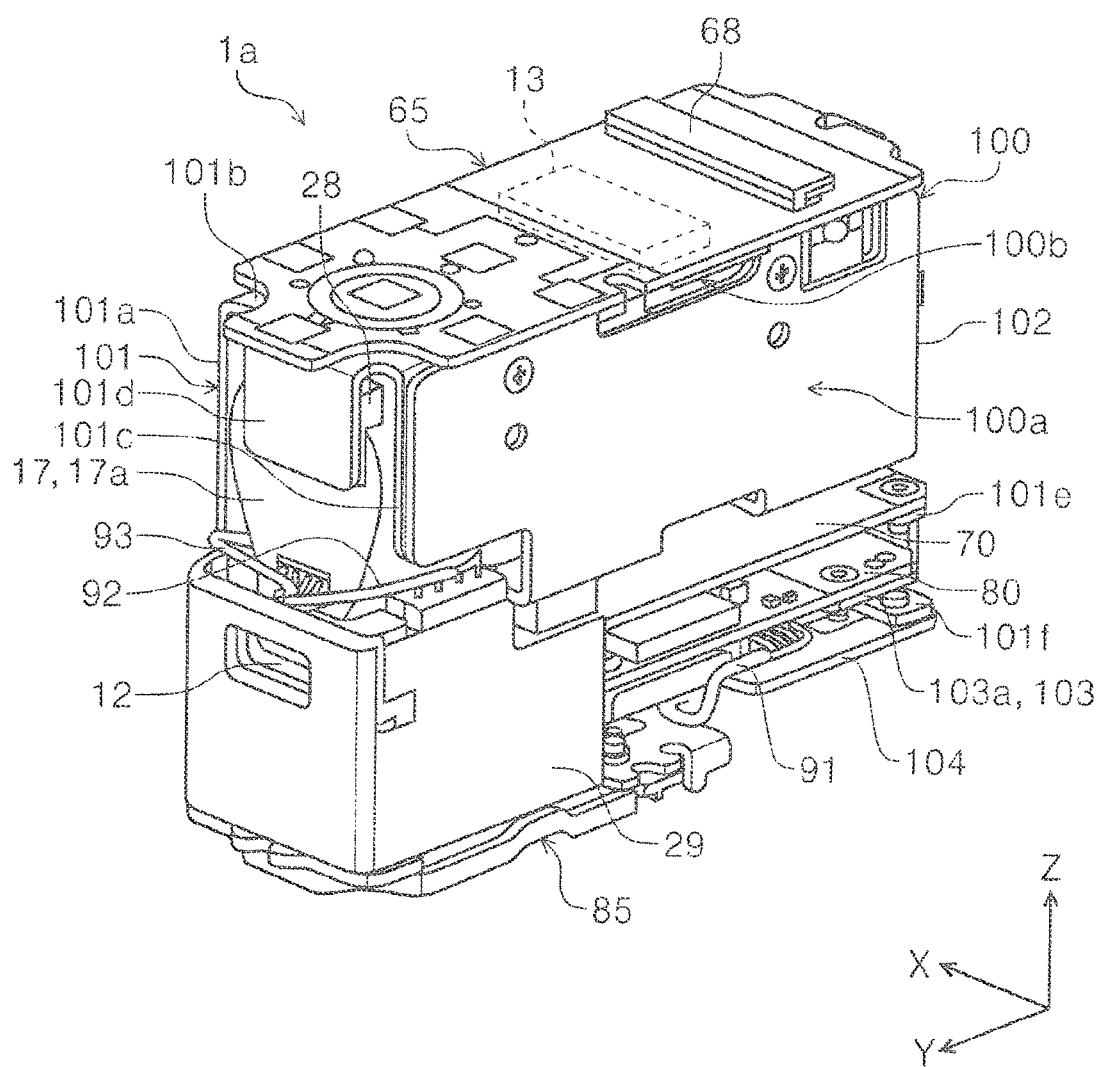
FIG. 7 is a perspective view of a main body assembly.

A main body assembly 1a illustrated in FIG. 7 is an assembly body disposed inside the main casing 51 and is configured by assembling a plurality of circuit substrates and the like in a frame assembly 100 that is an assembly of a plurality of frames.

Figure 8:
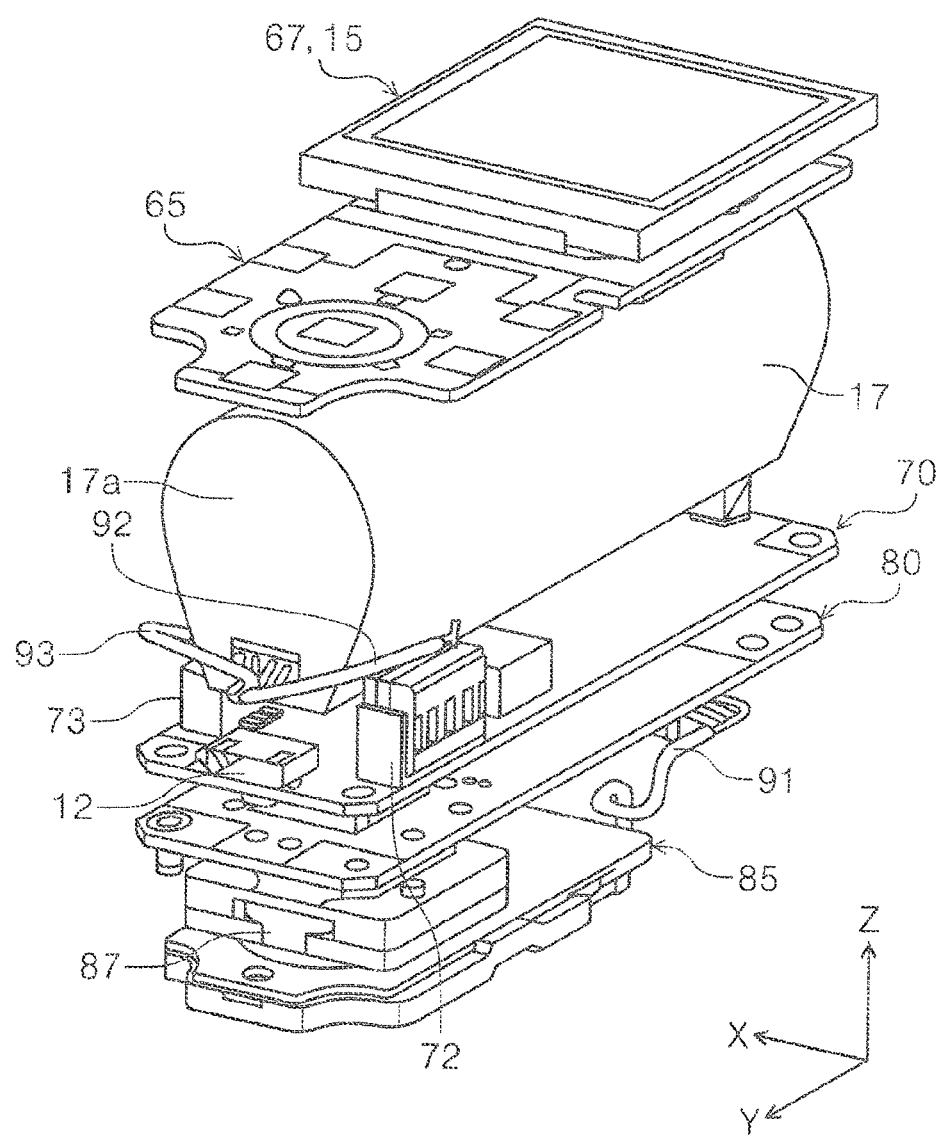
FIG. 8 is a perspective view illustrating arrangement of each circuit substrate and a battery from above.
Figure 9:
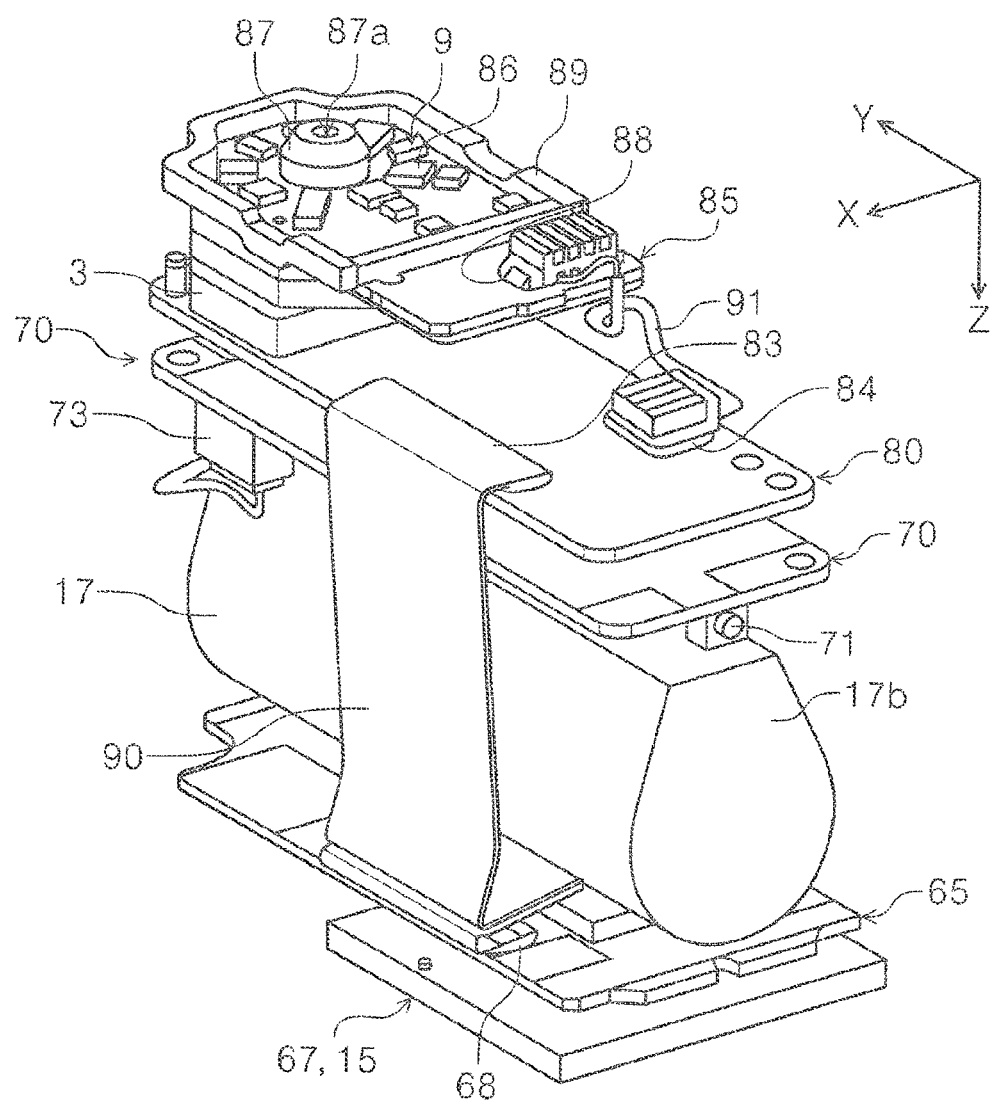
FIG. 9 is a perspective view illustrating arrangement of each circuit substrate and the battery from below.

As illustrated in FIG. 7, FIG. 8, and FIG. 9, the plurality of circuit substrates are configured with a panel substrate 65 as a "second circuit substrate", a battery control substrate 70 as a "third circuit substrate", a light reception portion substrate 80 as a "first circuit substrate", and a light emission portion substrate 85 as a "fourth circuit substrate". The plurality of circuit substrates are disposed to overlap at intervals in the Z axis direction. The battery 17 is arranged between the panel substrate 65 and the battery control substrate 70 in the Z axis direction.

Hereinafter, a configuration of each circuit substrate will be described with reference to FIG. 10 to FIG. 13 and other appropriate drawings as well. Hereinafter, a surface of each circuit substrate in the +Z direction may be referred to as an "upper surface", and a surface of each circuit substrate in the −Z direction may be referred to as a "lower surface". In addition, in FIG. 10 to FIG. 13, a part of electronic components disposed on the substrate is not illustrated.

The panel substrate 65 includes a LCD coupling portion 66 on the upper surface thereof as illustrated in the upper part of FIG. 10. The LCD 67 is coupled to the LCD coupling portion 66 by a cable 67a as illustrated in FIG. 20.

In the upper part of FIG. 10, a contact for detecting a push of each operation button is disposed on the upper surface of the panel substrate 65 at a position corresponding to each operation button constituting the operation portion 14. Reference sign 54a denotes a contact disposed at a position corresponding to the decision button 54. Reference sign 54a denotes a contact disposed at a position corresponding to the decision button 54. Reference signs 61a, 62a, 63a, and 64a are contacts disposed at positions corresponding to the up button 61, the down button 62, the left button 63, the right button 64 (refer to FIG. 1 and the like), respectively. In addition, reference signs 55a and 56a are contacts disposed at positions corresponding to the power button 55 and the return button 56, respectively.

As illustrated in the lower part of FIG. 10, a first substrate coupling connector 68 is disposed on the lower surface of the panel substrate 65. The panel substrate 65 and the light reception portion substrate 80 described later are coupled by coupling the first substrate coupling connector 68 to a fourth substrate coupling connector 83 illustrated in the lower part of FIG. 12 by a flexible flat cable (FFC) 90 as illustrated in FIG. 9.

In addition, as illustrated in the lower part of FIG. 10, the wireless communication portion 13 that is a communication module is disposed on the lower surface of the panel substrate 65.

Next, the battery control substrate 70 will be described with reference to FIG. 11. The battery control substrate 70 implements a function of the battery control portion 16 (refer to FIG. 1). As illustrated in the upper part of FIG. 11, the battery control substrate 70 includes the reset switch 71, the wired IF 12, a first battery connector 72, and a second battery connector 73 on the upper surface thereof. A battery control circuit not illustrated in FIG. 11 is disposed on the upper surface of the battery control substrate 70.

The first battery connector 72 is coupled to the battery 17 by a first battery cable 92 as illustrated in FIG. 8, and the second battery connector 73 is coupled to the battery 17 by a second battery cable 93 as illustrated in FIG. 8.

As illustrated in the lower part of FIG. 11, the battery control substrate 70 includes a second substrate coupling connector 74. The battery control substrate 70 and the light reception portion substrate 80 are coupled by engaging the second substrate coupling connector 74 with a third substrate coupling connector 82 illustrated in the upper part of FIG. 12. Accordingly, power of the battery 17 is supplied to each circuit substrate through the light reception portion substrate 80.

Next, the light reception portion substrate 80 will be described with reference to FIG. 12. The light reception portion substrate 80 includes a photo diode (PD) substrate 5 on the upper surface thereof and also includes the third substrate coupling connector 82. As illustrated in FIG. 20, the PD substrate 5 includes the photo diode 4a on the lower surface thereof. The PD substrate 5 is a circuit substrate constituting the light reception portion 4 (refer to FIG. 1). That is, the PD substrate 5 constitutes the incident light processing portion 2 (refer to FIG. 1) that processes incident light.

The light reception portion substrate 80 includes the optical filter device 3, the fourth substrate coupling connector 83, and a fifth substrate coupling connector 84 on the lower surface thereof. The light reception portion substrate 80 and the light emission portion substrate 85 described later are coupled by coupling the fifth substrate coupling connector 84 to a sixth substrate coupling connector 88 illustrated in the lower part of FIG. 13 by a coupling cable 91 as illustrated in FIG. 9.

Electronic components not illustrated in FIG. 11 are disposed in the light reception portion substrate 80. The electronic components not illustrated in FIG. 11 include the MCU 10 (refer to FIG. 1), a CV converter constituting the electrostatic capacitance detection portion 6 (refer to FIG. 1), a DC/DC converter that converts a voltage of the battery 17, an amplifier that adjusts an output from the DC/DC converter under control of the MCU 10 and supplies the adjusted output to the optical filter device 3, a temperature sensor for detecting a temperature around the optical filter device 3, and the like.

As illustrated in FIG. 11, a shielding sheet 29 is disposed to surround the PD substrate 5 and the optical filter device 3 disposed in the light reception portion substrate 80 (refer to FIG. 7 as well). Accordingly, entrance of extraneous light into the PD substrate 5 and the optical filter device 3 is suppressed.

Next, the light emission portion substrate 85 will be described with reference to FIG. 13. The light emission portion substrate 85 includes the light condensing member 87 throughout between the upper surface and the lower surface thereof. The measurement window portion 87a is formed in the light condensing member 87.

As illustrated in the lower part of FIG. 13, the sixth substrate coupling connector 88 is disposed on the lower surface of the light emission portion substrate 85, and a plurality of light emission elements 86 are disposed around the light condensing member 87. The plurality of light emission elements 86 are configured with light emission elements having different wavelength distributions for light emission.

A light shielding member 89 is disposed around the light emission elements 86, and leakage of the measurement light emitted from the light emission elements 86 is suppressed by the light shielding member 89.

Configuration of Frame Assembly

Next, the frame assembly 100 constituting a base of the apparatus main body 50 will be described.

In FIG. 14 to FIG. 17, the frame assembly 100 is configured to include a main frame 101, a battery holding frame 102, a light reception portion substrate holding frame 103, and a bottom frame 105. In the present embodiment, all frames are formed by folding a metal material. More specifically, aluminum is used as the material. Instead of folding the metal material, each frame can be created by die casting or the like.

Hereinafter, each frame will be described in order. The main frame 101 is a frame forming the base of the apparatus main body 50 and includes a main plate portion 101a that forms a frame surface extending in the Y axis direction and the Z axis direction, in other words, a frame surface that is wide in the Y-Z plane, as illustrated in FIG. 18. In addition, the main frame 101 includes a panel substrate support portion 101b that forms a frame surface which extends in the −X direction from a +Z direction end portion of the main plate portion 101a and is parallel to the X-Y plane.

As illustrated in FIG. 7 and FIG. 20, the panel substrate support portion 101b supports the panel substrate 65 from below. The panel substrate 65 is fixed with respect to the panel substrate support portion 101b by a screw not illustrated. The panel substrate 65 is in surface contact with the panel substrate support portion 101b. Accordingly, heat of the panel substrate 65 is transferred to the panel substrate support portion 101b, that is, the main frame 101.

As illustrated in FIG. 18, in a −Z direction end portion of the main plate portion 101a, a battery control substrate support portion 101e that is parallel to the X-Y plane and has a +Y direction end portion folded in the −X direction and furthermore, a +Z direction end portion folded in the −Y direction is formed. Similarly, in the −Z direction end portion of the main plate portion 101a, the battery control substrate support portion 101e that is parallel to the X-Y plane and has a −Y direction end portion folded in the −X direction and furthermore, a +Z direction end portion folded in the +Y direction is formed.

As illustrated in FIG. 7 and FIG. 20, the battery control substrate support portion 101e supports the battery control substrate 70 from below. The battery control substrate 70 is fixed with respect to the battery control substrate support portion 101e by a screw not illustrated. The battery control substrate 70 is in surface contact with the battery control substrate support portion 101e. Accordingly, heat of the battery control substrate 70 is transferred to the battery control substrate support portion 101e, that is, the main frame 101.

In FIG. 14 to FIG. 18, a frame holding portion 101f is formed in parallel with the X-Y plane below the battery control substrate support portion 101e. As illustrated in FIG. 14 and FIG. 16, the frame holding portion 101f holds a light emission portion substrate holding frame 104. The light emission portion substrate holding frame 104 is fixed to a lower side of the frame holding portion 101f by a screw not illustrated. The light emission portion substrate holding frame 104 is in surface contact with the frame holding portion 101*f*. That is, the light emission portion substrate holding frame 104 is in direct contact with the main frame 101. Accordingly, heat of the light emission portion substrate holding frame 104 is transferred to the frame holding portion 101*f*, that is, the main frame 101.

As illustrated in FIG. 7 and FIG. 20, the light emission portion substrate holding frame 104 holds the light emission portion substrate 85. The light emission portion substrate holding frame 104 is one example of a second subframe that holds the light emission portion substrate 85. The light emission portion substrate 85 is fixed to a lower side of the light emission portion substrate holding frame 104 by a screw not illustrated. The light emission portion substrate 85 is in surface contact with the light emission portion substrate holding frame 104. Accordingly, heat of the light emission portion substrate 85 is transferred to the light emission portion substrate holding frame 104 and further to the main frame 101.

As illustrated in FIG. 15, the bottom frame 105 is fixed to a lower surface of the light emission portion substrate holding frame 104 by a screw not illustrated. As will be described in detail later, the bottom frame 105 is a frame for fixing one end of a torsion spring 117 (refer to FIG. 32) that presses the shutter unit 110 (refer to FIG. 32).

The bottom frame 105 includes a first plate portion 105*a* and a second plate portion 105*b*, and the second plate portion 105*b* is in surface contact with the light emission portion substrate holding frame 104. Accordingly, heat of the light emission portion substrate holding frame 104 is transferred to the bottom frame 105. That is, the bottom frame 105 functions as a heat sink that promotes heat dissipation of the light emission portion substrate holding frame 104.

In FIG. 14 to FIG. 18, the main frame 101 has a subplate portion 101*c* that forms a frame surface which extends in the −Z direction from a −X direction end portion of the panel substrate support portion 101*b* and is parallel to the Y-Z plane. Here, the battery holding frame 102 is attached to the main frame 101. In a state where the battery holding frame 102 is attached, the subplate portion 101*c* and the panel substrate support portion 101*b*, together with the battery holding frame 102, constitute a battery holding portion 100*a* that holds the battery 17.

Hereinafter, the battery holding portion 100*a* will be further described. The battery holding frame 102 includes a battery support portion 102*a* that forms a frame surface parallel to the X-Y plane. As illustrated in FIG. 20, the battery support portion 102*a* supports the battery 17 from below. A bottom surface of the battery 17 is in surface contact with the battery support portion 102*a*. Accordingly, heat of the battery 17 is transferred to the battery support portion 102*a*, that is, the battery holding portion 100*a*.

In FIG. 14 to FIG. 17, a first frame portion 102*b* that forms a frame surface parallel to the Y-Z plane stands in the +Z direction from a −X direction end portion of the battery support portion 102*a*. In addition, a second frame portion 102*c* that forms a frame surface parallel to the Y-Z plane stands in the +Z direction from a +X direction end portion of the battery support portion 102*a*.

The first frame portion 102*b* is positioned in the −X direction with respect to the subplate portion 101*c* of the main frame 101 and is in surface contact with the subplate portion 101*c*. In addition, the second frame portion 102*c* is positioned in the −X direction with respect to the main plate portion 101*a* of the main frame 101 and is in surface contact with the main plate portion 101*a*.

In such a manner, the battery holding portion 100*a* is configured to surround the battery 17 by the battery holding frame 102, the panel substrate support portion 101*b*, and the subplate portion 101*c*.

The battery support portion 102*a* is one example of a first wall portion that supports the battery 17 from below, and constitutes the battery holding portion 100*a*. In addition, the panel substrate support portion 101*b* is one example of a second wall portion that faces the battery support portion 102*a*, and constitutes the battery holding portion 100*a*. In addition, the subplate portion 101*c* is one example of a third wall portion that is positioned in the −X direction with respect to the battery 17, and constitutes the battery holding portion 100*a*. In addition, the second frame portion 102*c* is one example of a fourth wall portion that is positioned in the +X direction with respect to the battery 17, and constitutes the battery holding portion 100*a*.

As illustrated in FIG. 7, FIG. 14, and FIG. 20, a regulation portion 101*d* is formed to extend in the −Z direction from a +Y direction end portion of the panel substrate support portion 101*b*. As illustrated in FIG. 7 and FIG. 20, the regulation portion 101*d* regulates movement of the battery 17 in the +Y direction.

As illustrated in FIG. 20 as well, an elastic material 28 is disposed between the regulation portion 101*d* and a first end portion 17*a* that is a +Y direction end portion of the battery 17. As illustrated in FIG. 20, the elastic material 28 is also disposed between an upper surface of the battery 17 and the panel substrate support portion 101*b*.

Next, as illustrated in FIG. 14 and FIG. 16, the light reception portion substrate holding frame 103 includes a base portion 103*b* that forms a frame surface parallel to the X-Y plane, and a light reception portion substrate support portion 103*a*. The light reception portion substrate support portion 103*a* is positioned further in the +Z direction than the base portion 103*b*. As illustrated in FIG. 7 and FIG. 20, the light reception portion substrate support portion 103*a* supports the light reception portion substrate 80 from below. The light reception portion substrate 80 is fixed to the light reception portion substrate support portion 103*a* by a screw not illustrated. The light reception portion substrate holding frame 103 is one example of a first subframe that holds the light reception portion substrate 80.

The light reception portion substrate 80 is in surface contact with the light reception portion substrate support portion 103*a*. Accordingly, heat of the light reception portion substrate 80 is transferred to the light reception portion substrate holding frame 103.

As illustrated in FIG. 19, the light reception portion substrate holding frame 103 is supported from below by the light emission portion substrate holding frame 104.

Reference signs 104*a* and 104*b* denote a frame support portion that is a part supporting the light reception portion substrate holding frame 103. The frame support portions 104*a* and 104*b* form frame surfaces parallel to the X-Y plane and are in surface contact with a bottom surface of the light reception portion substrate holding frame 103. Accordingly, heat of the light reception portion substrate holding frame 103 is transferred to the light emission portion substrate holding frame 104. Since the light emission portion substrate holding frame 104 is in contact with the main frame 101, heat of the light reception portion substrate holding frame 103 is transferred to the main frame 101 through the light emission portion substrate holding frame 104. That is, the light reception portion substrate holding frame 103 is said to be in indirect contact with the main frame 101.

Other Configurations of Color Measurement Apparatus

Hereinafter, other configurations of the color measurement apparatus 1 excluding the shutter unit 110 will be described.

In FIG. 23, a contour of the battery 17 in a view from the Z axis direction is illustrated by a chain double dash line. In addition, the optical filter device 3, the PD substrate 5, the wireless communication portion 13, the battery control substrate 70, and the light reception portion substrate 80 are illustrated by a broken line. In the present embodiment, in a view from the Z axis direction, a contour of the battery control substrate 70 coincides with a contour of the light reception portion substrate 80 excluding a −Y direction end portion. In the −Y direction end portion, the contour of the light reception portion substrate 80 is positioned slightly further in the +Y direction than the contour of the battery control substrate 70.

Here, as described above, the optical filter device 3 and the PD substrate 5 constitute the incident light processing portion 2 that processes the incident light. As illustrated in FIG. 23, the incident light processing portion 2 and the battery 17 have an overlapping part in a view from the Z axis direction.

More specifically, in the present embodiment, the incident light processing portion 2 falls within a region of the battery 17 in a view from the Z axis direction. While illustration is not provided in FIG. 23, as is apparent from FIG. 20 and FIG. 21, the bandpass filter 7 (refer to FIG. 20 and FIG. 21) constituting the incident light processing portion 2 falls within a region of the PD substrate 5 in a view from the Z axis direction.

In such a manner, since the incident light processing portion 2 and the battery 17 have an overlapping part in a view from the Z axis direction, an apparatus dimension in the X axis direction and the Y axis direction that are directions intersecting with the Z axis direction, that is, the apparatus dimension in the horizontal direction, can be suppressed, compared to a configuration in which the incident light processing portion 2 and the battery 17 are arranged in a direction intersecting with the Z axis direction, that is, the horizontal direction.

In addition, in the present embodiment, since the incident light processing portion 2, that is, the optical filter device 3 and the PD substrate 5, falls within the region of the battery 17 in a view from the Z axis direction, the apparatus dimension in the horizontal direction can be further suppressed.

In addition, FIG. 24 illustrates a contour of the battery holding portion 100a (refer to FIG. 7 and FIG. 14) that holds the battery 17, instead of the contour of the battery 17 illustrated in FIG. 23. That is, even from a viewpoint of the battery holding portion 100a, the incident light processing portion 2 and the battery holding portion 100a also have an overlapping part in a view from the Z axis direction. Thus, the apparatus dimension in the horizontal direction can be suppressed, compared to a configuration in which the incident light processing portion 2 and the battery holding portion 100a are arranged in a direction intersecting with the Z axis direction, that is, the horizontal direction.

In the present embodiment, while the optical filter device 3 and the PD substrate 5, that is, the incident light processing portion 2, fall within the region of the battery 17 or the battery holding portion 100a in a view from the Z axis direction, a part of the incident light processing portion 2 may be out of the region of the battery 17 or the battery holding portion 100a.

In addition, as illustrated in FIG. 23, in the present embodiment, the battery 17 falls within a region of the light reception portion substrate 80 in the X axis direction, in a view from the Z axis direction. In addition, a +Y direction end portion of the battery 17 is inward of a +Y direction end portion of the light reception portion substrate 80, and a −Y direction end portion of the battery 17 extends slightly further than a −Y direction end portion of the light reception portion substrate 80. However, the battery 17 may be configured to completely fall within the region of the light reception portion substrate 80 in a view from the Z axis direction. With such a configuration, the apparatus dimension in the horizontal direction can be further suppressed.

In addition, in the present embodiment, as illustrated in FIG. 23, the display portion 15 and the light reception portion substrate 80 have an overlapping part in a view from the Z axis direction.

In addition, the color measurement apparatus 1 includes the light reception portion substrate 80 including the incident light processing portion 2, the panel substrate 65 to which the LCD 67 is coupled, the battery control substrate 70 to which the battery 17 is coupled, and the light emission portion substrate 85 including the light emission portion 9 that emits the light for measurement.

In order from the bottom surface 50f to the upper surface 50e of the apparatus main body 50 in the Z axis direction, the light emission portion substrate 85, the light reception portion substrate 80, and the panel substrate 65 are arranged in an overlapping manner as illustrated in FIG. 8.

In addition, in order from the bottom surface 50f to the upper surface 50e of the apparatus main body 50 in the Z axis direction, the battery control substrate 70, the battery 17, and the panel substrate 65 are arranged in an overlapping manner.

In the present embodiment, in order from the bottom surface 50f to the upper surface 50e of the apparatus main body 50 in the Z axis direction, the light emission portion substrate 85, the light reception portion substrate 80, the battery control substrate 70, the battery 17, and the panel substrate 65 are arranged in an overlapping manner.

With such a configuration, the apparatus dimension in the X axis direction and the Y axis direction, that is, the horizontal direction, that are directions intersecting with the Z axis direction can be suppressed.

Electronic components mounted on the battery control substrate 70 may be appropriately arranged in the panel substrate 65 or the light reception portion substrate 80 without disposing the battery control substrate 70.

In addition, configurations disposed in an overlapping manner in the Z axis direction may be a combination of any two, or three or more of the light emission portion substrate 85, the light reception portion substrate 80, the battery control substrate 70, the battery 17, and the panel substrate 65.

In addition, the battery 17 has a shape that extends in the Y axis direction, which is the longitudinal direction of the apparatus, and the first end portion 17a that is the +Y direction end portion of the battery 17 faces a front inner wall surface 51e of the main casing 51 as illustrated in FIG. 20. In addition, a second end portion 17b that is the −Y direction end portion of the battery 17 faces a rear inner wall surface 51f of the main casing 51. That is, both end portions of the battery 17 in the Y axis direction face side wall inner surfaces of the main casing 51 in the Y axis direction.

Accordingly, compared to a configuration in which the battery 17 is arranged in a biased manner in the Y axis direction, excellent weight balance of the apparatus main body 50 in the Y axis direction is achieved, and handleability of the apparatus is improved.

In the present embodiment, as illustrated in FIG. 21 and FIG. 22, the battery 17 is at a center position of the apparatus even in the X axis direction. Thus, excellent weight balance of the apparatus main body 50 in the X axis direction is also achieved.

In addition, as described with reference to FIG. 3, FIG. 4, FIG. 21, and FIG. 22, the recessed portion 51g constituting the grip portion 50g is formed in the main casing 51 on the right surface 50b and the left surface 50c of the apparatus main body 50, and it is configured that the user can easily and securely grip the apparatus main body 50. Here, a range illustrated by arrow Za in FIG. 22 and FIG. 25 is a range in which the recessed portion 51g is formed in the Z axis direction. As illustrated in FIG. 25, the recessed portion 51g and the battery 17 have an overlapping part in a view from the X axis direction.

Accordingly, the battery 17 that is a heavy object is configured to be close to a grip position, and the handleability of the apparatus is improved.

In addition, as illustrated in FIG. 22, in the right wall portion 51b and the left wall portion 51c of the main casing 51, parts on a bottom surface 50f side, that is, in the –Z direction, from the recessed portion 51g are at the same position as a part of the LCD 67 in the X axis direction. The parts of the right wall portion 51b and the left wall portion 51c in the –Z direction from the recessed portion 51g are parts in the –Z direction from a position denoted by reference sign Z4. Accordingly, as illustrated in FIG. 26, the parts of the right wall portion 51b and the left wall portion 51c in the –Z direction from the recessed portion 51g have an overlapping part with the LCD 67 in a view from the Z axis direction. Accordingly, as illustrated in FIG. 22, size reduction, in the X axis direction, of an apparatus part in the –Z direction from the recessed portion 51g can be achieved.

In addition, as illustrated in FIG. 23, the color measurement apparatus 1 has an overlapping part with the opening portion 21a and the operation portion 14 in a view from the Z axis direction. Accordingly, when the user positions the opening portion 21a to a measured part of the measurement target 200 (refer to FIG. 1), the positioning can be performed based on a position of the operation portion 14. That is, the opening portion 21a can be positioned to the measured part using a simple configuration.

Particularly, the color measurement apparatus 1 is configured as a handy type, and a position of a fingertip Fa and a position of the opening portion 21a come closer when the user operates the operation portion 14 with the fingertip Fa as illustrated in FIG. 27. Thus, the position of the opening portion 21a is intuitively easily perceived.

In addition, particularly, in the present embodiment, a center position of the opening portion 21a coincides with the center position of the decision button 54 in a view from the Z axis direction.

Accordingly, the opening portion 21a can be more accurately positioned to the measured part.

In addition, as illustrated in FIG. 5, the decision button 54 has a circular shape in a view from the Z axis direction, and the cross button 60 for selecting various items is arranged around the decision button 54. In the cross button 60, a mark line is disposed to radiate outward from the center position of the decision button 54. The mark line is configured with the vertical lines 58a and 58b and the horizontal lines 58c and 58d.

Accordingly, when the upper surface 50e of the apparatus is viewed, the center position of the opening portion 21a is easily perceived.

In addition, the operation portion 14 is configured by including the power button 55 and all buttons related to measurement on the upper surface 50e. Accordingly, the power button 55 and all buttons related to measurement can be easily recognized, and the apparatus can be easily operated.

In addition, the upper surface 50e including the operation portion 14 is formed into a planar shape. Accordingly, even in a case of mounting with the upper surface 50e down, mounting can be stably performed.

In addition, as illustrated in FIG. 28, the panel substrate 65 and the battery 17 have an overlapping part in a view from the Z axis direction. FIG. 28 illustrates a contour of the panel substrate 65 instead of the contours of the battery control substrate 70 and the light reception portion substrate 80 illustrated in FIG. 23. By causing the panel substrate 65 and the battery 17 to have an overlapping part in a view from the Z axis direction, the apparatus dimension in the horizontal direction can be suppressed, compared to a configuration in which the panel substrate 65 and the battery 17 are arranged in the X axis direction or the Y axis direction, that is, the horizontal direction.

The battery 17 may be configured to fall within a region of the panel substrate 65 in a view from the Z axis direction. With such a configuration, the apparatus dimension in the horizontal direction can be further suppressed.

In addition, in the present embodiment, the wireless communication portion 13 falls within the region of the battery 17 in a view from the Z axis direction. However, a part of the wireless communication portion 13 may be within the region of the battery 17, or the entire wireless communication portion 13 may be outside the region of the battery 17.

In addition, FIG. 29 illustrates the contour of the battery holding portion 100a (refer to FIG. 7 and FIG. 14) that holds the battery 17, instead of the contour of the battery 17 illustrated in FIG. 28. That is, even from the viewpoint of the battery holding portion 100a, the panel substrate 65 and the battery holding portion 100a also have an overlapping part in a view from the Z axis direction. Thus, the apparatus dimension in the horizontal direction can be suppressed, compared to a configuration in which the panel substrate 65 and the battery holding portion 100a are arranged in a direction intersecting with the Z axis direction, that is, the horizontal direction.

In addition, as illustrated in FIG. 7, the wireless communication portion 13 is disposed on the lower surface of the panel substrate 65, and the wireless communication portion 13 is arranged inside the battery holding portion 100a in a state where the panel substrate 65 is supported by the panel substrate support portion 101b. In such a manner, by arranging the wireless communication portion 13 using the inside of the battery holding portion 100a, size reduction of the apparatus can be achieved.

Here, there is a concern that heat dissipation from the battery holding portion 100a exerts an adverse effect on the wireless communication portion 13. However, a notch portion 100b is formed in the battery holding portion 100a (refer to FIG. 14 as well), and the wireless communication portion 13 is arranged at a position facing the notch portion 100b. That is, when the battery holding portion 100a is viewed from the −X direction, the wireless communication portion 13 is exposed through the notch portion 100*b*. Accordingly, exerting an adverse effect on the wireless communication portion 13 by heat dissipation from the battery holding portion 100*a* can be suppressed.

Next, in the present embodiment, as illustrated in FIG. 20, the battery 17 is disposed between the operation portion 14 and the incident light processing portion 2 in the Z axis direction. As described above, in the present embodiment, the incident light processing portion 2 includes the optical filter device 3 and the PD substrate 5. In FIG. 20, a position denoted by reference sign Z1 is a position furthest in the +Z direction in the PD substrate 5 that is positioned furthest in the +Z direction in the incident light processing portion 2. In addition, a position denoted by reference sign Z3 is a position furthest in the −Z direction in a part constituting the operation portion 14 and specifically, is a Z direction position of each contact (in FIG. 20, reference signs 54*a*, 61*a*, and 62*a*). A position denoted by reference sign Z2 is a middle position between the position Z1 and the position Z3.

Here, the battery 17 includes a thermistor 18 inside the battery 17. The thermistor 18 is one example of a temperature detection portion. When an internal temperature of the battery 17 acquired by the thermistor 18 exceeds a predetermined allowed temperature, the MCU 10 (refer to FIG. 1) cuts the supply of power to each constituent from the battery 17.

The thermistor 18 is positioned further in the +Z direction than the position Z2 in the Z axis direction, that is, arranged at a position closer to the operation portion 14 than the incident light processing portion 2.

Here, in the present embodiment, the incident light processing portion 2 is a part in which a part of the supplied power is converted into heat among the constituents of the color measurement apparatus 1, and is a part in which heat emission exerts an adverse effect on temperature detection performed by the thermistor 18. In the incident light processing portion 2, heat emission in the PD substrate 5 is particularly noticeable. However, since the thermistor 18 is arranged at a position closer to the operation portion 14 than the incident light processing portion 2, an adverse effect exerted on the thermistor 18 by heat generated in the incident light processing portion 2 can be suppressed, and a temperature of the battery 17 can be more appropriately detected.

In addition, as described above, the frame assembly 100 includes the battery holding portion 100*a* that has a shape surrounding the battery 17 (refer to FIG. 7). Thus, heat generated from the battery 17 favorably dissipates by the battery holding portion 100*a*.

In addition, the thermistor 18 and the incident light processing portion 2 are disposed in one side end portion of the main body assembly 1*a* (refer to FIG. 7) in the Y axis direction, that is, a position biased to a +Y direction end portion. The position biased to the +Y direction end portion means a position that is further in the +Y direction than a middle position of the main body assembly 1*a* in the Y axis direction. The wired IF 12 that is a coupling portion for performing wired communication with the external apparatus is included in one side end portion of the main body assembly 1*a* in the Y axis direction, that is, a position biased to the +Y direction end portion. The wired IF 12 is positioned between the thermistor 18 and the incident light processing portion 2 in the Z axis direction.

Here, since the wired IF 12 is disposed inside the opening portion (refer to FIG. 3), heat dissipation from the inside of the apparatus to an outside is promoted around the wired IF 12. As illustrated in FIG. 20, the wired IF 12 is positioned between the thermistor 18 and the incident light processing portion 2 in the Z axis direction. Thus, heat generated in the incident light processing portion 2 dissipates to the outside of the apparatus from the wired IF 12 before reaching the thermistor 18. Accordingly, an adverse effect exerted on the thermistor 18 by heat generated in the incident light processing portion 2 can be suppressed.

In addition, as illustrated in FIG. 20, the display portion 15 and the operation portion 14 are arranged in the Y axis direction, and the thermistor 18 is arranged within a region of the operation portion 14 in the Y axis direction. That is, while heat emission is more likely to be noticeable in the LCD 67 constituting the display portion 15 than in the operation portion 14, the thermistor 18 is arranged within the region of the operation portion 14 in the Y axis direction in a configuration in which the display portion 15 and the operation portion 14 are arranged in the Y axis direction as described above. Thus, an adverse effect exerted on the thermistor 18 by heat generated in the LCD 67 can be suppressed.

In addition, as illustrated in FIG. 7, FIG. 14, and FIG. 15, the color measurement apparatus 1 includes the light reception portion substrate 80 and the light emission portion substrate 85 and includes the frame assembly 100 that is formed of a metal material. The frame assembly 100 includes the main frame 101 that forms the base of the apparatus, the light reception portion substrate holding frame 103 that holds the light reception portion substrate 80, and the light emission portion substrate holding frame 104 that holds the light emission portion substrate 85. The light reception portion substrate holding frame 103 and the light emission portion substrate holding frame 104 are in direct or indirect contact with the main frame 101.

More specifically, in the present embodiment, as described above, each frame constituting the frame assembly 100 is formed of aluminum. As described above, the light emission portion substrate holding frame 104 is in direct contact with the main frame 101, and the light reception portion substrate holding frame 103 is in indirect contact with the main frame 101 through the light emission portion substrate holding frame 104.

With such a configuration, heat generated in the light reception portion substrate 80 and the light emission portion substrate 85 is transferred to the entire frame assembly 100. A local increase in temperature inside the apparatus can be suppressed, and exerting an adverse effect on the color measurement result and the like can be suppressed.

In the present embodiment, while the light reception portion substrate holding frame 103 is in indirect contact with the main frame 101, the light reception portion substrate holding frame 103 may be in direct contact with the main frame 101. In addition, in the present embodiment, while the light emission portion substrate holding frame 104 is in direct contact with the main frame 101, the light emission portion substrate holding frame 104 may be in indirect contact with the main frame 101.

When the light reception portion substrate holding frame 103 or the light emission portion substrate holding frame 104 is in indirect contact with the main frame 101 through another member, the other member is preferably a member of a metal material or the like having excellent thermal conductivity.

In addition, the main frame 101 includes the main plate portion 101*a* that forms a frame surface extending in the Y axis direction and the Z axis direction, in other words, a frame surface wide in the Y-Z plane, as illustrated in FIG.

18. Thus, a surface area of the main frame 101 is increased, and a heat dissipation efficiency is improved.

In addition, as described above with reference to FIG. 7, the frame assembly 100 includes the battery holding portion 100a that has a shape surrounding the battery 17. Thus, heat generated from the battery 17 is transferred to the battery holding portion 100a and efficiently dissipates through the main frame 101 and the battery holding frame 102.

In addition, the battery holding portion 100a includes the battery support portion 102a as the first wall portion that supports the battery 17 from below, and the panel substrate support portion 101b as the second wall portion that faces the battery support portion 102a and forms an upper surface side wall portion of the battery holding portion 100a. In addition, the battery holding portion 100a includes the subplate portion 101c as the third wall portion and the second frame portion 102c as the fourth wall portion that are positioned with the battery 17 interposed therebetween in the X axis direction. With such a configuration, heat generated from the battery 17 efficiently dissipates.

In addition, in the present embodiment, the panel substrate 65 and the battery control substrate 70 are in direct contact with the main frame 101. Thus, heat generated from the panel substrate 65 and the battery control substrate 70 is transferred to the main frame 101 and favorably dissipates.

The panel substrate 65 and the battery control substrate 70 may be configured to be in indirect contact with the main frame 101 through another member. Here, the other member is preferably a member of a metal material or the like having excellent thermal conductivity.

Configuration of Shutter Unit

Next, the shutter unit 110 disposed in a bottom portion of the apparatus main body 50 will be described. As illustrated in FIG. 30 to FIG. 34, the shutter unit 110 is a unit body that is configured to include the shutter holding member 111, the shutter member 112, and the link member 113. In the present embodiment, the shutter holding member 111, the shutter member 112, and the link member 113 are formed of a resin material.

The link member 113 is relatively rotatably coupled to the shutter holding member 111 through a coupling shaft 114 that has a center axis parallel to the X axis direction. A first guide shaft 121 and a second guide shaft 122 are disposed on a +X direction side surface and a -X direction side surface of the shutter holding member 111. In addition, a third guide shaft 123 is disposed on a +X direction side surface and a -X direction side surface of the link member 113.

As illustrated in FIG. 32, FIG. 33, and FIG. 35, a first lower guide portion 21c, a second lower guide portion 21d, and a third lower guide portion 21e are formed in the Y axis direction in a +X direction end portion and a -X direction end portion of the opening portion forming member 21. The first lower guide portion 21c and the second lower guide portion 21d have a shape in which a -Y direction end portion thereof is curved to the +Z direction in the -Y direction. In addition, the third lower guide portion 21e is formed into an inclined shape that extends slightly to the -Z direction in the -Y direction.

On a +X direction end portion and a -X direction end portion of the bottom casing 53, as illustrated in FIG. 35, a first upper guide portion 53c is formed with the first guide shaft 121 interposed between the first upper guide portion 53c and the first lower guide portion 21c. FIG. 35 illustrates the first upper guide portion 53c that is positioned in the +X direction end portion.

Similarly, on the +X direction end portion and the -X direction end portion of the bottom casing 53, a second upper guide portion 53d is formed with the second guide shaft 122 interposed between the second upper guide portion 53d and the second lower guide portion 21d. FIG. 35 illustrates the second upper guide portion 53d that is positioned in the +X direction end portion.

In addition, similarly, on the +X direction end portion and the -X direction end portion of the bottom casing 53, a third upper guide portion 53e is formed with the third guide shaft 123 interposed between the third upper guide portion 53e and the third lower guide portion 21e. FIG. 35 illustrates the third upper guide portion 53e that is positioned in the +X direction end portion.

In such a manner, the first guide shaft 121, the second guide shaft 122, and the third guide shaft 123 are in a state of being interposed between the opening portion forming member 21 and the bottom casing 53 in the Z axis direction, and are guided in the Y axis direction by the opening portion forming member 21 and the bottom casing 53.

The first guide shaft 121 and the second guide shaft 122 are disposed in the shutter holding member 111. Thus, a movement trajectory of the shutter holding member 111 is defined by the first lower guide portion 21c and the first upper guide portion 53c, and the second lower guide portion 21d and the second upper guide portion 53d.

In addition, the third guide shaft 123 is disposed in the link member 113. Thus, a movement trajectory of the link member 113 is defined by the third lower guide portion 21e and the third upper guide portion 53e, and the coupling shaft 114 in the shutter holding member 111.

A +Y direction movement limit, that is, the closed position, of the shutter unit 110 is defined by causing the first guide shaft 121 to abut on a movement regulation portion 53f formed in the bottom casing 53. In addition, a -Y direction movement limit, that is, the open position, of the shutter unit 110 is defined by causing the first guide shaft 121 to abut on a movement regulation portion 21f formed in the opening portion forming member 21. In the present embodiment, the second guide shaft 122 and the third guide shaft 123 do not define a Y direction movement limit of the shutter unit 110.

Next, as illustrated in FIG. 31, FIG. 33, FIG. 34, FIG. 36, and FIG. 37, a -Z direction surface of a part in which the opening portion 21a is formed in the opening portion forming member 21 is denoted by reference sign 21g. Hereinafter, the surface will be referred to as a shutter facing surface 21g. The shutter facing surface 21g is a planar surface that has a ring shape in plan view.

As illustrated in FIG. 34, the shutter facing surface 21g is positioned slightly further in the +Z direction than the bottom surface 50f, that is, does not protrude further in the -Z direction than the bottom surface 50f. In the shutter unit 110 at the closed position, as illustrated in FIG. 34, the shutter holding member 111 protrudes further in the -Z direction than the bottom surface 50f.

In addition, in the shutter unit 110 at the closed position, the link member 113 does not protrude further in the -Z direction than at least the shutter holding member 111, and most of the link member 113 does not protrude from the bottom surface 50f.

As illustrated in FIG. 35, the movement trajectory of the shutter holding member 111 is defined by the first lower guide portion 21c and the first upper guide portion 53c, and the second lower guide portion 21d and the second upper guide portion 53d. Thus, as is apparent from FIG. 35, when the shutter holding member 111 moves toward the open position from the closed position, the shutter holding member 111 is displaced in the −Y direction and significantly moves in the +Z direction in a second half of the displacement. Accordingly, when the shutter unit 110 is at the open position, the shutter holding member 111 is in a state of not protruding in the −Z direction from the bottom surface 50*f* as illustrated in FIG. 31 and FIG. 20.

In addition, when the shutter holding member 111 moves in the +Z direction, the link member 113 consequently rotates relative to the shutter holding member 111 through the coupling shaft 114 as illustrated by a change from FIG. 36 to FIG. 37. Even when the shutter unit 110 is at the open position, the link member 113 does not protrude further in the −Z direction than the shutter holding member 111 as illustrated in FIG. 37. In addition, when the shutter unit 110 is at the open position, the entire link member 113 is in a state of not protruding in the −Z direction from the bottom surface 50*f* as illustrated in FIG. 20.

Next, in the bottom frame 105, as illustrated in FIG. 15, shaft reception portions 105*c* are formed at an interval in the X axis direction. A spring hook shaft 115 is supported by the shaft reception portion 105*c* as illustrated in FIG. 32, FIG. 34, FIG. 36, and FIG. 37. One end of the torsion spring 117 that is one example of a spring member is rotatably fixed to the spring hook shaft 115. A tip end portion at one end of the torsion spring 117 is formed into a coil shape through which the spring hook shaft 115 can pass.

The other end of the torsion spring 117 is rotatably fixed to the third guide shaft 123 disposed in the link member 113. A tip end portion at the other end of the torsion spring 117 is formed into a coil shape through which the third guide shaft 123 can pass.

As described above, the torsion spring 117 can rotate in the Y-Z plane, in other words, can change a posture.

When the shutter unit 110 is at the closed position, the external force F provided to the third guide shaft 123, that is, the shutter unit 110, by the torsion spring 117 includes a −Z direction component and a +Y direction component as illustrated in FIG. 34. Accordingly, as illustrated by arrow Fy, the torsion spring 117 presses the shutter unit 110 in the +Y direction, that is, presses the shutter unit 110 toward the closed position. Accordingly, the shutter unit 110 is held at the closed position.

FIG. 36 illustrates a state where the shutter unit 110 moves in the −Y direction from the closed position by a predetermined amount. The +Y direction component of the pressing force F with which the torsion spring 117 presses the shutter unit 110 is decreased as the shutter unit 110 is displaced to a neutral position, described later, from the closed position. Eventually, a component of the force in the Y axis direction becomes zero, and only the −Z direction component remains. At this point, the torsion spring 117 is in a state of not pressing the shutter unit 110 in any of the +Y direction and the −Y direction. Hereinafter, the position of the shutter unit 110 in this state will be referred to as the neutral position.

Even when the shutter unit 110 is displaced to the neutral position from the open position, the component of the pressing force F in the Y axis direction is also decreased and eventually becomes zero.

When the shutter unit 110 is displaced in the −Y direction from the neutral position, that is, displaced toward the open position, the pressing force F with which the torsion spring 117 presses the shutter unit 110 includes the −Y direction component. This −Y direction component is increased as the shutter unit 110 is displaced toward the open position. Accordingly, as illustrated in FIG. 37, when the shutter unit 110 is at the open position, the pressing force F with which the torsion spring 117 presses the shutter unit 110 includes a pressing force Fy of the −Y direction component, and the shutter unit 110 is held at the open position.

Next, the shutter member 112 is disposed on a +Z direction side of the shutter holding member 111. As illustrated in FIG. 34, FIG. 36, FIG. 37, and FIG. 39, a cylinder portion 112*e* is formed on a −Z direction side of the shutter member 112. A recessed portion 111*c* that receives the cylinder portion 112*e* is formed in the shutter holding member 111 (refer to FIG. 40 as well).

In addition, as illustrated in FIG. 43, a white plate 125 that is a reflection reference surface is disposed on a +Z direction side of the shutter member 112. In order to acquire a reflection reference value, the white plate 125 is white such that reflectance is close to 100%.

The white plate 125 is positioned in a center region of the shutter member 112 in a planar direction, that is, in the X-Y plane. Here, positioning the white plate 125 in the center region of the shutter member 112 in the planar direction means that a center position of the shutter member 112 in the planar direction is included within a range of the white plate 125. The center position of the shutter member 112 in the planar direction is a center position of the shutter member 112 in the Y axis direction and the X axis direction and, in the present embodiment, approximately coincides with the optical axis CL or is near at least the optical axis CL.

The shutter member 112 is disposed to be displaceable in the Z axis direction, that is, in a direction of approaching to and separating from the opening portion 21*a*, with respect to the shutter holding member 111.

More specifically, as illustrated in FIG. 38 and FIG. 39, on a +X direction side surface and a −X direction side surface of the shutter member 112, protruding portions 112*d* are disposed at an interval in the Y axis direction. Meanwhile, on the +X direction side surface and the −X direction side surface of the shutter holding member 111, opening portions 111*b* that receive the protruding portions 112*d* are disposed at an interval in the Y axis direction.

A size of the opening portions 111*b* in the Z axis direction is greater than a size of the protruding portions 112*d* in the Z axis direction. Accordingly, the protruding portions 112*d* are movable in the Z axis direction in a state of being inserted into the opening portions 111*b*. Accordingly, the shutter member 112 is held in the shutter holding member 111 in a movable manner in the Z axis direction.

As illustrated in FIG. 40, a plate spring 118 as a pressing member that presses the shutter member 112 in the +Z direction, that is, toward the opening portion 21*a*, is disposed in the shutter holding member 111. The plate spring 118 includes a plurality of pressing portions that press the shutter member 112. Specifically, the plate spring 118 includes three pressing portions 118*a*. The plurality of pressing portions 118*a* are arranged at almost equal intervals at positions around the opening portion 21*a*.

When the shutter unit 110 is at the closed position, as illustrated in FIG. 34, a contact surface 112*a* that faces the shutter facing surface 21*g* in the shutter member 112 is in close contact with the shutter facing surface 21*g* by a pressing force of the plate spring 118. The contact surface 112*a* has a ring shape around the opening portion 21*a*, that is, along the shutter facing surface 21*g* (refer to FIG. 43). Pressing the contact surface 112*a* against the shutter facing surface 21*g* closes the opening portion 21*a*, and entrance of dust or the like inside the apparatus through the opening portion 21*a* is suppressed.

Next, as illustrated in FIG. 31, FIG. 33, FIG. 41, and FIG. 42, first protruding ribs 21b are formed in the Y axis direction on both sides of the shutter facing surface 21g in the X axis direction. The first protruding ribs 21b are ribs that protrude in the −Z direction from the opening portion forming member 21.

In addition, in the shutter member 112, as illustrated in FIG. 43, second protruding ribs 112b are formed in the Y axis direction on both sides of the contact surface 112a in the X axis direction. The second protruding ribs 112b are ribs that protrude toward the opening portion forming member 21 from the shutter member 112.

The second protruding ribs 112b are formed at positions at which the second protruding ribs 112b can abut on the first protruding ribs 21b. As illustrated in FIG. 41, when the shutter unit 110 is at the closed position, the second protruding ribs 112b are positioned in the +Y direction with respect to the first protruding ribs 21b and do not abut on the first protruding ribs 21b.

Inclined surfaces 112c that extend to the −Z direction in the −Y direction are formed in −Y direction end portions of the second protruding ribs 112b. In addition, inclined surfaces 21h that extend to the +Z direction in the +Y direction are formed in +Y direction end portions of the first protruding ribs 21b. When the shutter unit 110 is at the closed position, the inclined surfaces 112c face the inclined surfaces 21h.

When the shutter unit 110 is displaced toward the open position from this state, the second protruding ribs 112b abut on the first protruding ribs 21b, and the second protruding ribs 112b are in a state of overlapping with the first protruding ribs 21b in the Z axis direction as illustrated by a change from FIG. 41 to FIG. 42. Accordingly, the shutter member 112 moves in the −Z direction against the pressing force of the plate spring 118, and a gap is formed between the shutter facing surface 21g and the contact surface 112a as illustrated in FIG. 36.

In such a manner, the first protruding ribs 21b and the second protruding ribs 112b constitute a movement section 119 that, when the shutter unit 110 at the closed position is displaced toward the open position, moves the shutter member 112 in a direction in which the shutter member 112 is separated from the opening portion forming member 21.

Consequently, wear of the shutter facing surface 21g can be minimized.

Next, as illustrated in FIG. 43 to FIG. 45, a window portion 112f is formed in the shutter member 112, and a magnet 127 is disposed to be exposed through the window portion 112f. The magnet 127 is fixed to the shutter holding member 111 by an adhesive material or a double-sided tape.

The magnetic sensor 128 is disposed on the lower surface of the light emission portion substrate 85.

When the shutter unit 110 is at the open position, as illustrated in FIG. 44, the magnet 127 is at a position at which the magnet 127 overlaps with the magnetic sensor 128 in the Y axis direction. This state is a state where a straight line distance between the magnet 127 and the magnetic sensor 128 is the shortest.

Meanwhile, when the shutter unit 110 is at the closed position, as illustrated in FIG. 45, the straight line distance between the magnet 127 and the magnetic sensor 128 is increased, compared to when the shutter unit 110 is at the open position. This state is a state where a straight line distance between the magnet 127 and the magnetic sensor 128 is the longest.

With such a configuration, the magnetic sensor 128 can be arranged at a position separated from the opening portion 21a, and size increase of the apparatus caused by arranging the magnetic sensor 128 close to the opening portion 21a can be suppressed.

The magnetic sensor 128 is a magnetic sensor that changes the detection signal depending on magnetic strength. When the shutter unit 110 is at the open position, the magnetic sensor 128 transmits a High detection signal to the MCU 10 (refer to FIG. 1). In addition, when the shutter unit 110 is at the closed position, the magnetic sensor 128 transmits a Low detection signal to the MCU 10 (refer to FIG. 1). That is, the magnetic sensor 128 is a detection section that changes a detection signal in accordance with displacement of the shutter unit 110.

Accordingly, the MCU 10 can detect whether the shutter unit 110 is at the closed position or the open position.

As described above, the shutter unit 110 is configured to include the shutter member 112 that closes the opening portion 21a when the shutter unit 110 is at the closed position, the shutter holding member 111 that holds the shutter member 112 such that the shutter member 112 can be displaced in a direction of approaching to or separating from the opening portion 21a, and the plate spring 118 that is one example of the pressing member which presses the shutter member 112 toward the opening portion 21a.

Accordingly, even when a manufacturing error or an assembly error of a part, or wear or the like accompanied by use occurs, occurrence of a gap between the shutter member 112 and the opening portion 21a can be suppressed by pressing the shutter member 112 toward the opening portion 21a. Consequently, entrance of dust or the like into the opening portion 21a can be favorably suppressed.

In addition, the plate spring 118 presses the shutter member 112 by the plurality of pressing portions 118a, that is, at a plurality of positions around the opening portion 21a. Thus, pressing the shutter member 112 in a biased manner to a specific position in the opening portion 21a is suppressed, and the opening portion 21a can be favorably closed by the shutter member 112.

In addition, a movement section 119 that, when the shutter unit 110 at the closed position is displaced toward the open position, moves the shutter member 112 in a direction in which the shutter member 112 is separated from the opening portion forming member 21 is disposed. Accordingly, wear of the shutter facing surface 21g that is a part forming the opening portion 21a in the opening portion forming member 21, and the contact surface 112a that is a part closing the opening portion 21a in the shutter member 112 is suppressed. Consequently, a concern that a gap occurs between the opening portion 21a and the shutter member 112 and dust or the like enters can be suppressed.

In addition, the movement section 119 is configured to include the first protruding ribs 21b that are formed in the opening portion forming member 21 and protrude toward the shutter member 112, and the second protruding ribs 112b that are formed in the shutter member 112 and protrude toward the opening portion forming member 21. When the shutter unit 110 is at the closed position, the first protruding ribs 21b are in a state of non-contact with the second protruding ribs 112b. When the shutter unit 110 at the closed position is displaced toward the open position, the second protruding ribs 112b moves over the first protruding ribs 21b and causes the shutter member 112 to move in a direction of separating from the opening portion forming member 21. With such a configuration, the movement section 119 can be configured at a low cost.

In addition, the shutter unit 110 includes the link member 113 that is positioned further on an open position side than the shutter holding member 111 and is relatively rotatably coupled to the shutter holding member 111. The shutter holding member 111 in a state of protruding from the bottom surface 50f when the shutter unit 110 is at the closed position, and not protruding from the bottom surface 50f when the shutter unit 110 is at the open position. By rotating the link member 113 relative to the shutter holding member 111, a state where the link member 113 does not protrude from the bottom surface 50f more than the shutter holding member 111 is maintained regardless of the position of the shutter unit 110.

Accordingly, size reduction of the apparatus particularly when the shutter unit 110 is at the closed position can be achieved, compared to a configuration in which the shutter holding member 111 is integrated with the link member 113.

In addition, the torsion spring 117 that presses the link member 113 toward the open position and the closed position is included, and the torsion spring 117 changes a posture in accordance with displacement of the shutter unit 110. Accordingly, when the shutter unit 110 is further on a closed position side than the neutral position, the torsion spring 117 presses the link member 113 toward the closed position (refer to FIG. 34). In addition, when the shutter unit 110 is further on an open position side than the neutral position, the torsion spring 117 presses the link member 113 toward the open position (refer to FIG. 36 and FIG. 37). With such a configuration, a section that maintains the shutter unit 110 at the closed position and the open position can be configured at a low cost.

FIG. 46 schematically illustrates the position of the shutter unit 110. A position Ya1 illustrates the closed position of the shutter unit 110. A position Ya2 illustrates the open position. A position Yac illustrates the neutral position. Reference sign A1 denotes a movement range of the shutter unit 110 between the closed position Ya1 and the neutral position Yac. Reference sign A2 denotes the movement range of the shutter unit 110 between the open position Ya2 and the neutral position Yac.

Here, due to friction or the like between the first guide shaft 121, the second guide shaft 122, and the third guide shaft 123, and the opening portion forming member 21 and the bottom casing 53 as described with reference to FIG. 35, a state where the shutter unit 110 does not move and stops may be maintained even when the shutter unit 110 is slightly further on a closed position Ya1 side than the neutral position Yac. Similarly, even when the shutter unit 110 is slightly further on an open position Ya2 side than the neutral position Yac, a state where the shutter unit 110 does not move and stops may be maintained.

In FIG. 46, a range illustrated by a range K is a region in which a state where the shutter unit 110 stops in such a manner is maintained. Hereinafter, this region will be referred to as a stoppage region K of the shutter unit 110.

Next, as described above, the white plate 125 that forms the reflection reference surface used as a reference of reflectance is disposed at a position facing the opening portion 21a in the shutter member 112.

The shutter member 112 has a configuration in which the shutter member 112 is pressed toward the opening portion 21a by the plate spring 118. Thus, a position or a direction of the white plate 125 is unlikely to vary, and an appropriate reference value can be obtained.

The shutter unit 110 and configurations related thereto can be modified as illustrated in FIG. 47 to FIG. 50. In FIG. 47 to FIG. 50, the same configurations as already described configurations are designated by the same reference signs, and duplicate descriptions will be avoided below.

In FIG. 47 and FIG. 48, a shutter unit 110A is configured to include a shutter holding member 111A, a link member 113A, and a second link member 130. The shutter holding member 111A and the link member 113A are coupled to be relatively rotatable through the coupling shaft 114. The link member 113A and the second link member 130 are coupled to be relatively rotatable through a second coupling shaft 131.

A rotation shaft 132 that is parallel to the X axis direction is supported by an opening portion forming member 21A, and the second link member 130 is disposed to be rotatable about the rotation shaft 132 in the Y-Z plane. In the opening portion forming member 21A, torsion springs 133 are disposed at an interval in the X axis direction. One ends of the torsion springs 133 are rotatably hooked to a part of the opening portion forming member 21A, and the other ends of the torsion springs 133 are hooked to the second link member 130.

FIG. 47 illustrates a state where the shutter unit 110A is at the closed position, and FIG. 48 illustrates a state where the shutter unit 110A is at the open position. As illustrated by a change from FIG. 47 to FIG. 48 or a change from FIG. 48 to FIG. 47, in accordance with displacement of the shutter unit 110A, the shutter holding member 111A and the link member 113A relatively rotate, and the link member 113A and the second link member 130 relatively rotate.

At this point, the torsion spring 133 changes a posture in the same manner as the torsion spring 117 (refer to FIG. 32). Accordingly, when the shutter unit 110A is between the closed position and the neutral position, the torsion spring 133 presses the shutter unit 110A toward the closed position. In addition, when the shutter unit 110A is between the open position and the neutral position, the torsion spring 133 presses the shutter unit 110A toward the open position.

Next, in FIG. 49 and FIG. 50, a shutter unit 110B is configured to include a shutter holding member 111B and a link member 113B. The shutter holding member 111B and the link member 113B are coupled to be relatively rotatable through a first coupling portion 140.

A second coupling portion 141 that extends in the X axis direction is formed in the link member 113B. A coupling member 142 engages with the second coupling portion 141 in a slidable manner in the X axis direction.

A rotation shaft 144 is integrated with an opening portion forming member 21B. In the rotation shaft 144, an arm member 143 is disposed to be rotatable in the X-Y plane. The arm member 143 and the coupling member 142 are coupled to be relatively rotatable through a link shaft 143a that has a center axis parallel to the Z axis direction. A torsion spring, not illustrated, that generates a spring force between the opening portion forming member 21B and the arm member 143 is disposed in the +Z direction with respect to the arm member 143.

FIG. 49 illustrates a state where the shutter unit 110B is at the closed position, and FIG. 50 illustrates a state where the shutter unit 110B is at the open position. As illustrated by a change from FIG. 49 to FIG. 50 or a change from FIG. 50 to FIG. 49, the shutter holding member 111B and the link member 113B relatively rotate in accordance with displacement of the shutter unit 110B.

In addition, the arm member 143 rotates, and consequently, the arm member 143 and the coupling member 142 relatively rotate. At this point, the coupling member 142 causes the second coupling portion 141 to slide in the X axis direction.

The torsion spring, not illustrated, that is positioned in the +Z direction with respect to the arm member 143 changes the posture in accordance with rotation of the arm member 143. Accordingly, when the shutter unit 110B is between the closed position and the neutral position, the torsion spring presses the shutter unit 110B toward the closed position. In addition, when the shutter unit 110B is between the open position and the neutral position, the torsion spring presses the shutter unit 110B toward the open position.

The shutter unit 110 and the configurations related thereto can be modified as described above.

Next, as described above, the color measurement apparatus 1 includes the magnetic sensor 128 that changes the detection signal in accordance with displacement of the shutter unit 110. Accordingly, the position of the shutter unit 110 can be perceived, and an appropriate control corresponding to the position of the shutter unit 110 can be performed.

In addition, the magnetic sensor 128 is a sensor that changes the detection signal depending on the magnetic strength. Thus, an opening or the like for transmitting detection light as in an optical sensor does not need to be dedicatedly disposed, and a decrease in airtightness of the apparatus caused by forming an extra opening can be avoided.

However, as a detection section for detecting the position of the shutter unit 110, a non-contact type sensor of other types such as an optical sensor, an electrostatic capacitive proximity sensor, and an inductive proximity sensor or a contact type sensor can also be used.

Hereinafter, a control performed by the MCU 10 (refer to FIG. 1) that is a control portion receiving the detection signal from the magnetic sensor 128 will be described with reference to FIG. 51 to FIG. 53.

In FIG. 51, when the power button 55 (refer to FIG. 5 and the like) is pushed in a state where power is ON, that is, when a power OFF instruction for the apparatus is received (Yes in step S101), and the shutter unit 110 is at the closed position (Yes in step S102), the MCU 10 transitions to a power OFF process for the apparatus (step S103).

Meanwhile, when the shutter unit 110 is at the open position (No in step S102), a transition to power OFF is suspended. In the present example, an alert indicating that the shutter unit 110 is at the open position is displayed on the display portion 15 (refer to FIG. 5 and the like) (step S104).

Accordingly, the apparatus is not powered OFF in a state where the shutter unit 110 is at the open position, and entrance of dust or the like inside the apparatus through the opening portion 21a in a state where the apparatus is powered OFF can be suppressed.

In addition, since the alert indicating that the shutter unit 110 is at the open position is displayed on the display portion 15, usability is improved. For example, a message such as "Shutter is open. Please close." can be displayed as the alert indicating that the shutter unit 110 is at the open position.

Next, in FIG. 52, when the MCU 10 determines that a timing at which the reference value is acquired using the white plate 125 (refer to FIG. 43 and the like) is reached (Yes in step S201), the MCU 10 determines whether or not the shutter unit 110 is at the closed position (step S202). Consequently, when the shutter unit 110 is at the closed position (Yes in step S202), a reference value acquisition process is executed (step S203). Meanwhile, when the shutter unit 110 is at the open position (No in step S202), acquisition of the reference value is suspended. In this case, in the present example, the alert indicating that the shutter unit 110 is at the open position is displayed on the display portion 15 (refer to FIG. 5 and the like) (step S204).

Accordingly, the reference value can be appropriately acquired using the white plate 125.

Examples of the timing at which the reference value is acquired include when the power button 55 (refer to FIG. 5 and the like) is pushed from a power OFF state, that is, when a power ON instruction for the apparatus is received, and when a predetermined time period elapses in a power ON state of the apparatus.

Next, in FIG. 53, when the decision button 54 (refer to FIG. 5 and the like) is pushed, that is, when a color measurement execution instruction is received (Yes in step S301), and the shutter unit 110 is at the open position (Yes in step S302), the MCU 10 executes a color measurement process (step S303).

Meanwhile, when the shutter unit 110 is at the closed position (No in step S302), a transition to power OFF is suspended. In the present example, an alert indicating that the shutter unit 110 is at the closed position is displayed on the display portion 15 (refer to FIG. 5 and the like) (step S304). By such a control, an appropriate color measurement value can be acquired.

When the color measurement execution instruction is received (Yes in step S301), and the shutter unit 110 is at the open position (Yes in step S302), the color measurement process may be executed (step S303). When the shutter unit 110 is at the closed position (No in step S302), the reference value may be acquired using the white plate 125, and then, a transition may be made to the process in step S304.

In addition, in FIG. 46, in a displacement region (A1+A2) of the shutter unit 110, a region B1 in which the magnetic sensor 128 transmits the detection signal indicating the closed position of the shutter unit 110 is set by disposing a margin M on the closed position Ya1 side from the neutral position Yac. In FIG. 46, a position Ybc illustrates a position at which the detection signal of the magnetic sensor 128 is switched. In the region B1, the detection signal indicating that the shutter unit 110 is at the closed position is transmitted. In a region B2, the detection signal indicating that the shutter unit 110 is at the open position is transmitted.

Particularly, in the present embodiment, the region B1 is set further on the closed position Ya1 side than the stoppage region K of the shutter unit 110.

Accordingly, when the magnetic sensor 128 transmits the detection signal indicating the closed position of the shutter unit 110, the shutter unit 110 is securely at the closed position. Accordingly, there is no concern for a determination that the shutter unit 110 is at the closed position even when the shutter unit 110 is at an intermediate position. Furthermore, the reference value can be securely acquired using the white plate 125.

The present disclosure is not limited to each embodiment described above, and various modifications can be made within the scope of the disclosure disclosed in the claims. Such modifications also fall within the scope of the present disclosure.

For example, while the color measurement apparatus 1 incorporates the battery 17 in the embodiment, the battery 17 may be configured to be detachable. That is, the color measurement apparatus 1 may be configured to not incorporate the battery 17. In addition, in this case, the battery 17 may be a primary battery that is not repeatedly charged and discharged.

In addition, in the present embodiment, the incident light processing portion 2 is configured to include the optical filter device 3 and the light reception portion 4, and the optical filter device 3 is a variable wavelength Fabry-Perot etalon that transmits a predetermined wavelength component of the incident light. However, the present disclosure is not limited thereto. For example, a spectroscopic method that uses a diffraction lattice may be used as a spectroscopic method. In addition, an apparatus configuration that employs a stimulus value direct reading method of directly measuring three stimulus values of base colors as a color measurement principle may be available.

In addition, while the LED is used as the light emission element used in the light emission portion 9 in the present embodiment, the present disclosure is not limited thereto. For example, a xenon lamp may be used.

What is claimed is:

1. A color measurement apparatus comprising:
    an opening portion forming member that is a member in which an opening portion for causing light arriving from a measurement target to enter inside the apparatus is formed, and that is arranged on a bottom surface at a time of measurement performed by the apparatus;
    an incident light processing portion that processes light incident through the opening portion; and
    an operation portion that is positioned on an upper surface which is a surface on an opposite side from the bottom surface, and that receives various operations, wherein
    in a view from a first direction that is a vertical direction intersecting with the bottom surface and the upper surface which is the surface on the opposite side from the bottom surface, the opening portion and the operation portion have an overlapping part.

2. The color measurement apparatus according to claim 1, wherein
    the operation portion includes a decision button that receives at least one of decision of a measurement condition and execution of measurement, and
    in a view from the first direction, a center position of the opening portion coincides with a center position of the decision button.

3. The color measurement apparatus according to claim 2, wherein
    a cross button for selecting various items is arranged around the decision button, and
    a mark line is disposed in the cross button.

4. The color measurement apparatus according to claim 1, wherein
    the operation portion is configured to include a power button and all buttons related to measurement on the upper surface.

5. The color measurement apparatus according to claim 1, wherein
    the upper surface including the operation portion is formed into a planar shape.

6. The color measurement apparatus according to claim 1, further comprising:
    a first circuit substrate that includes the incident light processing portion; and
    the display portion that is positioned on the upper surface and performs various kinds of display, wherein
    in a view from the first direction, the display portion and the first circuit substrate have an overlapping part.

7. The color measurement apparatus according to claim 1, further comprising:
    a battery that supplies power to the incident light processing portion, wherein
    the battery has a shape that extends in a second direction which is a direction intersecting with the first direction and is a longitudinal direction of the apparatus in a view from the first direction, and
    both end portions of the battery in the second direction face a side wall inner surface, in the second direction, of a casing that forms an outline of the apparatus.

8. The color measurement apparatus according to claim 7, wherein
    the casing includes a recessed portion for grip on a side wall in a third direction that is a direction orthogonal to the second direction and is a short direction of the apparatus in a view from the first direction, and
    the battery and the recessed portion have an overlapping part in a view from the third direction.

9. The color measurement apparatus according to claim 1, wherein
    the incident light processing portion includes
        a variable wavelength optical filter that transmits a predetermined wavelength component of incident light, and
        a light reception portion that receives light transmitted through the optical filter.

10. The color measurement apparatus according to claim 9, wherein
    the optical filter is a Fabry-Perot etalon.

* * * * *